(12) United States Patent
Boarman et al.

(10) Patent No.: US 10,845,111 B2
(45) Date of Patent: Nov. 24, 2020

(54) LAYERING OF LOW THERMAL CONDUCTIVE MATERIAL ON METAL TRAY

(71) Applicant: WHIRLPOOL CORPORATION, Benton Harbor, MI (US)

(72) Inventors: Patrick J. Boarman, Evansville, IN (US); Lindsey A. Wohlgamuth, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 134 days.

(21) Appl. No.: 16/247,813

(22) Filed: Jan. 15, 2019

(65) Prior Publication Data

US 2019/0145682 A1    May 16, 2019

Related U.S. Application Data

(60) Continuation of application No. 15/463,501, filed on Mar. 20, 2017, now Pat. No. 10,215,467, which is a
(Continued)

(51) Int. Cl.
*F25C 1/18*    (2006.01)
*F25C 1/10*    (2006.01)
(Continued)

(52) U.S. Cl.
CPC ............... *F25C 1/18* (2013.01); *F25B 21/02* (2013.01); *F25C 1/10* (2013.01); *F25C 1/24* (2013.01);
(Continued)

(58) Field of Classification Search
CPC ...... F25C 1/18; F25C 5/06; F25C 1/10; F25C 1/24; F25C 1/22; F25C 2305/022; F25C 2500/02; F25B 21/02
See application file for complete search history.

(56) References Cited

U.S. PATENT DOCUMENTS 275,192 A    4/1883   Goodell
286,604 A    10/1883  Goodbll
(Continued)

FOREIGN PATENT DOCUMENTS

AU    2006201786 A1    11/2007
CN    1989379 A    6/2007
(Continued)

OTHER PUBLICATIONS

"Manufacturing Processes—Explosive Sheetmetal Forming," Engineer's Handbook, 2006, web archive, last accessed Jan. 19, 2016, at http://www.engineershandbook.com/MfgMethods/exforming.htm, pp. 1-3.
(Continued)

*Primary Examiner* — Emmanuel E Duke
(74) *Attorney, Agent, or Firm* — Nyemaster Goode, P.C.

(57) ABSTRACT

An ice making assembly within an appliance with a housing having an inlet and an outlet, and a lower portion and an upper portion. The assembly includes a rotatable shroud within the housing with a first slot in air communication with the inlet, and a second slot in air communication with the outlet. A thermoelectric device with a top side and a bottom side, and having a heat sink on the bottom side between the first slot and the second slot. An ice tray disposed above and thermally connected with the top side, a barrier wall within the housing and in contact with the shroud between the lower portion and the upper portion.

20 Claims, 39 Drawing Sheets

Related U.S. Application Data continuation of application No. 15/095,995, filed on Apr. 11, 2016, now Pat. No. 9,599,387, which is a division of application No. 13/713,206, filed on Dec. 13, 2012, now Pat. No. 9,310,115.

(51) Int. Cl.
*F25C 1/24* (2018.01)
*F25B 21/02* (2006.01)
*F25C 5/06* (2006.01)

(52) U.S. Cl.
CPC .......... *F25C 5/06* (2013.01); *F25C 2305/022* (2013.01); *F25C 2500/02* (2013.01)

(56) References Cited

U.S. PATENT DOCUMENTS

| | | |
|---|---|---|
| 301,539 A | 7/1884 | Vezin |
| 314,755 A | 3/1885 | Teacy |
| 1,407,614 A | 2/1922 | Wicks |
| 1,616,492 A | 2/1927 | Gutierrez Y Lado |
| 1,889,481 A | 11/1932 | Kennedy, Jr. |
| 1,932,731 A | 10/1933 | Hathorne |
| 2,027,754 A | 1/1936 | Smith |
| 2,244,081 A | 6/1941 | Reeves |
| 2,481,525 A | 9/1949 | Mott |
| 2,617,269 A | 11/1952 | Smith |
| 2,683,356 A | 7/1954 | Green, Jr. |
| 2,757,519 A | 8/1956 | Sampson |
| 2,846,854 A | 8/1958 | Galin |
| 2,878,659 A | 3/1959 | Prance et al. |
| 2,969,654 A | 1/1961 | Harle |
| 3,009,336 A | 11/1961 | Bayston |
| 3,016,719 A | 1/1962 | Reindl |
| 3,033,008 A | 5/1962 | Davis |
| 3,046,753 A | 7/1962 | Carapico, Jr. |
| 3,071,933 A | 1/1963 | Shoemaker |
| 3,075,360 A | 1/1963 | Elfving et al. |
| 3,075,364 A | 1/1963 | Kniffin |
| 3,084,678 A | 4/1963 | Lindsay |
| 3,093,980 A | 6/1963 | Frei |
| 3,144,755 A | 8/1964 | Kattis |
| 3,159,985 A | 12/1964 | Keighley |
| 3,172,269 A | 3/1965 | Cole |
| 3,192,726 A | 7/1965 | Newton |
| 3,200,600 A | 8/1965 | Elfving |
| 3,214,128 A | 10/1965 | Beck et al. |
| 3,217,508 A | 11/1965 | Beck |
| 3,217,510 A | 11/1965 | Kniffin et al. |
| 3,217,511 A | 11/1965 | Keighley |
| 3,222,902 A | 12/1965 | Brejcha et al. |
| 3,228,222 A | 1/1966 | Maier |
| 3,255,603 A | 6/1966 | Johnson et al. |
| 3,269,139 A | 8/1966 | De Vincent |
| 3,308,631 A | 3/1967 | Kniffin |
| 3,318,105 A | 5/1967 | Burroughs et al. |
| 3,321,932 A | 5/1967 | Orphey, Jr. |
| 3,383,876 A | 5/1968 | Frohbieter |
| 3,412,572 A | 11/1968 | Kesling |
| 3,426,564 A | 2/1969 | Jansen et al. |
| 3,451,237 A | 6/1969 | Baringer et al. |
| 3,638,451 A | 2/1972 | Brandt |
| 3,646,792 A | 3/1972 | Hertel et al. |
| 3,648,964 A | 3/1972 | Fox |
| 3,677,030 A | 7/1972 | Nicholas |
| 3,684,235 A | 8/1972 | Schupbach |
| 3,724,804 A | 4/1973 | Campbell |
| 3,775,992 A | 12/1973 | Bright |
| 3,806,077 A | 4/1974 | Pietrzak |
| 3,864,933 A | 2/1975 | Bright et al. |
| 3,892,105 A | 7/1975 | Bernard et al. |
| 3,908,395 A | 9/1975 | Hobbs |
| 3,952,539 A | 4/1976 | Hanson et al. |
| 4,006,605 A | 2/1977 | Dickson |
| D244,275 S | 5/1977 | Gurbin |
| 4,024,744 A | 5/1977 | Trakhtenberg et al. |
| 4,059,970 A | 11/1977 | Loeb |
| 4,062,201 A | 12/1977 | Schumacher |
| 4,078,450 A | 3/1978 | Vallejos |
| D249,269 S | 9/1978 | Pitts |
| 4,148,457 A | 4/1979 | Gurbin |
| 4,184,339 A | 1/1980 | Wessa |
| 4,222,547 A | 9/1980 | Lalonde |
| 4,261,182 A | 4/1981 | Elliott |
| 4,288,497 A | 9/1981 | Tanaka et al. |
| 4,402,185 A | 9/1983 | Perchak |
| 4,402,194 A | 9/1983 | Kuwako et al. |
| 4,412,429 A | 11/1983 | Kohl |
| 4,462,345 A | 7/1984 | Routery |
| 4,483,153 A | 11/1984 | Wallace |
| 4,487,024 A | 12/1984 | Fletcher et al. |
| 4,550,575 A | 11/1985 | DeGaynor |
| 4,562,991 A | 1/1986 | Wu |
| 4,587,810 A | 5/1986 | Fletcher |
| 4,627,946 A | 12/1986 | Crabtree |
| 4,669,271 A | 6/1987 | Noel |
| 4,685,304 A | 8/1987 | Essig |
| 4,688,386 A | 8/1987 | Lane et al. |
| 4,727,720 A | 3/1988 | Wernicki et al. |
| 4,843,827 A | 7/1989 | Peppers |
| 4,852,359 A | 8/1989 | Manzotti et al. |
| 4,856,463 A | 8/1989 | Johnston |
| 4,910,974 A | 3/1990 | Hara |
| 4,942,742 A | 7/1990 | Burruel |
| 4,970,877 A | 11/1990 | Dimijian |
| 4,971,737 A | 11/1990 | Infanti |
| 5,025,756 A | 6/1991 | Nyc |
| D318,281 S | 7/1991 | McKinlay |
| 5,044,600 A | 9/1991 | Shannon |
| 5,129,237 A | 7/1992 | Day et al. |
| 5,157,929 A | 10/1992 | Hotaling |
| 5,177,980 A | 1/1993 | Kawamoto et al. |
| 5,196,127 A | 3/1993 | Solell |
| 5,253,487 A | 10/1993 | Oike |
| 5,257,601 A | 11/1993 | Coffin |
| 5,372,492 A | 12/1994 | Yamauchi |
| 5,378,521 A | 1/1995 | Ogawa et al. |
| 5,400,605 A | 3/1995 | Jeong |
| 5,408,844 A | 4/1995 | Stokes |
| 5,425,243 A | 6/1995 | Sanuki et al. |
| 5,483,929 A | 1/1996 | Kuhn et al. |
| 5,586,439 A | 12/1996 | Schlosser et al. |
| 5,617,728 A | 4/1997 | Kim et al. |
| 5,618,463 A | 4/1997 | Rindler et al. |
| 5,632,936 A | 5/1997 | Su et al. |
| 5,675,975 A | 10/1997 | Lee |
| 5,761,920 A | 6/1998 | Wilson et al. |
| 5,768,900 A | 6/1998 | Lee |
| 5,826,320 A | 10/1998 | Rathke et al. |
| 5,884,487 A | 3/1999 | Davis et al. |
| 5,884,490 A | 3/1999 | Whidden et al. |
| D415,505 S | 10/1999 | Myers |
| 5,970,725 A | 10/1999 | Lee |
| 5,970,735 A | 10/1999 | Hobelsberger |
| 6,058,720 A | 5/2000 | Ryu |
| 6,062,036 A | 5/2000 | Hobelsberger |
| 6,101,817 A | 8/2000 | Watt |
| 6,145,320 A | 11/2000 | Kim |
| 6,148,620 A | 11/2000 | Kumagai et al. |
| 6,148,621 A | 11/2000 | Byczynski et al. |
| 6,161,390 A | 12/2000 | Kim |
| 6,179,045 B1 | 1/2001 | Lilleaas |
| 6,209,849 B1 | 4/2001 | Dickmeyer |
| 6,282,909 B1 | 9/2001 | Newman et al. |
| 6,289,683 B1 | 9/2001 | Daukas et al. |
| 6,357,720 B1 | 3/2002 | Shapiro et al. |
| 6,427,463 B1 | 8/2002 | James |
| 6,467,146 B1 | 10/2002 | Herman |
| 6,481,235 B2 | 11/2002 | Kwon |
| 6,647,739 B1 | 11/2003 | Kim |
| 6,688,130 B1 | 2/2004 | Kim |
| 6,688,131 B1 | 2/2004 | Kim et al. |
| 6,735,959 B1 | 5/2004 | Najewicz |
| 6,742,351 B2 | 6/2004 | Kim et al. |

(56) References Cited

U.S. PATENT DOCUMENTS

| | | |
|---|---|---|
| 6,763,787 B2 | 7/2004 | Hallenstvedt et al. |
| 6,782,706 B2 | 8/2004 | Holmes et al. |
| D496,374 S | 9/2004 | Zimmerman |
| 6,817,200 B2 | 11/2004 | Willamor et al. |
| 6,820,433 B2 | 11/2004 | Hwang |
| 6,857,277 B2 | 2/2005 | Somura |
| 6,935,124 B2 | 8/2005 | Takahashi et al. |
| 6,951,113 B1 | 10/2005 | Adamski |
| D513,019 S | 12/2005 | Lion et al. |
| 7,010,934 B2 | 3/2006 | Choi et al. |
| 7,010,937 B2 | 3/2006 | Wilkinson et al. |
| 7,013,654 B2 | 3/2006 | Tremblay et al. |
| 7,051,541 B2 | 5/2006 | Chung et al. |
| 7,059,140 B2 | 6/2006 | Zevlakis |
| 7,062,925 B2 | 6/2006 | Tsuchikawa et al. |
| 7,062,936 B2 | 6/2006 | Rand et al. |
| 7,082,782 B2 | 8/2006 | Schlosser et al. |
| 7,131,280 B2 | 11/2006 | Voglewede et al. |
| 7,185,508 B2 | 3/2007 | Voglewede et al. |
| 7,188,479 B2 | 3/2007 | Anselmino et al. |
| 7,201,014 B2 | 4/2007 | Hornung |
| 7,204,092 B2 | 4/2007 | Azcarate Castrellon et al. |
| 7,210,298 B2 | 5/2007 | Lin |
| 7,216,490 B2 | 5/2007 | Joshi |
| 7,216,491 B2 | 5/2007 | Cole et al. |
| 7,234,423 B2 | 6/2007 | Lindsay |
| 7,297,516 B2 | 11/2007 | Chapman et al. |
| 7,318,323 B2 | 1/2008 | Tatsui et al. |
| 7,386,993 B2 | 6/2008 | Azcarate Castrellon et al. |
| 7,415,833 B2 | 8/2008 | Leaver et al. |
| 7,448,863 B2 | 11/2008 | Yang |
| 7,568,359 B2 | 8/2009 | Wetekamp et al. |
| 7,587,905 B2 | 9/2009 | Kopf |
| 7,669,435 B2 | 3/2010 | Joshi |
| 7,681,406 B2 | 3/2010 | Cushman et al. |
| 7,703,292 B2 | 4/2010 | Cook et al. |
| 7,752,859 B2 | 7/2010 | Lee et al. |
| 7,802,457 B2 | 9/2010 | Golovashchenko et al. |
| 7,866,167 B2 | 1/2011 | Kopf |
| 7,918,105 B2 | 4/2011 | Kim |
| 8,015,849 B2 | 9/2011 | Jones et al. |
| 8,037,697 B2 | 10/2011 | LeClear et al. |
| 8,074,464 B2 | 12/2011 | Venkatakrishnan et al. |
| 8,099,989 B2 | 1/2012 | Bradley et al. |
| 8,117,863 B2 | 2/2012 | Van Meter et al. |
| 8,171,744 B2 | 5/2012 | Watson et al. |
| 8,322,148 B2 | 12/2012 | Kim et al. |
| 8,336,327 B2 | 12/2012 | Cole et al. |
| 8,371,133 B2 | 2/2013 | Kim et al. |
| 8,371,136 B2 | 2/2013 | Venkatakrishnan et al. |
| 8,375,919 B2 | 2/2013 | Cook et al. |
| 8,413,619 B2 | 4/2013 | Cleeves |
| 8,424,334 B2 | 4/2013 | Kang et al. |
| 8,429,926 B2 | 4/2013 | Shaha et al. |
| 8,474,279 B2 | 7/2013 | Besore et al. |
| 8,516,835 B2 | 8/2013 | Holter |
| 8,516,846 B2 | 8/2013 | Lee et al. |
| 8,555,658 B2 | 10/2013 | Kim et al. |
| 8,646,283 B2 | 2/2014 | Kuratani et al. |
| 8,677,774 B2 | 3/2014 | Yamaguchi et al. |
| 8,746,204 B2 | 6/2014 | Hofbauer |
| 8,769,981 B2 | 7/2014 | Hong et al. |
| 8,925,335 B2 | 1/2015 | Gooden et al. |
| 9,217,596 B2 | 12/2015 | Hall |
| 9,476,631 B2 | 10/2016 | Park et al. |
| 2002/0014087 A1 | 2/2002 | Kwon |
| 2003/0111028 A1 | 6/2003 | Hallenstvedt |
| 2004/0099004 A1 | 5/2004 | Somura |
| 2004/0144100 A1 | 7/2004 | Hwang |
| 2004/0206250 A1 | 10/2004 | Kondou et al. |
| 2004/0237566 A1 | 12/2004 | Hwang et al. |
| 2004/0261427 A1 | 12/2004 | Tsuchikawa et al. |
| 2005/0067406 A1 | 3/2005 | Rajarajan et al. |
| 2005/0126185 A1 | 6/2005 | Joshi |
| 2005/0126202 A1 | 6/2005 | Shoukyuu et al. |
| 2005/0151050 A1 | 7/2005 | Godfrey |
| 2005/0160741 A1 | 7/2005 | Park |
| 2005/0160757 A1 | 7/2005 | Choi et al. |
| 2006/0016209 A1 | 1/2006 | Cole et al. |
| 2006/0032262 A1 | 2/2006 | Seo et al. |
| 2006/0053805 A1 | 3/2006 | Flinner et al. |
| 2006/0086107 A1 | 4/2006 | Voglewede et al. |
| 2006/0086134 A1 | 4/2006 | Voglewede et al. |
| 2006/0150645 A1 | 7/2006 | Leaver |
| 2006/0168983 A1 | 8/2006 | Tatsui et al. |
| 2006/0207282 A1 | 9/2006 | Visin et al. |
| 2006/0233925 A1 | 10/2006 | Kawamura |
| 2006/0242971 A1 | 11/2006 | Cole et al. |
| 2006/0288726 A1 | 12/2006 | Mori et al. |
| 2007/0028866 A1 | 2/2007 | Lindsay |
| 2007/0107447 A1 | 5/2007 | Langlotz |
| 2007/0119202 A1 | 5/2007 | Kadowaki et al. |
| 2007/0130983 A1 | 6/2007 | Broadbent et al. |
| 2007/0137241 A1 | 6/2007 | Lee et al. |
| 2007/0193278 A1 | 8/2007 | Polacek et al. |
| 2007/0227162 A1 | 10/2007 | Wang |
| 2007/0227164 A1 | 10/2007 | Ito et al. |
| 2007/0262230 A1 | 11/2007 | McDermott |
| 2008/0034780 A1 | 2/2008 | Lim et al. |
| 2008/0104991 A1 | 5/2008 | Hoehne et al. |
| 2008/0236187 A1 | 10/2008 | Kim |
| 2008/0264082 A1 | 10/2008 | Tikhonov et al. |
| 2009/0049858 A1 | 2/2009 | Lee et al. |
| 2009/0120306 A1 | 5/2009 | DeCarlo et al. |
| 2009/0165492 A1 | 7/2009 | Wilson et al. |
| 2009/0173089 A1 | 7/2009 | LeClear et al. |
| 2009/0178430 A1 | 7/2009 | Jendrusch et al. |
| 2009/0187280 A1 | 7/2009 | Hsu et al. |
| 2009/0199569 A1 | 8/2009 | Petrenko |
| 2009/0211266 A1 | 8/2009 | Kim et al. |
| 2009/0211271 A1 | 8/2009 | Kim et al. |
| 2009/0223230 A1 | 9/2009 | Kim et al. |
| 2009/0235674 A1 | 9/2009 | Kern et al. |
| 2009/0272259 A1 | 11/2009 | Cook et al. |
| 2009/0308085 A1 | 12/2009 | DeVos |
| 2010/0011827 A1 | 1/2010 | Stoeger et al. |
| 2010/0018226 A1 | 1/2010 | Kim et al. |
| 2010/0031675 A1 | 2/2010 | Kim et al. |
| 2010/0043455 A1 | 2/2010 | Kuehl et al. |
| 2010/0050663 A1 | 3/2010 | Venkatakrishnan et al. |
| 2010/0050680 A1 | 3/2010 | Venkatakrishnan et al. |
| 2010/0055223 A1 | 3/2010 | Kondou et al. |
| 2010/0095692 A1 | 4/2010 | Jendrusch et al. |
| 2010/0101254 A1 | 4/2010 | Besore et al. |
| 2010/0126185 A1 | 5/2010 | Cho et al. |
| 2010/0139295 A1 | 6/2010 | Zuccolo et al. |
| 2010/0163707 A1 | 7/2010 | Kim |
| 2010/0180608 A1 | 7/2010 | Shaha et al. |
| 2010/0197849 A1 | 8/2010 | Momose et al. |
| 2010/0218518 A1 | 9/2010 | Ducharme et al. |
| 2010/0218540 A1 | 9/2010 | McCollough et al. |
| 2010/0218542 A1 | 9/2010 | McCollough et al. |
| 2010/0251730 A1 | 10/2010 | Whillock, Sr. |
| 2010/0257888 A1 | 10/2010 | Kang et al. |
| 2010/0293969 A1 | 11/2010 | Braithwaite et al. |
| 2010/0313594 A1 | 12/2010 | Lee et al. |
| 2010/0319367 A1 | 12/2010 | Kim et al. |
| 2010/0326093 A1 | 12/2010 | Watson et al. |
| 2011/0005263 A1 | 1/2011 | Yamaguchi et al. |
| 2011/0023502 A1 | 2/2011 | Ito et al. |
| 2011/0062308 A1 | 3/2011 | Hammond et al. |
| 2011/0146312 A1 | 6/2011 | Hong et al. |
| 2011/0192175 A1 | 8/2011 | Kuratani et al. |
| 2011/0214447 A1 | 9/2011 | Bortoletto et al. |
| 2011/0239686 A1 | 10/2011 | Zhang et al. |
| 2011/0265498 A1 | 11/2011 | Hall |
| 2012/0007264 A1 | 1/2012 | Kondou et al. |
| 2012/0023996 A1 | 2/2012 | Herrera et al. |
| 2012/0047918 A1 | 3/2012 | Herrera et al. |
| 2012/0073538 A1 | 3/2012 | Hofbauer |
| 2012/0085302 A1 | 4/2012 | Cleeves |
| 2012/0174613 A1 | 7/2012 | Park et al. |
| 2012/0223996 A1 | 9/2012 | Ernst et al. |

(56) References Cited

U.S. PATENT DOCUMENTS

| | | |
|---|---|---|
| 2012/0240613 A1 | 9/2012 | Saito et al. |
| 2013/0276468 A1 | 10/2013 | Buehrle et al. |
| 2013/0291582 A1 | 11/2013 | Cox |

FOREIGN PATENT DOCUMENTS

| | | |
|---|---|---|
| CN | 102353193 A | 2/2012 |
| DE | 202006012499 U1 | 11/2006 |
| DE | 102008042910 A1 | 4/2010 |
| EP | 1821051 A1 | 8/2007 |
| EP | 2078907 A2 | 7/2009 |
| EP | 2444761 A2 | 4/2012 |
| EP | 2743608 A2 | 6/2014 |
| FR | 2771159 A1 | 5/1999 |
| GB | 657353 A | 9/1951 |
| GB | 2139337 A | 11/1984 |
| JP | 60141239 A | 7/1985 |
| JP | 61071877 A | 4/1986 |
| JP | 01196478 A | 8/1989 |
| JP | 01210778 A | 8/1989 |
| JP | 01310277 A | 12/1989 |
| JP | 024185 A | 1/1990 |
| JP | 0231649 A | 2/1990 |
| JP | 02143070 A | 6/1990 |
| JP | 3158670 A | 7/1991 |
| JP | 0415069 A | 1/1992 |
| JP | 5001870 A | 1/1993 |
| JP | 05248746 A | 9/1993 |
| JP | 5332562 A | 12/1993 |
| JP | 6003005 A | 1/1994 |
| JP | 06011219 A | 1/1994 |
| JP | 06323704 A | 11/1994 |
| JP | 10227547 A | 8/1998 |
| JP | 10253212 A | 9/1998 |
| JP | 11223434 A | 8/1999 |
| JP | 2000039240 A | 2/2000 |
| JP | 2000346506 A | 12/2000 |
| JP | 2001041620 A | 2/2001 |
| JP | 2001041624 A | 2/2001 |
| JP | 3158673 A | 4/2001 |
| JP | 2001221545 A | 8/2001 |
| JP | 2002139268 A | 5/2002 |
| JP | 2002295934 A | 10/2002 |
| JP | 2002350019 A | 12/2002 |
| JP | 2003042612 A | 2/2003 |
| JP | 2003172564 A | 6/2003 |
| JP | 2003232587 A | 8/2003 |
| JP | 2003269830 A | 9/2003 |
| JP | 2003279214 A | 10/2003 |
| JP | 2003336947 A | 11/2003 |
| JP | 2004053036 A | 2/2004 |
| JP | 2004278894 A | 10/2004 |
| JP | 2004278990 A | 10/2004 |
| JP | 2005164145 A | 6/2005 |
| JP | 2005180825 A | 7/2005 |
| JP | 2005195315 A | 7/2005 |
| JP | 2005331200 A | 12/2005 |
| JP | 2006022980 A | 1/2006 |
| JP | 2006323704 A | 11/2006 |
| JP | 2007232336 A | 9/2007 |
| JP | 4161774 B2 | 10/2008 |
| JP | 4260764 B2 | 4/2009 |
| JP | 4333202 B2 | 9/2009 |
| JP | 2010041624 A | 2/2010 |
| KR | 20010109256 A | 12/2001 |
| KR | 2006013721 A | 2/2006 |
| KR | 20060126156 A | 12/2006 |
| KR | 100845860 B1 | 7/2008 |
| KR | 20100123089 A | 11/2010 |
| KR | 20110037609 a | 4/2011 |
| SU | 1747821 A1 | 7/1992 |
| TW | 424878 B | 3/2001 |
| WO | 8808946 A1 | 11/1988 |
| WO | 2008052736 A1 | 5/2008 |
| WO | 2008056957 A2 | 5/2008 |
| WO | 2008061179 A2 | 5/2008 |
| WO | 2008143451 A1 | 11/2008 |
| WO | 2012002761 A2 | 1/2012 |

OTHER PUBLICATIONS

"Nickel Alloys for Electronics," A Nickel Development Institute Reference Book, 1988, 131 pages, Series N 11 002, NiDI Nickel Development Institute.

Daehn, "High-Velocity Metal Forming," ASM Handbook, 2006, pp. 405-418, vol. 14B, ASM International.

Daehn, et al., "Hyperplastic Forming: Process Potential and Factors Affecting Formability," MRS Proceedings, 1999, at p. 147, vol. 601.

Uimbert et al., "Flanging and Hemming of Auto Body Panels using the Electro Magnetic Forming Technology," 3rd International Conference on High Speed Forming, 2008, pp. 163-172.

Shang et al., "Electromagnetically assisted sheet metal stamping," Journal of Materials Processing Technology, 2010, pp. 868-874, 211.

Merriam-Webster definition of oscillate, http://www.Merriam-Webster.com/dictionary/oscillate, pp. 1-4, accessed from internet Aug. 6, 2015.

European Search Report, dated Jan. 30, 2017, U.S. Pat. No. 2,743,611; pp. 1-12.

European Patent Office, "European Search Report", issued in connection with European Patent Application No. 13194679.0, dated Nov. 7, 2016, 10 pages.

European Patent Office, "Extended European Search Report", issued in connection with EP Application No. 13194682.4, dated Jul. 15, 2015, 25 pages.

European Search Report, dated Mar. 10, 2015, U.S. Pat. No. 2,784,416, pp. 1-7.

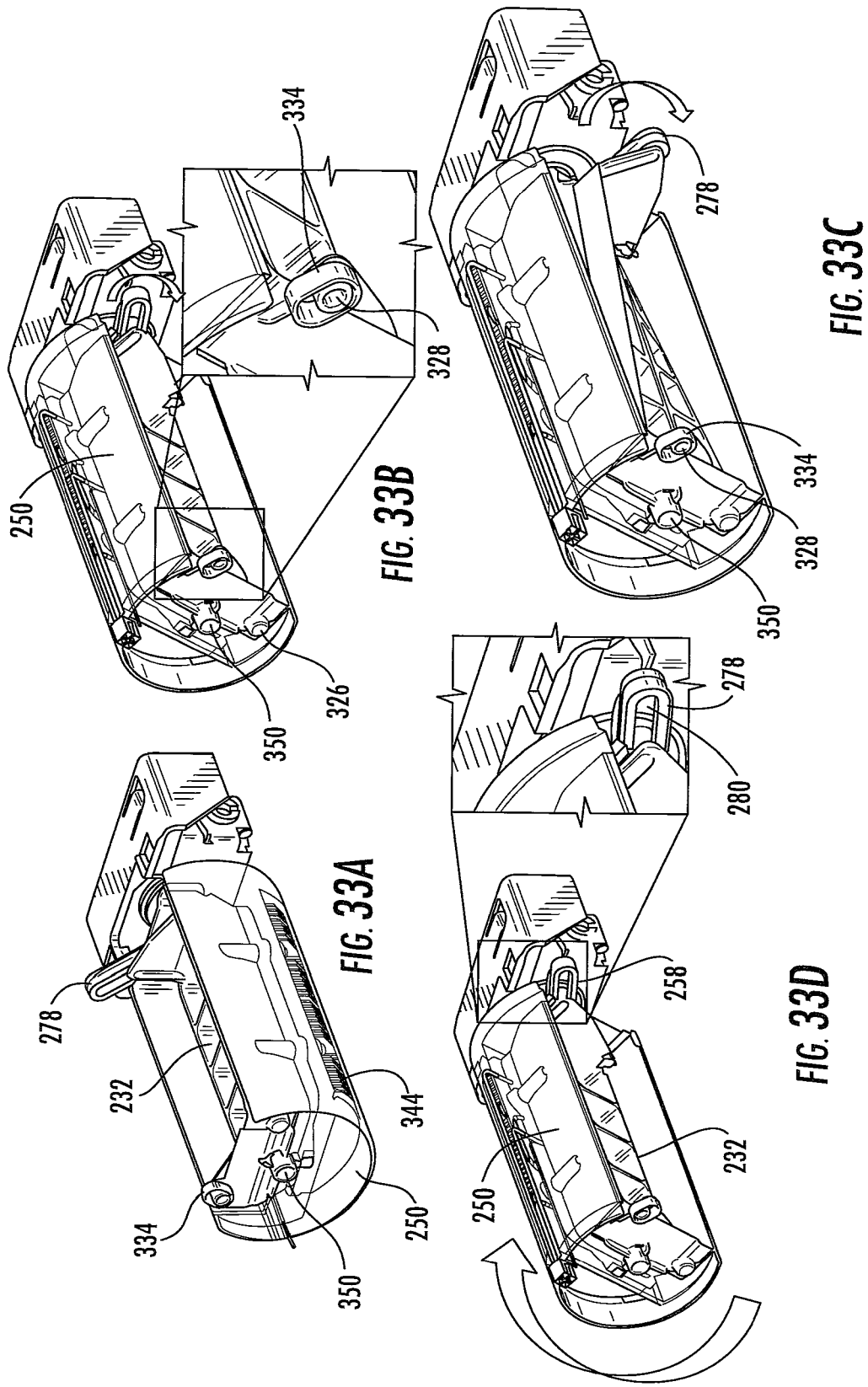

LAYERING OF LOW THERMAL CONDUCTIVE MATERIAL ON METAL TRAY

RELATED APPLICATIONS

The present application is a continuation of U.S. patent application Ser. No. 15/463,501 entitled "LAYERING OF LOW THERMAL CONDUCTIVE MATERIAL ON METAL TRAY" filed on Mar. 20, 2017. U.S. patent application Ser. No. 15/463,501 is a continuation of U.S. patent application Ser. No. 15/095,995 entitled "LAYERING OF LOW THERMAL CONDUCTIVE MATERIAL ON METAL TRAY" filed on Apr. 11, 2016, now U.S. Pat. No. 9,599,387. U.S. patent application Ser. No. 15/095,995 is a division of U.S. patent application Ser. No. 13/713,206 entitled "Layering of Low Thermal Conductive Material on Metal Tray" filed on Dec. 13, 2012, now U.S. Pat. No. 9,310,115, the entire contents of which is hereby incorporated by reference.

U.S. patent application Ser. No. 13/713,206 is related to, and hereby incorporates by reference the entire disclosures of, the following applications for United States patents: U.S. patent application Ser. No. 13/713,283, entitled "Ice Maker with Rocking Cold Plate," filed on Dec. 13, 2012; U.S. patent application Ser. No. 13/713,199, entitled "Clear Ice Maker with Warm Air Flow," filed on Dec. 13, 2012; U.S. patent application Ser. No. 13/713,296, entitled "Clear Ice Maker with Varied Thermal Conductivity," filed on Dec. 13, 2012; U.S. patent application Ser. No. 13/713,244, entitled "Clear Ice Maker," filed on Dec. 13, 2012; U.S. patent application Ser. No. 13/713,233, entitled "Clear Ice Maker," filed on Dec. 13, 2012; U.S. patent application Ser. No. 13/713,228, entitled "Twist Harvest Ice Geometry," filed on Dec. 13, 2012; U.S. patent application Ser. No. 13/713,262, now U.S. Pat. No. 9,303,903, entitled "Cooling System for Ice Maker," filed on Dec. 13, 20112; U.S. patent application Ser. No. 13/713,218, entitled "Clear Ice Maker and Method for Forming Clear Ice," filed on Dec. 13, 2012; U.S. patent application Ser. No. 13/713,253, entitled "Clear Ice Maker and Method for Forming Clear Ice," filed on Dec. 13, 2012. The entire contents of each of the above applications are hereby incorporated by reference.

FIELD OF THE INVENTION

The present invention generally relates to an ice maker for making substantially clear ice pieces, and methods for the production of clear ice pieces. More specifically, the present invention generally relates to an ice maker and methods which are capable of making substantially clear ice without the use of a drain.

BACKGROUND OF THE INVENTION

During the ice making process when water is frozen to form ice cubes, trapped air tends to make the resulting ice cubes cloudy in appearance. The trapped air results in an ice cube which, when used in drinks, can provide an undesirable taste and appearance which distracts from the enjoyment of a beverage. Clear ice requires processing techniques and structure which can be costly to include in consumer refrigerators and other appliances. There have been several attempts to manufacture clear ice by agitating the ice cube trays during the freezing process to allow entrapped gases in the water to escape.

SUMMARY OF THE INVENTION

One aspect of the present invention includes an ice making assembly within an appliance with a housing having an inlet and an outlet, and a lower portion and an upper portion. The assembly includes a rotatable shroud within the housing with a first slot in air communication with the inlet, and a second slot in air communication with the outlet. A thermoelectric device with a top side and a bottom side, and having a heat sink on the bottom side between the first slot and the second slot. An ice tray disposed above and thermally connected with the top side, a barrier wall within the housing and in contact with the shroud between the lower portion and the upper portion.

Another aspect of the present invention is a clear ice making assembly having a housing with a first air chamber, a second air chamber, a barrier wall separating the first air chamber and the second air chamber, an inlet in the second air chamber, and an outlet in the second air chamber. A shroud rotatably disposed within the housing and having a first slot adjacent to the inlet, and a second slot adjacent to the outlet. A thermoelectric device with a cold side and a warm side, a heat sink on the warm side between the first slot and the second slot, and an ice tray in thermal communication with the cold side.

Another aspect of the present invention is a method of making clear ice, including the steps of attaching an ice tray within a rotatable shroud within a housing, filling a twistable ice tray with water, oscillating the ice tray, freezing the water within the ice tray by thermally connecting a cold side of a thermoelectric device with a bottom side of the ice tray, removing heat from a warm side of the thermoelectric device by attaching a heat sink to the warm side and disposing the heat sink between a first slot and a second slot of the shroud, cooling the heat sink by urging an amount of cooling air through an inlet in the housing, through the first slot in the shroud, through the heat sink, out the second slot in the shroud, and then out an outlet in the housing; and ensuring the water freezes from the bottom up by preventing the cooling air from reaching a top portion of the ice tray using a barrier wall in contact with the shroud.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIGS. 33A-33D are top perspective views of an ice maker according to the present invention, during harvesting, through its transition from the neutral position (33A), inversion (33B), rotation of the grid (33C), and twisting of the grid (33D);

DETAILED DESCRIPTION

Figure 2:
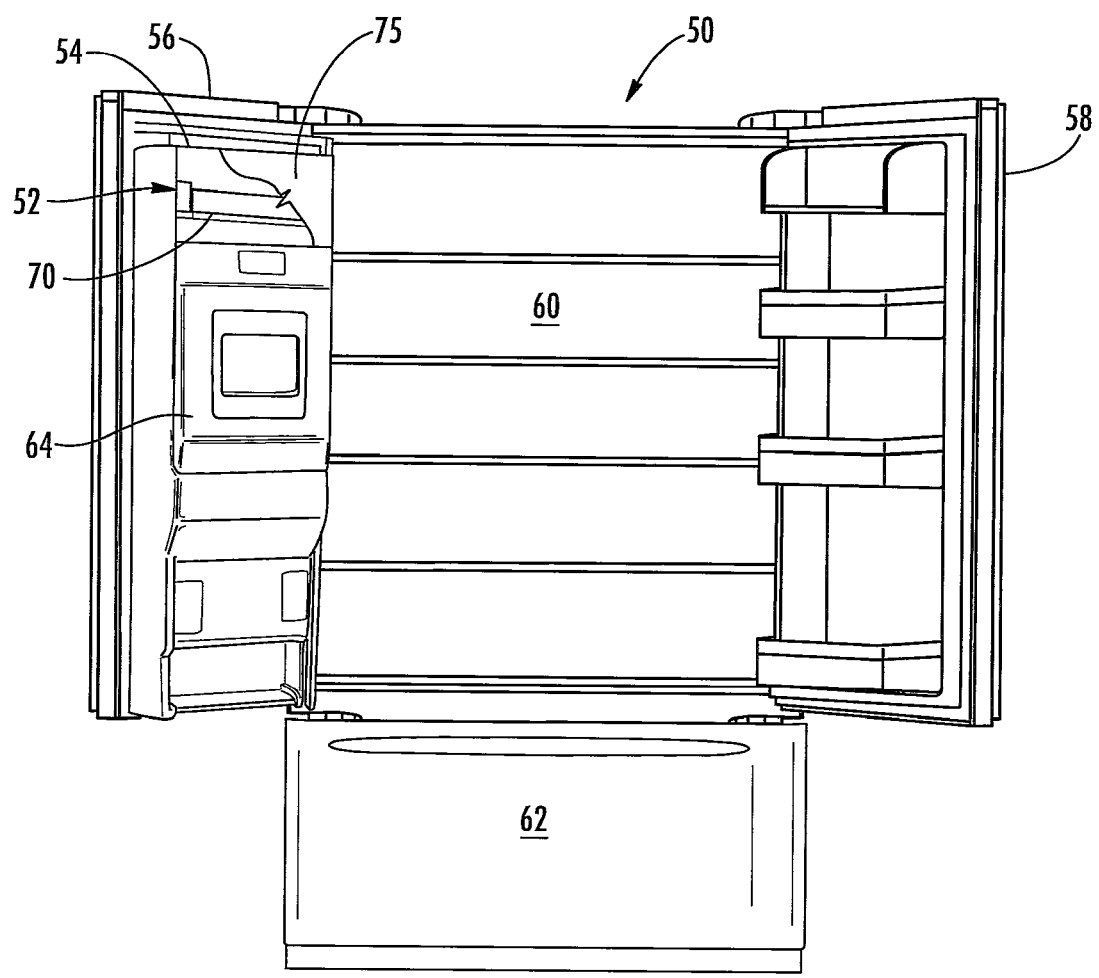
FIG. 2 is a front view of an appliance with open doors, having an ice maker of the present invention.

For purposes of description herein, the terms "upper," "lower," "right," "left," "rear," "front," "vertical," "horizontal," and derivatives thereof shall relate to the ice maker assembly 52, 210 as oriented in FIG. 2 unless stated otherwise. However, it is to be understood that the ice maker assembly may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
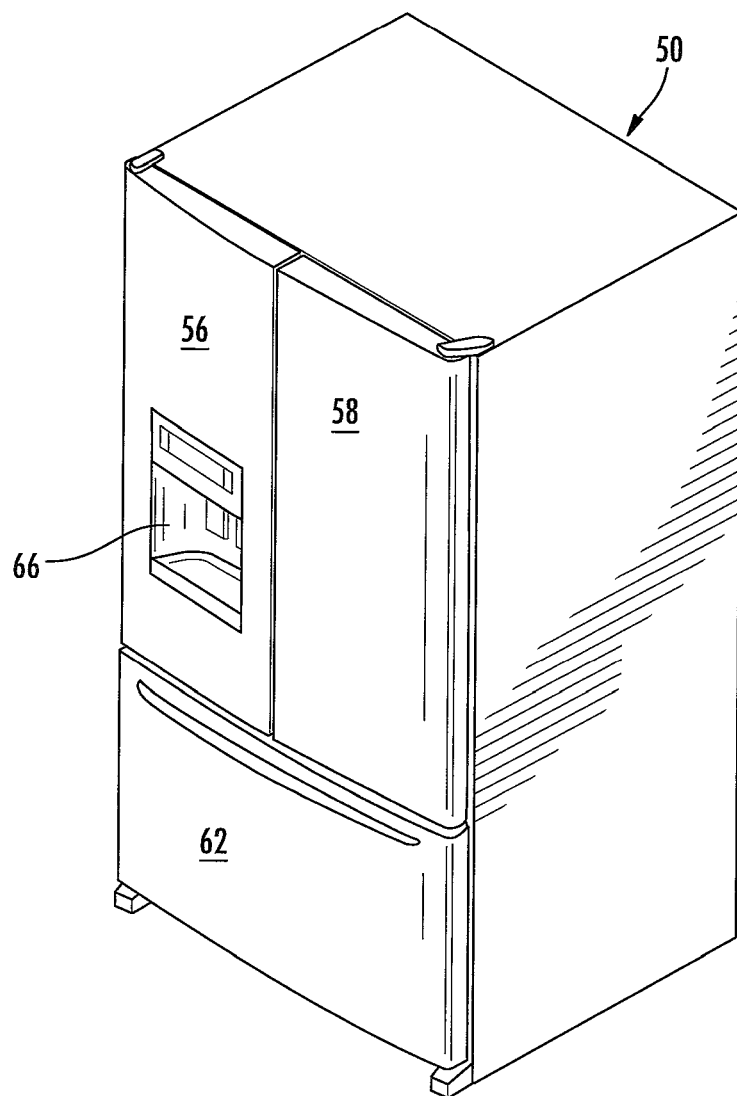
FIG. 1 is a top perspective view of an appliance having an ice maker of the present invention.

Referring initially to FIGS. 1-2, there is generally shown a refrigerator 50, which includes an ice maker 52 contained within an ice maker housing 54 inside the refrigerator 50. Refrigerator 50 includes a pair of doors 56, 58 to the refrigerator compartment 60 and a drawer 62 to a freezer compartment (not shown) at the lower end. The refrigerator 50 can be differently configured, such as with two doors, the freezer on top, and the refrigerator on the bottom or a side-by-side refrigerator/freezer. Further, the ice maker 52 may be housed within refrigerator compartment 60 or freezer compartment or within any door of the appliance as desired. The ice maker could also be positioned on an outside surface of the appliance, such as a top surface as well.

The ice maker housing 54 communicates with an ice cube storage container 64, which, in turn, communicates with an ice dispenser 66 such that ice 98 can be dispensed or otherwise removed from the appliance with the door 56 in the closed position. The dispenser 66 is typically user activated.

In one aspect, the ice maker 52 of the present invention employs varied thermal input to produce clear ice pieces 98 for dispensing. In another aspect the ice maker of the present invention employs a rocking motion to produce clear ice pieces 98 for dispensing. In another, the ice maker 52 uses materials of construction with varying conductivities to produce clear ice pieces for dispensing. In another aspect, the icemaker 52 of the present invention is a twist-harvest ice maker 52. Any one of the above aspects, or any combination thereof, as described herein may be used to promote the formation of clear ice. Moreover, any aspect of the elements of the present invention described herein may be used with other embodiments of the present invention described, unless clearly indicated otherwise.

Figure 3:
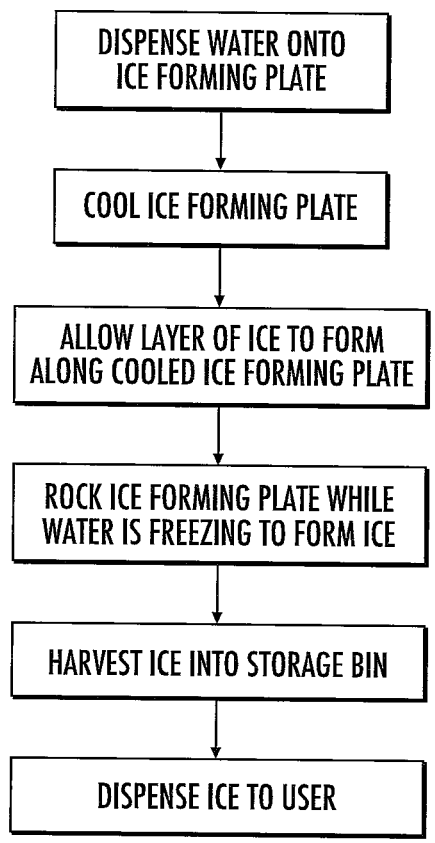
FIG. 3 is a flow chart illustrating one process for producing clear ice according to the invention.

In general, as shown in FIG. 3, the production of clear ice 98 includes, but may not be limited to, the steps of: dispensing water onto an ice forming plate 76, cooling the ice forming plate 76, allowing a layer of ice to form along the cooled ice forming plate 76, and rocking the ice forming plate 76 while the water is freezing. Once the clear ice 98 is formed, the ice 98 is harvested into a storage bin 64. From the storage bin 64, the clear ice 98 is available for dispensing to a user.

In certain embodiments, multiple steps may occur simultaneously. For example, the ice forming plate 76 may be cooled and rocked while the water is being dispensed onto the ice forming plate 76. However, in other embodiments, the ice forming plate 76 may be held stationary while water is dispensed, and rocked only after an initial layer of ice 98 has formed on the ice forming plate 76. Allowing an initial layer of ice to form prior to initiating a rocking movement prevents flash freezing of the ice or formation of a slurry, which improves ice clarity.

In one aspect of the invention, as shown in FIGS. 4-12, an ice maker 52 includes a twist harvest ice maker 52 which utilizes oscillation during the freezing cycle, variations in conduction of materials, a cold air 182 flow to remove heat from the heat sink 104 and cool the underside of the ice forming plate 76 and a warm air 174 flow to produce clear ice pieces 98. In this embodiment, one driving motor 112, 114 is typically present on each end of the ice tray 70.

Figure 4:
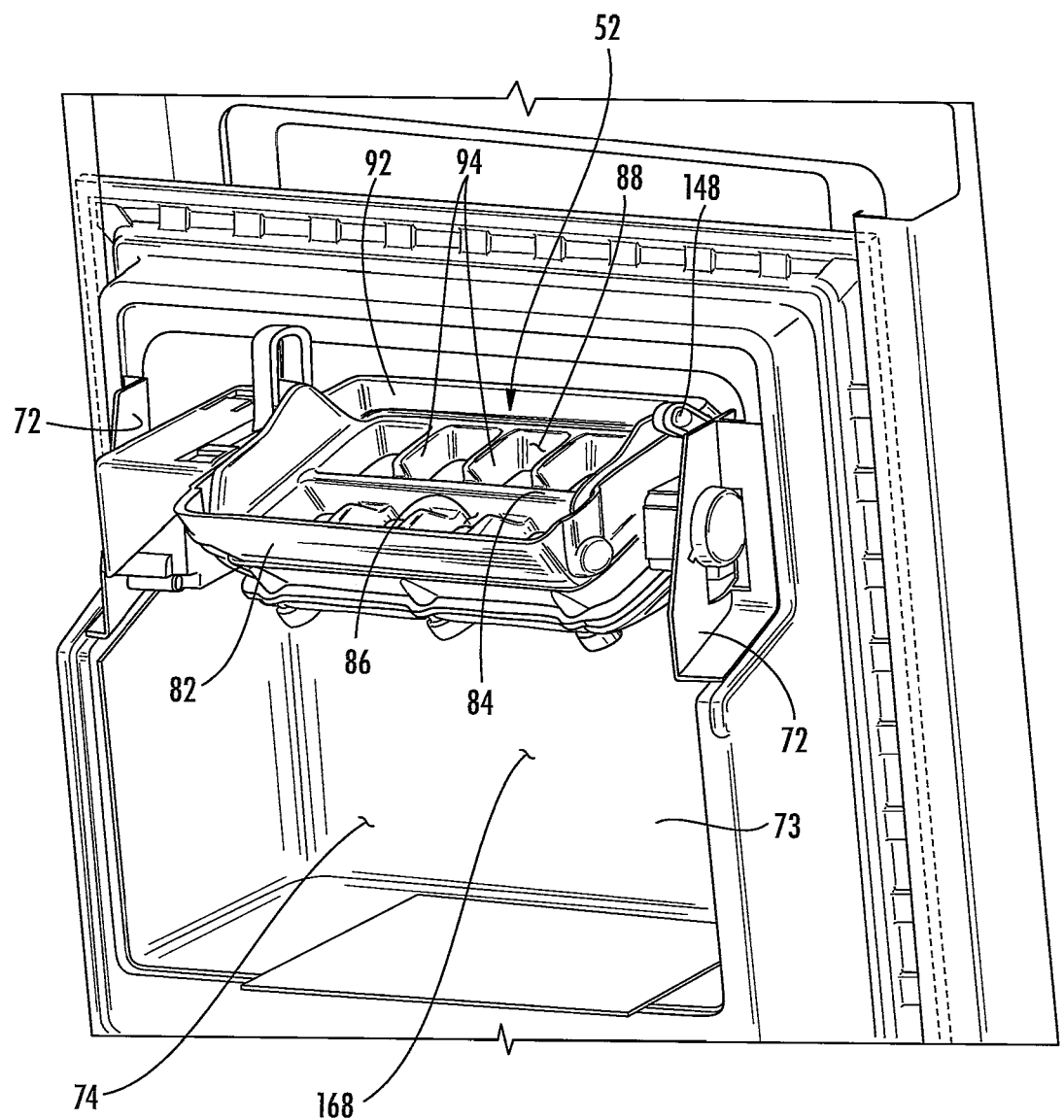
FIG. 4 is a top perspective view of a door of an appliance having a first embodiment of an ice maker according to the present invention.

In the embodiment depicted in FIGS. 4-12, an ice tray 70 is horizontally suspended across and pivotally coupled to stationary support members 72 within an ice maker housing 54. The housing 54 may be integrally formed with a door liner 73, and include the door liner 73 with a cavity 74 therein, and a cover 75 pivotally coupled with a periphery of the cavity 74 to enclose the cavity 74. The ice tray 70, as depicted in FIG. 4, includes an ice forming plate 76, with a top surface 78 and a bottom surface 80. Typically, a containment wall 82 surrounds the top surface 78 of the ice forming plate 76 and extends upwards around the periphery thereof. The containment wall 82 is configured to retain water on the top surface 78 of the ice forming plate 76. A median wall 84 extends orthogonally from the top surface 78 of the ice forming plate 76 along a transverse axis thereof, dividing the ice tray 70 into at least two reservoirs 86, 88, with a first reservoir 86 defined between the median wall 84 and a first sidewall 90 of the containment wall 82 and a second reservoir 88 defined between the median wall 84 and a second sidewall 92 of the containment wall 82, which is generally opposing the first sidewall 90 of the containment wall 82. Further dividing walls 94 extend generally orthogonally from the top surface 78 of the ice forming plate 76 generally perpendicularly to the median wall 84. These dividing walls 94 further separate the ice tray 70 into an array of individual compartments 96 for the formation of clear ice pieces 98.

A grid 100 is provided, as shown in FIGS. 4-12B which forms the median wall 84 the dividing walls 94, and an edge wall 95. As further described, the grid 100 is separable from the ice forming plate 76 and the containment wall 82, and is preferably resilient and flexible to facilitate harvesting of the clear ice pieces 98.

Figure 6:
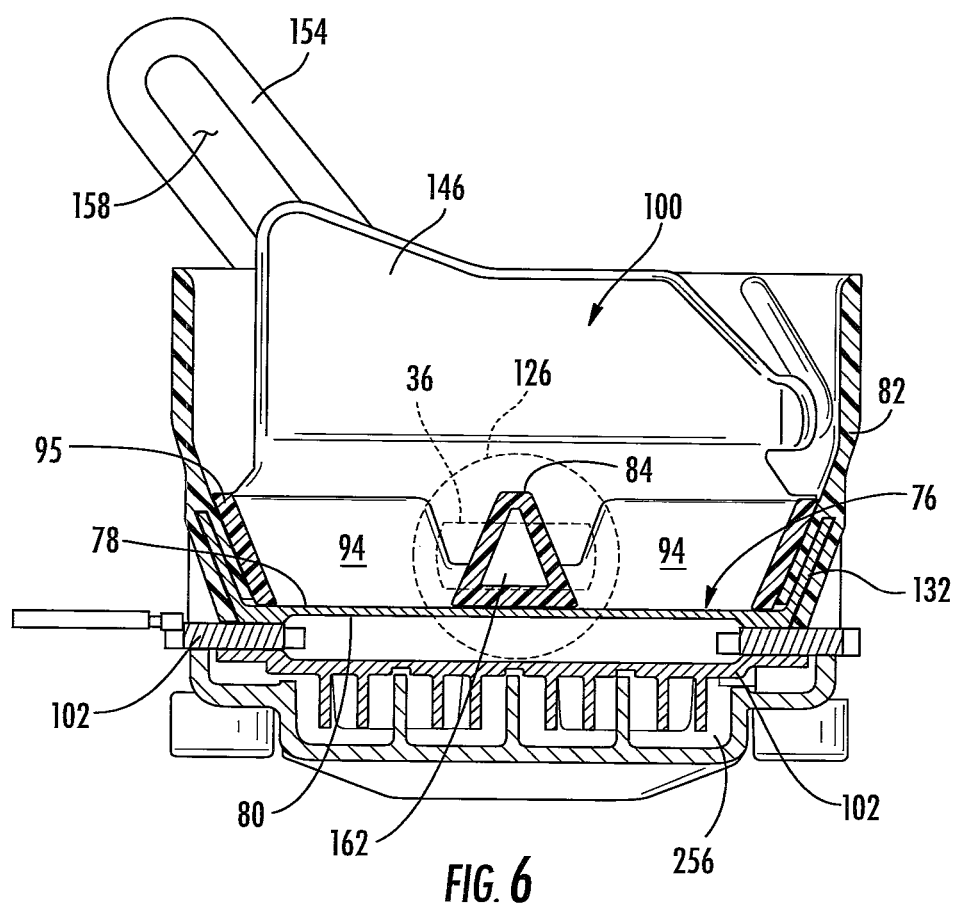
FIG. 6 is a cross sectional view of an ice maker according to the present invention taken along the line 6-6 in FIG. 5.

As shown in FIG. 6, a thermoelectric device 102 is physically affixed and thermally connected to the bottom surface 80 of the ice forming plate 76 to cool the ice forming plate 76, and thereby cool the water added to the top surface 78 of the ice forming plate 76. The thermoelectric device 102 is coupled to a heat sink 104, and transfers heat from the bottom surface 80 of the ice forming plate 76 to the heat sink 104 during formation of clear ice pieces 98. One example of such a device is a thermoelectric plate which can be coupled to a heat sink 104, such as a Peltier-type thermoelectric cooler.

As shown in FIGS. 5 and 7A-7F, in one aspect the ice tray 70 is supported by and pivotally coupled to a rocker frame 110, with an oscillating motor 112 operably connected to the rocker frame 110 and ice tray 70 at one end 138, and a harvest motor 114 operably connected to the ice tray 70 at a second end 142.

Figure 12A:
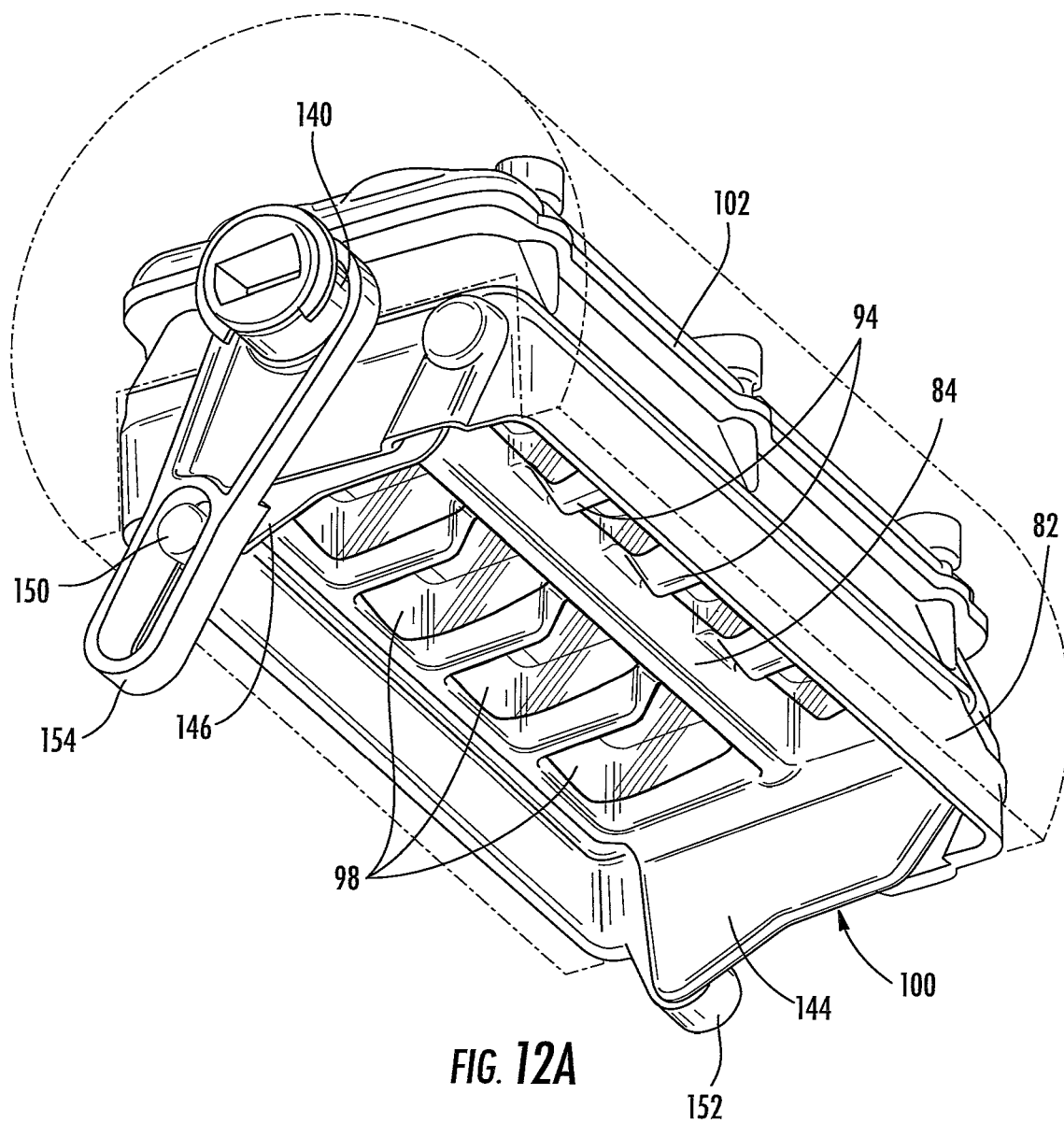
FIG. 12A is a bottom perspective view of an ice maker of the present invention in the inverted position and with the frame and motors removed for clarity.
Figure 12B:
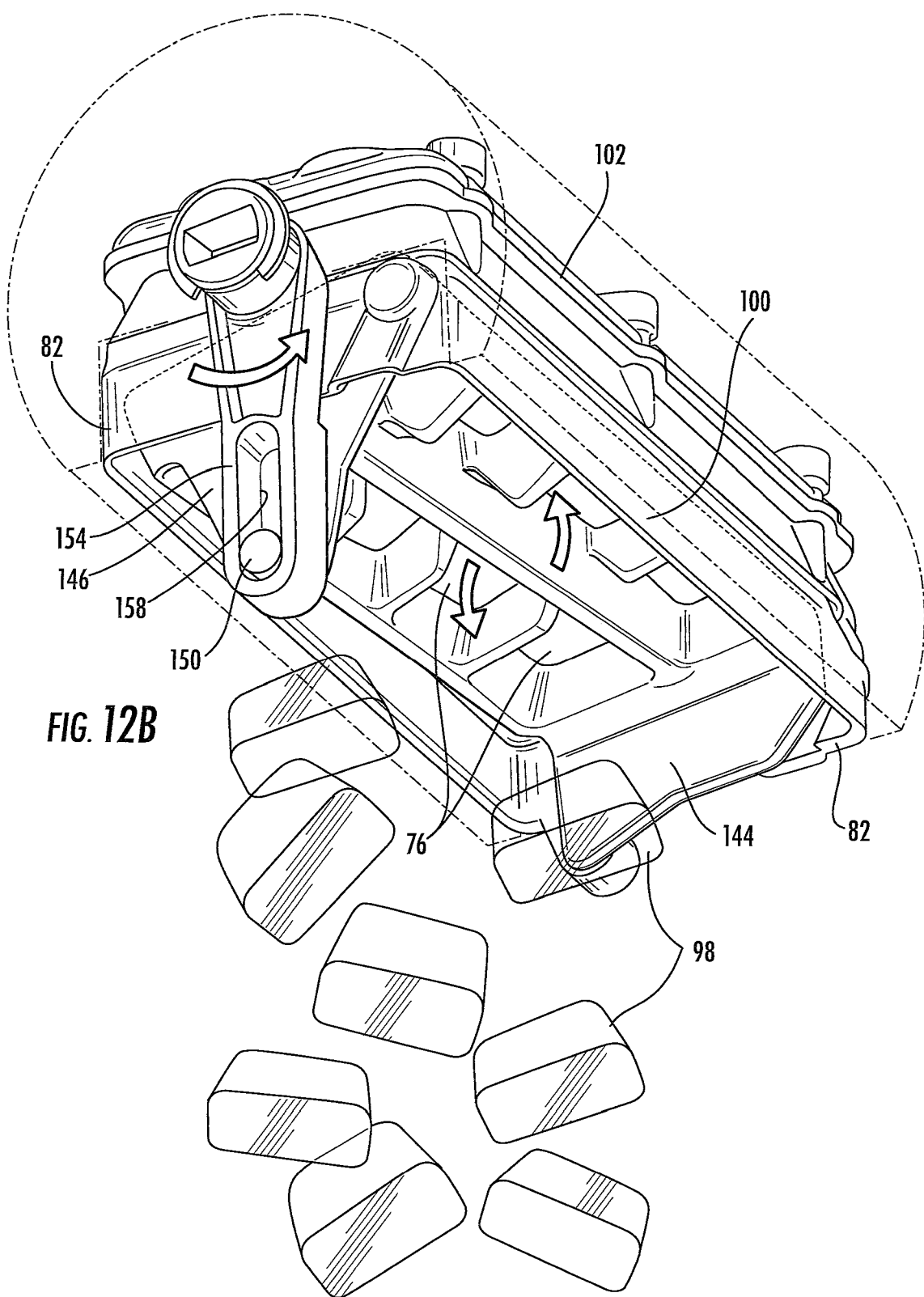
FIG. 12B is a bottom perspective view of the ice maker shown in FIG. 12A, in the twisted harvest position and with the frame and motors removed for clarity.

The rocker frame 110 is operably coupled to an oscillating motor 112, which rocks the frame 110 in a back and forth motion, as illustrated in FIGS. 7A-7F. As the rocker frame 110 is rocked, the ice tray 70 is rocked with it. However, during harvesting of the clear ice pieces 98, the rocker frame remains 110 stationary and the harvest motor 114 is actuated. The harvest motor 114 rotates the ice tray 70 approximately 120°, as shown in FIGS. 12A and 12B, until a stop 116, 118 between the rocker frame 110 and ice forming plate 76 prevents the ice forming plate 76 and containment wall 82 from further rotation. Subsequently, the harvest motor 114 continues to rotate the grid 100, twisting the grid 100 to release clear ice pieces 98, as illustrated in FIG. 12B.

Having briefly described the overall components and their orientation in the embodiment depicted in FIGS. 4-12B, and their respective motion, a more detailed description of the construction of the ice maker 52 is now presented.

The rocker frame 110 in the embodiment depicted in FIGS. 4-12B includes a generally open rectangular member 120 with a longitudinally extending leg 122, and a first arm 124 at the end 138 adjacent the oscillating motor 112 and coupled to a rotary shaft 126 of the oscillating motor 112 by a metal spring clip 128. The oscillating motor 112 is fixedly secured to a stationary support member 72 of the refrigerator 50. The frame 110 also includes a generally rectangular housing 130 at the end 142 opposite the oscillating motor 112 which encloses and mechanically secures the harvest motor 114 to the rocker frame 110. This can be accomplished by snap-fitting tabs and slots, threaded fasteners, or any other conventional manner, such that the rocker frame 110 securely holds the harvest motor 114 coupled to the ice tray 70 at one end 138, and the opposite end 142 of the ice tray 70 via the arm 124. The rocker frame 110 has sufficient strength to support the ice tray 70 and the clear ice pieces 98 formed therein, and is typically made of a polymeric material or blend of polymeric materials, such as ABS (acrylonitrile, butadiene, and styrene), though other materials with sufficient strength are also acceptable.

Figure 5:
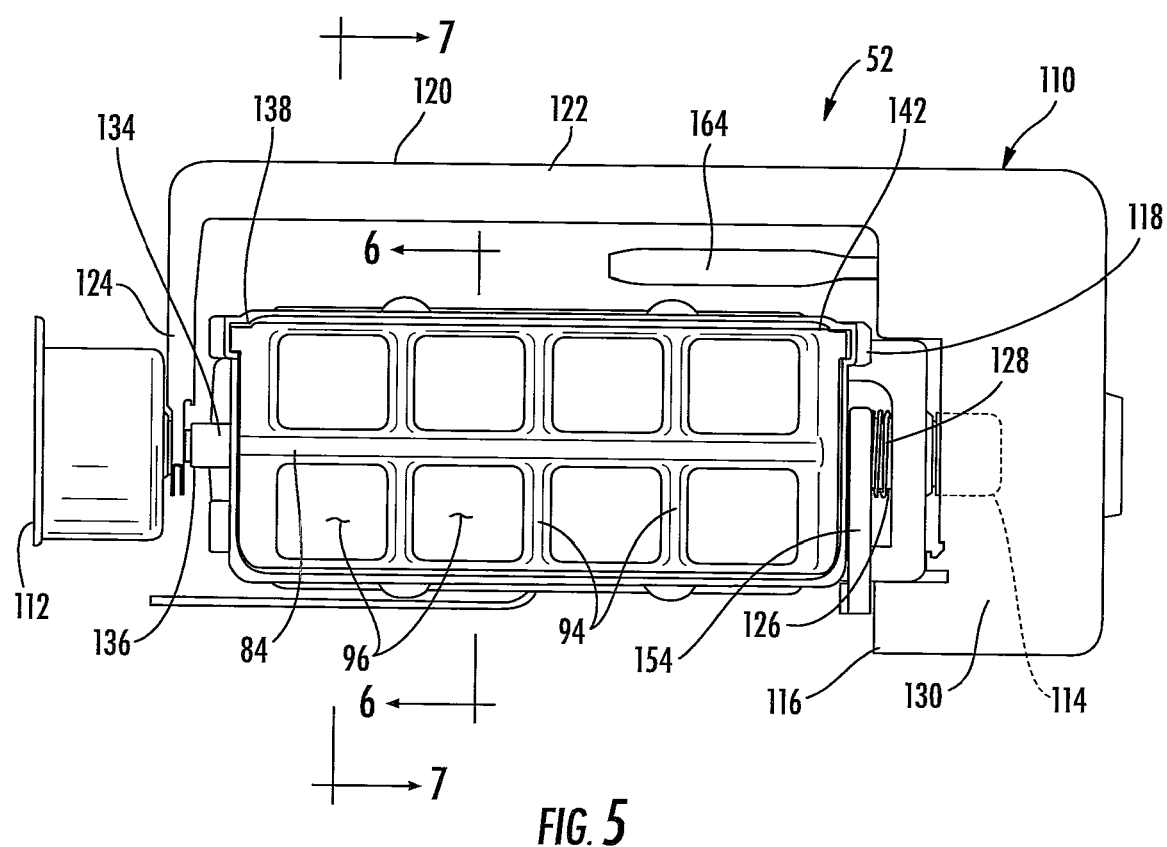
FIG. 5 is a top view of an ice maker according to the present invention.

As shown in FIG. 5, the ice forming plate 76 is also generally rectangular. As further shown in the cross-sectional view depicted in FIG. 6, the ice forming plate 76 has upwardly extending edges 132 around its exterior, and the containment wall 82 is typically integrally formed over the upwardly extending edges 132 to form a water-tight assembly, with the upwardly extending edge 132 of the ice forming plate 76 embedded within the lower portion of the container wall 82. The ice forming plate 76 is preferably a thermally conductive material, such as metal. As a non-limiting example, a zinc-alloy is corrosion resistant and suitably thermally conductive to be used in the ice forming plate 76. In certain embodiments, the ice forming plate 76 can be formed directly by the thermoelectric device 102, and in other embodiments the ice forming plate 76 is thermally linked with thermoelectric device 102. The containment walls 82 are preferably an insulative material, including, without limitation, plastic materials, such as polypropylene. The containment wall 82 is also preferably molded over the upstanding edges 132 of the ice forming plate 76, such as by injection molding, to form an integral part with the ice forming plate 76 and the containment wall 82. However, other methods of securing the containment wall 82, including, without limitation, mechanical engagement or an adhesive, may also be used. The containment wall 82 may diverge outwardly from the ice forming plate 76, and then extend in an upward direction which is substantially vertical.

The ice tray 70 includes an integral axle 134 which is coupled to a drive shaft 136 of the oscillating motor 112 for supporting a first end of the ice tray 138. The ice tray 70 also includes a second pivot axle 140 at an opposing end 142 of the ice tray 70, which is rotatably coupled to the rocker frame 110.

The grid 100, which is removable from the ice forming plate 76 and containment wall 82, includes a first end 144 and a second end 146, opposite the first end 144. Where the containment wall 82 diverges from the ice freezing plate 76 and then extends vertically upward, the grid 100 may have a height which corresponds to the portion of the containment wall 82 which diverges from the ice freezing plate 76. As shown in FIG. 4, the wall 146 on the end of the grid 100 adjacent the harvest motor 114 is raised in a generally triangular configuration. A pivot axle 148 extends outwardly from the first end of the grid 144, and a cam pin 150 extends outwardly from the second end 146 of the grid 100. The grid 100 is preferably made of a flexible material, such as a flexible polymeric material or a thermoplastic material or blends of materials. One non-limiting example of such a material is a polypropylene material.

The containment wall 82 includes a socket 152 at its upper edge for receiving the pivot axle 148 of the grid 100. An arm 154 is coupled to a drive shaft 126 of the harvest motor 114, and includes a slot 158 for receiving the cam pin 150 formed on the grid 100.

A torsion spring 128 typically surrounds the internal axle 134 of the containment wall 82, and extends between the arm 154 and the containment wall 82 to bias the containment wall 82 and ice forming plate 76 in a horizontal position, such that the cam pin 150 of the grid 100 is biased in a position of the slot 158 of the arm 154 toward the ice forming plate 76. In this position, the grid 100 mates with the top surface 78 of the ice forming plate 76 in a closely adjacent relationship to form individual compartments 96 that have the ice forming plate defining the bottom and the grid defining the sides of the individual ice forming compartments 96, as seen in FIG. 6.

The grid 100 includes an array of individual compartments 96, defined by the median wall 84, the edge walls 95 and the dividing walls 94. The compartments 96 are generally square in the embodiment depicted in FIGS. 4-12B, with inwardly and downwardly extending sides. As discussed above, the bottoms of the compartments 96 are defined by the ice forming plate 76. Having a grid 100 without a bottom facilitates in the harvest of ice pieces 98 from the grid 100, because the ice piece 98 has already been released from the ice forming plate 76 along its bottom when the ice forming piece 98 is harvested. In the shown embodiment, there are eight such compartments. However, the number of compartments 96 is a matter of design choice, and a greater or lesser number may be present within the scope of this disclosure. Further, although the depiction shown in FIG. 4 includes one median wall 84, with two rows of compartments 96, two or more median walls 84 could be provided.

As shown in FIG. 6, the edge walls 95 of the grid 100 as well as the dividing walls 94 and median wall 84 diverge outwardly in a triangular manner, to define tapered compartments 96 to facilitate the removal of ice pieces 98 therefrom. The triangular area 162 within the wall sections may be filled with a flexible material, such as a flexible silicone material or EDPM (ethylene propylene diene monomer M-class rubber), to provide structural rigidity to the grid 100 while at the same time allowing the grid 100 to flex during the harvesting step to discharge clear ice pieces 98 therefrom.

The ice maker 52 is positioned over an ice storage bin 64. Typically, an ice bin level detecting arm 164 extends over the top of the ice storage bin 64, such that when the ice storage bin 64 is full, the arm 164 is engaged and will turn off the ice maker 52 until such time as additional ice 98 is needed to fill the ice storage bin 64.

Figure 7A:
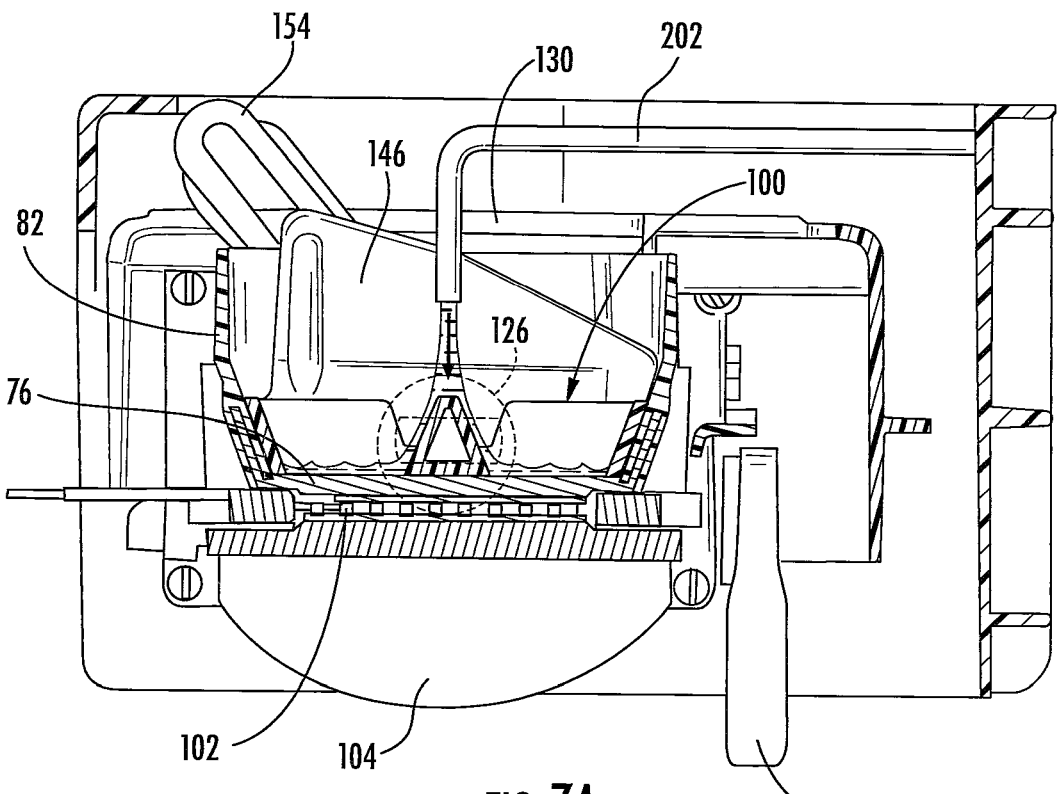
FIG. 7A is a cross sectional view of an ice maker according to the present invention, taken along the line 7-7 in FIG. 5, with water shown being added to an ice tray.
Figure 7B:
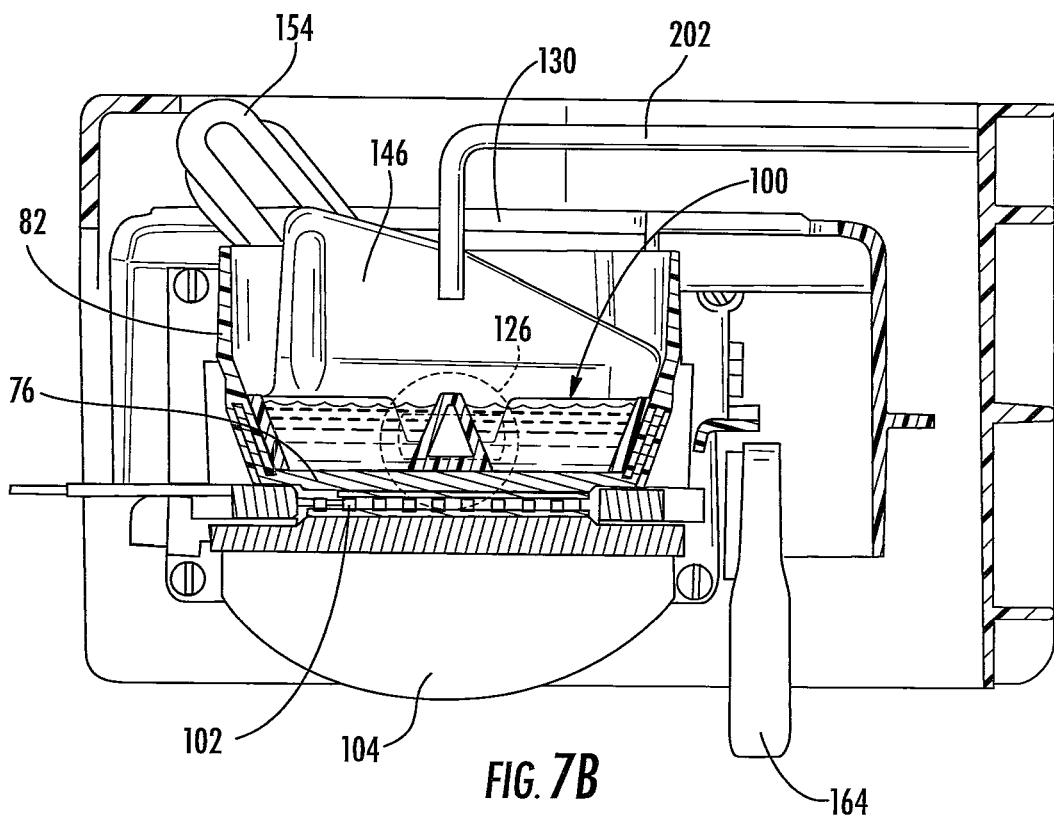
FIG. 7B is a cross sectional view the ice maker of FIG. 7A, with water added to the ice tray.
Figure 7C:
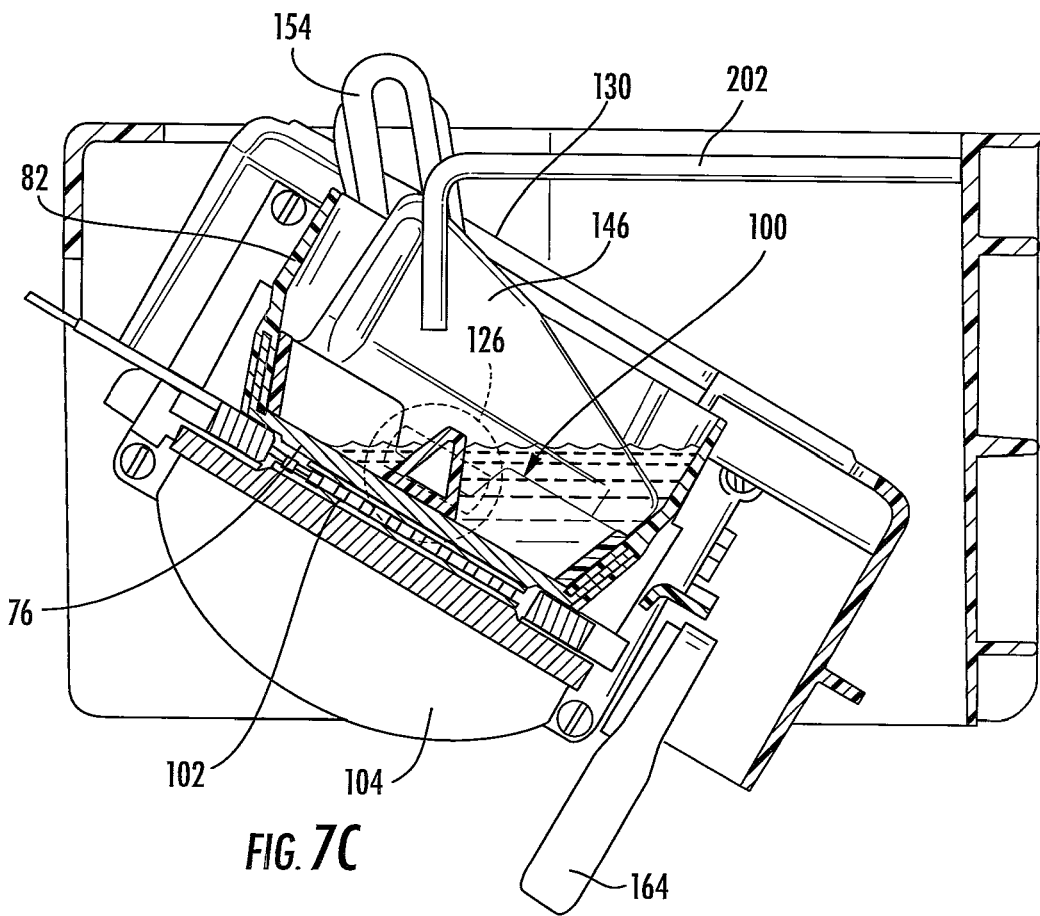
FIGS. 7C-7E are cross sectional views of the ice maker of FIG. 7A, showing the oscillation of the ice maker during a freezing cycle.
Figure 7D:
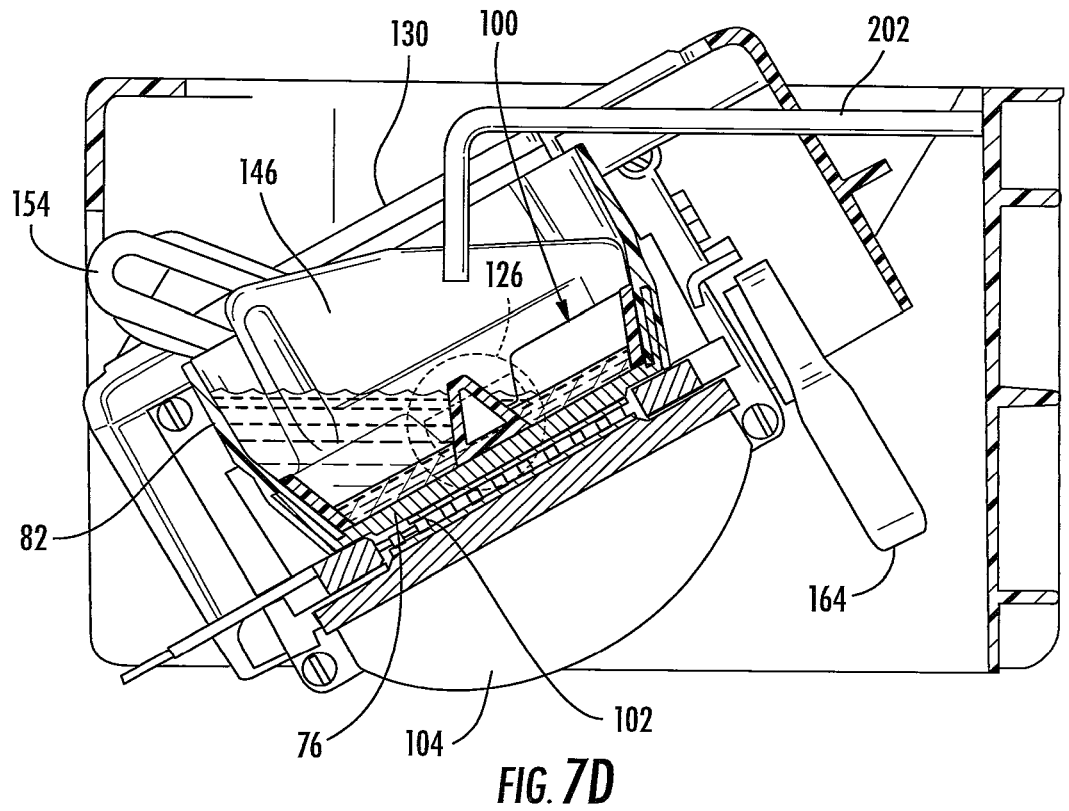
Figure 7E:
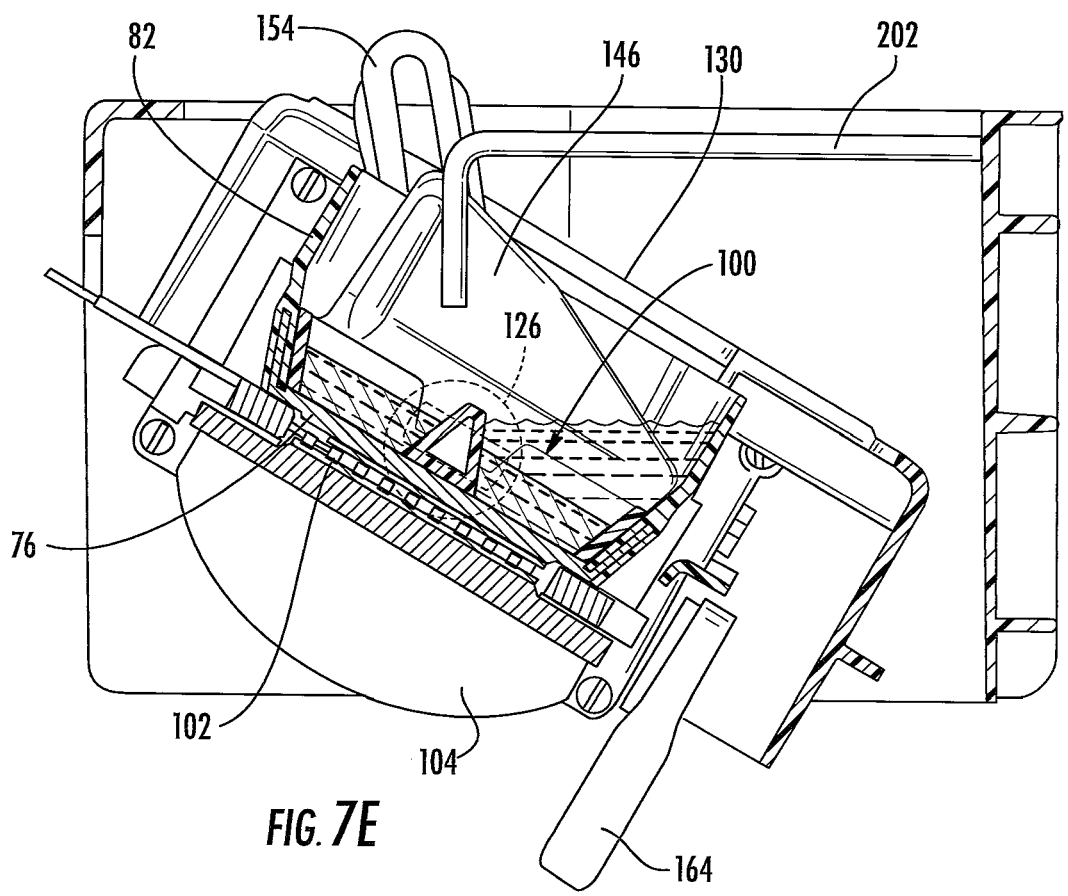
Figure 7F:
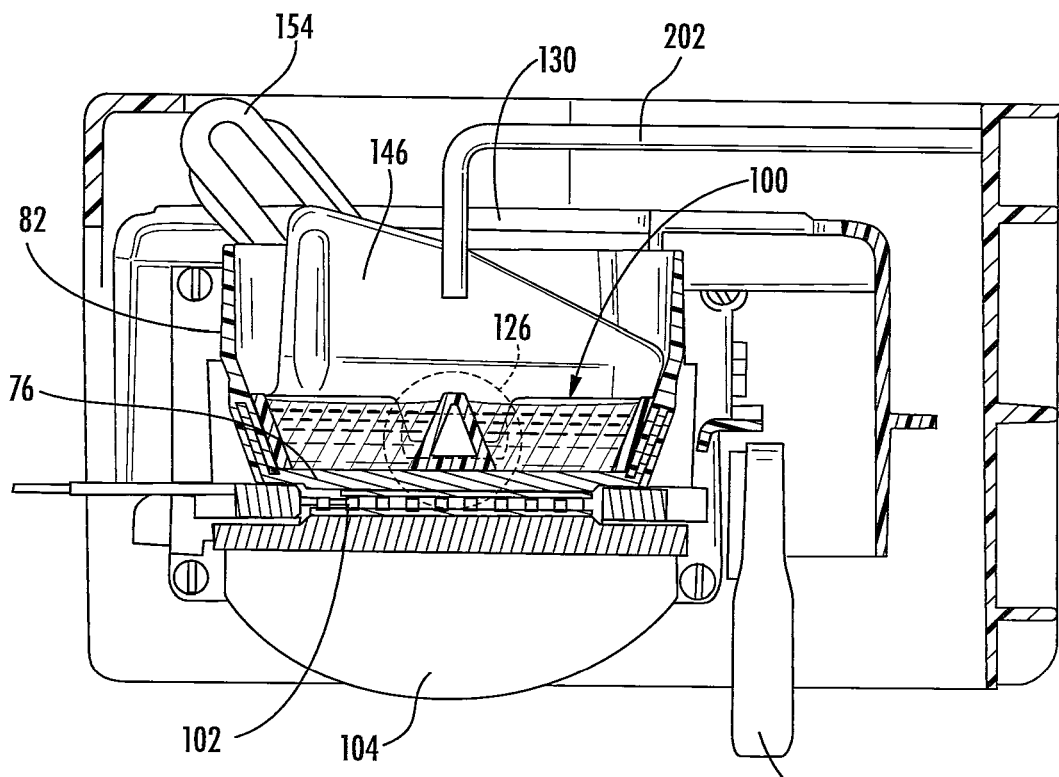
FIG. 7F is a cross sectional view of the ice maker of FIG. 7A, after completion of the freezing cycle.

FIGS. 7A-7F and FIGS. 12A-12B illustrate the ice making process of the ice maker 52. As shown in FIG. 7A, water is first dispensed into the ice tray 70. The thermoelectric cooler devices 102 are actuated and controlled to obtain a temperature less than freezing for the ice forming plate 76. One preferred temperature for the ice forming plate 76 is a temperature of from about −8° F. to about −15° F., but more typically the ice forming plate is at a temperature of about −12° F. At the same time, approximately the same time, or after a sufficient time to allow a thin layer of ice to form on the ice forming plate, the oscillating motor 12 is actuated to rotate the rocker frame 110 and ice cube tray 70 carried thereon in a clockwise direction, through an arc of from about 20° to about 40°, and preferably about 30°. The rotation also may be reciprocal at an angle of about 40° to about 80°. The water in the compartments 96 spills over from one compartment 96 into an adjacent compartment 96 within the ice tray 70, as illustrated in FIG. 7C. The water may also be moved against the containment wall 82, 84 by the oscillating motion. Subsequently, the rocker frame is rotated in the opposite direction, as shown in FIG. 7D, such that the water spills from one compartment 96 into and over the adjacent compartment 96. The movement of water from compartment 96 to adjacent compartment 96 is continued until the water is frozen, as shown in FIGS. 7E and 7F.

As the water cascades over the median wall 84, air in the water is released, reducing the number of bubbles in the clear ice piece 98 formed. The rocking may also be configured to expose at least a portion of the top layer of the clear ice pieces 98 as the liquid water cascades to one side and then the other over the median wall 84, exposing the top surface of the ice pieces 98 to air above the ice tray. The water is also frozen in layers from the bottom (beginning adjacent the top surface 78 of the ice forming plate 76, which is cooled by the thermoelectric device 102) to the top, which permits air bubbles to escape as the ice is formed layer by layer, resulting in a clear ice piece 98.

As shown in FIGS. 8-11, to promote clear ice production, the temperature surrounding the ice tray 70 can also be controlled. As previously described, a thermoelectric device 102 is thermally coupled or otherwise thermally engaged to the bottom surface 80 of the ice forming plate 76 to cool the ice forming plate 76. In addition to the direct cooling of the ice forming plate 76, heat may be applied above the water contained in the ice tray 70, particularly when the ice tray 70 is being rocked, to cyclically expose the top surface of the clear ice pieces 98 being formed.

Figure 8:
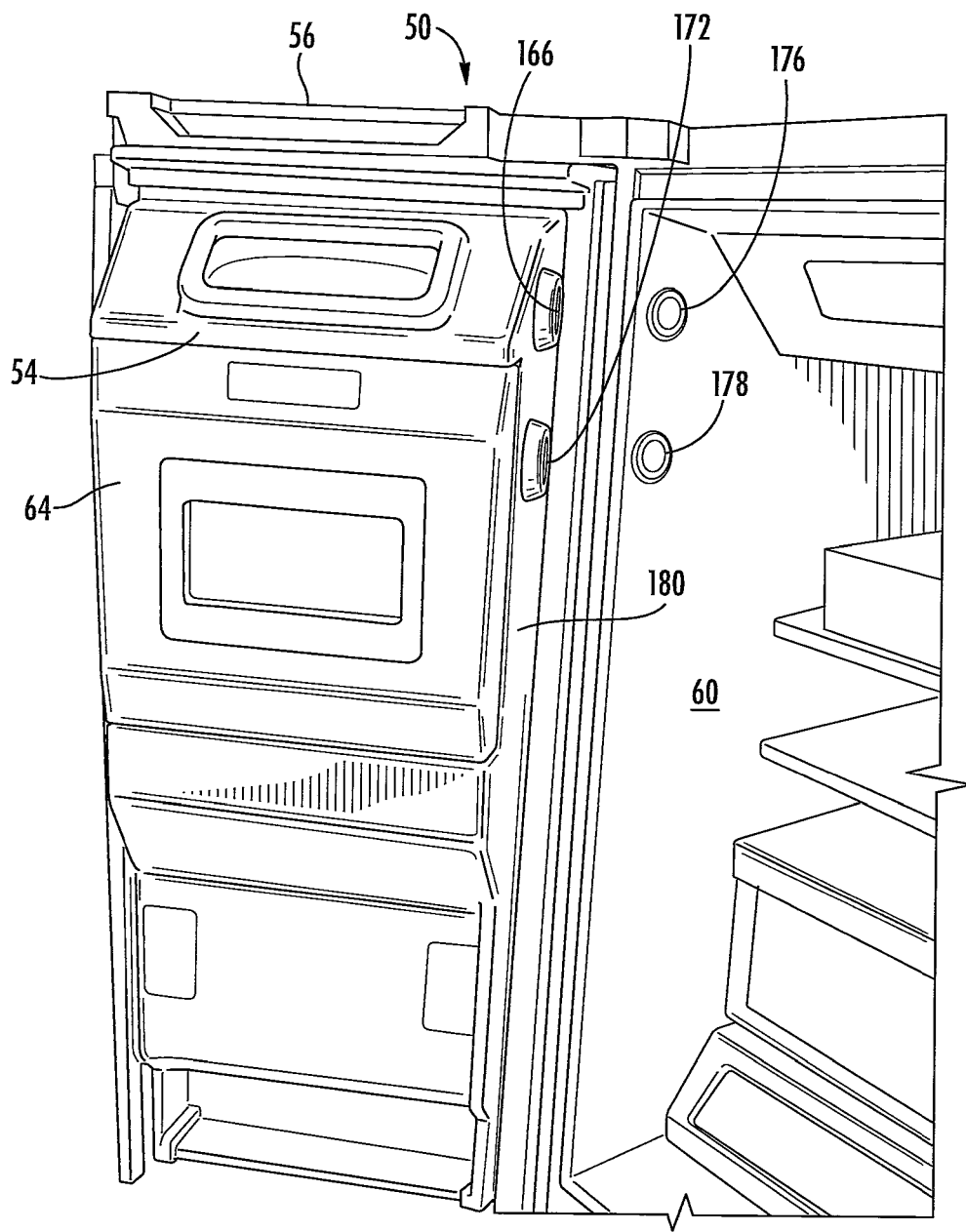
FIG. 8 is a perspective view of an appliance having an ice maker of the present invention and having air circulation ports.
Figure 9:
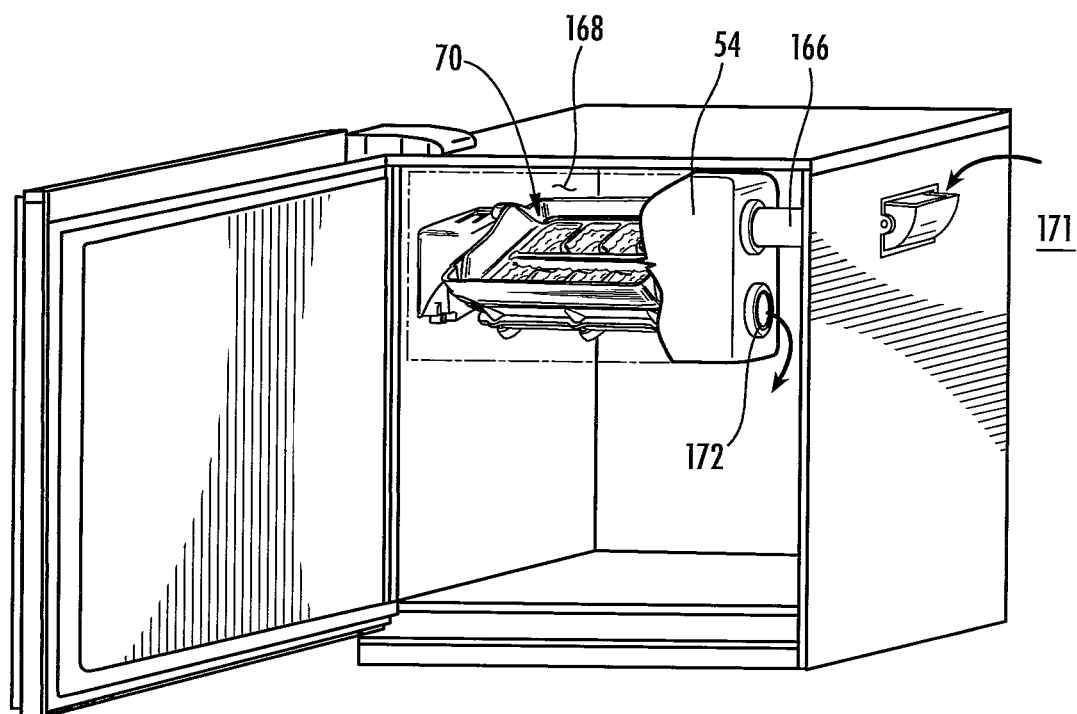
FIG. 9 is a top perspective view of an appliance having an ice maker of the present invention and having an ambient air circulation system.
Figure 10:
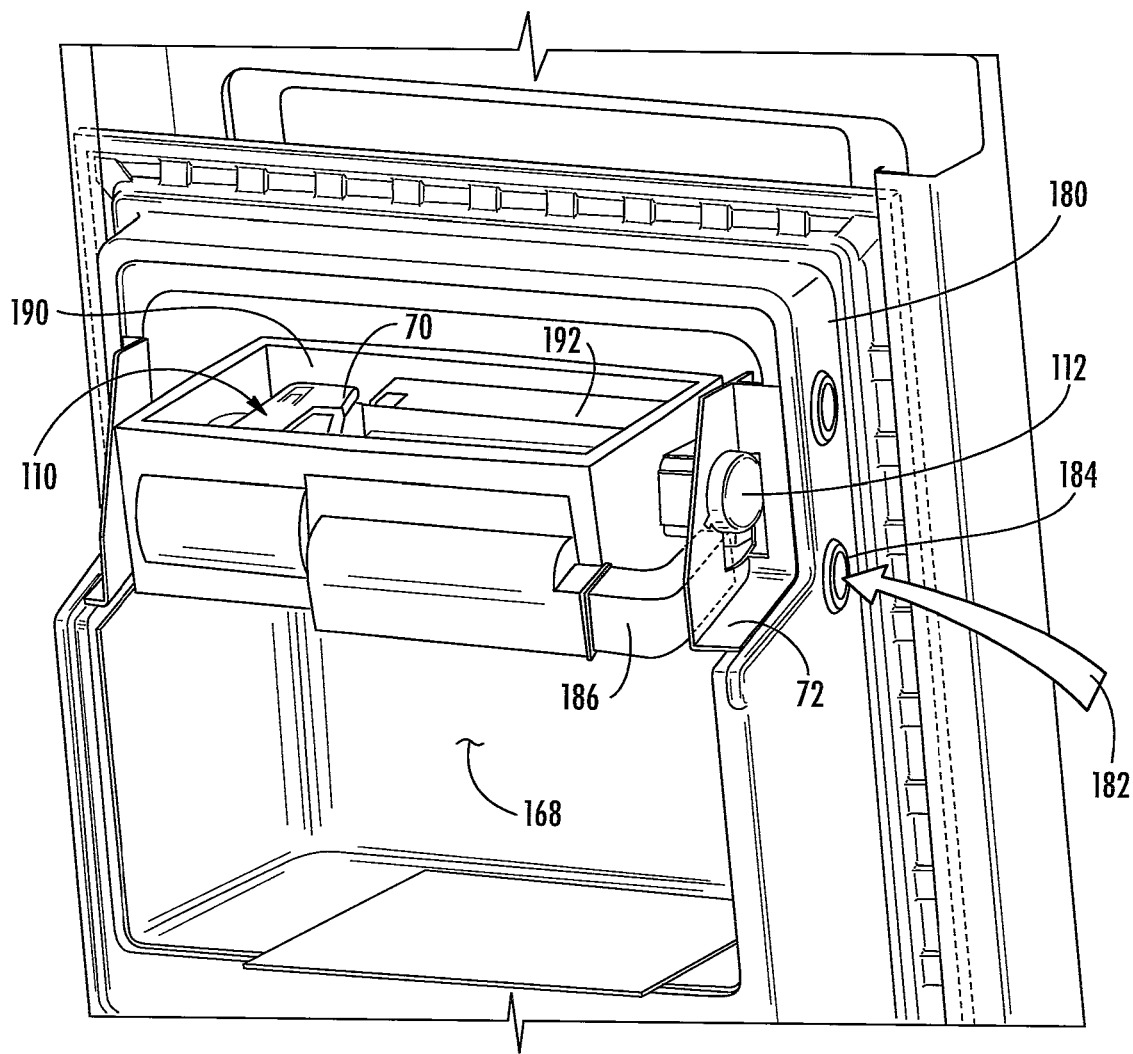
FIG. 10 is a top perspective view of an ice maker of the present invention installed in an appliance door and having a cold air circulation system.

As shown in FIGS. 8 and 9, heat may be applied via an air intake conduit 166, which is operably connected to an interior volume of the housing 168 above the ice tray 70. The air intake conduit 166 may allow the intake of warmer air 170 from a refrigerated compartment 60 or the ambient surroundings 171, and each of these sources of air 60, 171 provide air 170 which is warmer than the temperature of the ice forming plate 176. The warmer air 170 may be supplied over the ice tray 70 in a manner which is sufficient to cause agitation of the water retained within the ice tray 70, facilitating release of air from the water, or may have generally laminar flow which affects the temperature above the ice tray 70, but does not agitate the water therein. A warm air exhaust conduit 172, which also communicates with the interior volume 168 of the housing 54, may also be provided to allow warm air 170 to be circulated through the housing 54. The other end of the exhaust conduit 172 may communicate with the ambient air 171, or with a refrigerator compartment 60. As shown in FIG. 8, the warm air exhaust conduit 172 may be located below the intake conduit 166. To facilitate flow of the air 170, an air movement device 174 may be coupled to the intake or the exhaust conduits 166, 172. Also as shown in FIG. 8, when the housing 54 of the ice maker 52 is located in the door 56 of the appliance 50, the intake conduit 166 and exhaust conduit 172 may removably engage a corresponding inlet port 176 and outlet port 178 on an interior sidewall 180 of the appliance 50 when the appliance door 56 is closed.

Alternatively, the heat may be applied by a heating element (not shown) configured to supply heat to the interior volume 168 of the housing 54 above the ice tray 70. Applying heat from the top also encourages the formation of clear ice pieces 98 from the bottom up. The heat application may be deactivated when ice begins to form proximate the upper portion of the grid 100, so that the top portion of the clear ice pieces 98 freezes.

Additionally, as shown in FIGS. 8-11, to facilitate cooling of the ice forming plate 76, cold air 182 is supplied to the housing 54 below the bottom surface 80 of the ice forming plate 76. A cold air inlet 184 is operably connected to an intake duct 186 for the cold air 182, which is then directed across the bottom surface 80 of the ice forming plate 76. The cold air 182 is then exhausted on the opposite side of the ice forming plate 76.

Figure 11:
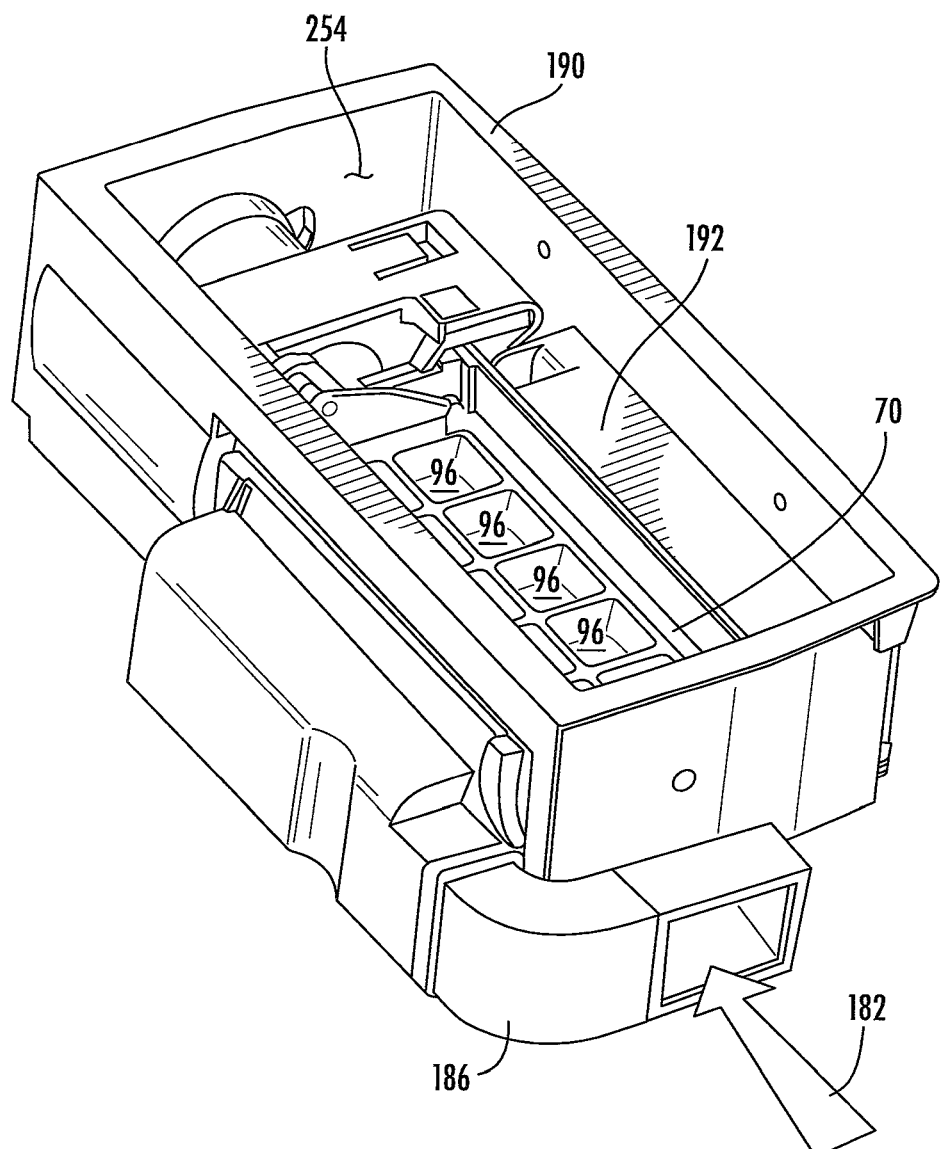
FIG. 11 is a top perspective view of an ice maker of the present invention, having a cold air circulation system.

As shown in FIG. 11, the ice maker is located within a case 190 (or the housing 54), and a barrier 192 may be used to seal the cold air 182 to the underside of the ice forming plate 76, and the warm air 170 to the area above the ice tray 70. The temperature gradient that is produced by supplying warm air 170 to the top of the ice tray 70 and cold air 182 below the ice tray 70 operates to encourage unidirectional formation of clear ice pieces 98, from the bottom toward the top, allowing the escape of air bubbles.

As shown in FIGS. 12A-12B, once clear ice pieces are formed, the ice maker 52, as described herein, harvests the clear ice pieces 98, expelling the clear ice pieces 98 from the ice tray 70 into the ice storage bin 64. To expel the ice 98, the harvest motor 114 is used to rotate the ice tray 70 and the grid 100 approximately 120°. This inverts the ice tray 70 sufficiently that a stop 116, 118 extending between the ice forming plate 76 and the rocker frame 110 prevents further movement of the ice forming plate 76 and containment walls 82. Continued rotation of the harvest motor 114 and arm 154 overcomes the tension of the spring clip 128 linkage, and as shown in FIG. 12B, the grid 100 is further rotated and twisted through an arc of about 40° while the arm 154 is driven by the harvest motor 114 and the cam pin 150 of the grid 100 slides along the slot 158 from the position shown in FIG. 12A to the position shown in FIG. 12B. This movement inverts and flexes the grid 100, and allows clear ice pieces 98 formed therein to drop from the grid 100 into an ice bin 64 positioned below the ice maker 52.

Once the clear ice pieces 98 have been dumped into the ice storage bin 64, the harvest motor 114 is reversed in direction, returning the ice tray 7 to a horizontal position within the rocker frame 110, which has remained in the neutral position throughout the turning of the harvest motor 114. Once returned to the horizontal starting position, an additional amount of water can be dispensed into the ice tray 70 to form an additional batch of clear ice pieces.

Figure 13:
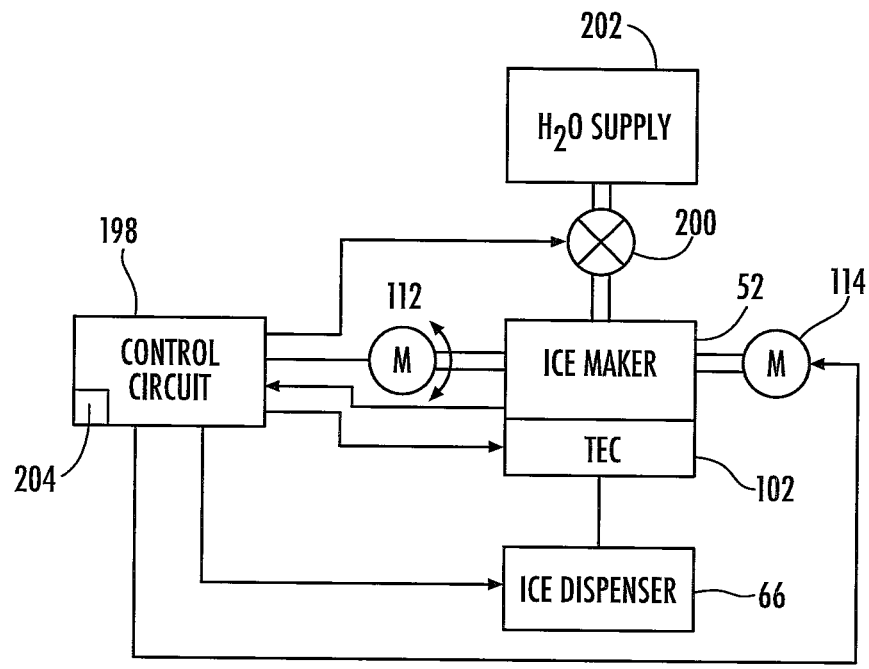
FIG. 13 is a circuit diagram for an ice maker of the present invention.

FIG. 13 depicts a control circuit 198 which is used to control the operation of the ice maker 52. The control circuit 198 is operably coupled to an electrically operated valve 200, which couples a water supply 202 and the ice maker 52. The water supply 202 may be a filtered water supply to improve the quality (taste and clarity for example) of clear ice piece 98 made by the ice maker 52, whether an external filter or one which is built into the refrigerator 50. The control circuit 198 is also operably coupled to the oscillation motor 112, which in one embodiment is a reversible pulse-controlled motor. The output drive shaft 136 of the oscillating motor 112 is coupled to the ice maker 52, as described above. The drive shaft 136 rotates in alternating directions during the freezing of water in the ice maker 52. The control circuit 198 is also operably connected to the thermoelectric device 102, such as a Peltier-type thermoelectric cooler in the form of thermoelectric plates. The control circuit 198 is also coupled to the harvest motor 114, which inverts the ice tray 70 and twists the grid 100 to expel the clear ice pieces 98 into the ice bin 64.

The control circuit 198 includes a microprocessor 204 which receives temperature signals from the ice maker 52 in a conventional manner by one or more thermal sensors (not shown) positioned within the ice maker 52 and operably coupled to the control circuit 198. The microprocessor 204 is programmed to control the water dispensing valve 200, the oscillating motor 112, and the thermoelectric device 114 such that the arc of rotation of the ice tray 70 and the frequency of rotation is controlled to assure that water is transferred from one individual compartment 96 to an adjacent compartment 96 throughout the freezing process at a speed which is harmonically related to the motion of the water in the freezer compartments 96.

The water dispensing valve 200 is actuated by the control circuit 198 to add a predetermined amount of water to the ice tray 70, such that the ice tray 70 is filled to a specified level. This can be accomplished by controlling either the period of time that the valve 200 is opened to a predetermined flow rate or by providing a flow meter to measure the amount of water dispensed.

The controller 198 directs the frequency of oscillation w to a frequency which is harmonically related to the motion of the water in the compartments 96, and preferably which is substantially equal to the natural frequency of the motion of the water in the trays 70, which in one embodiment was about 0.4 to 0.5 cycles per second. The rotational speed of the oscillating motor 112 is inversely related to the width of the individual compartments 96, as the width of the compartments 96 influences the motion of the water from one compartment to the adjacent compartment. Therefore, adjustments to the width of the ice tray 70 or the number or size of compartments 96 may require an adjustment of the oscillating motor 112 to a new frequency of oscillation ω.

Figure 14:
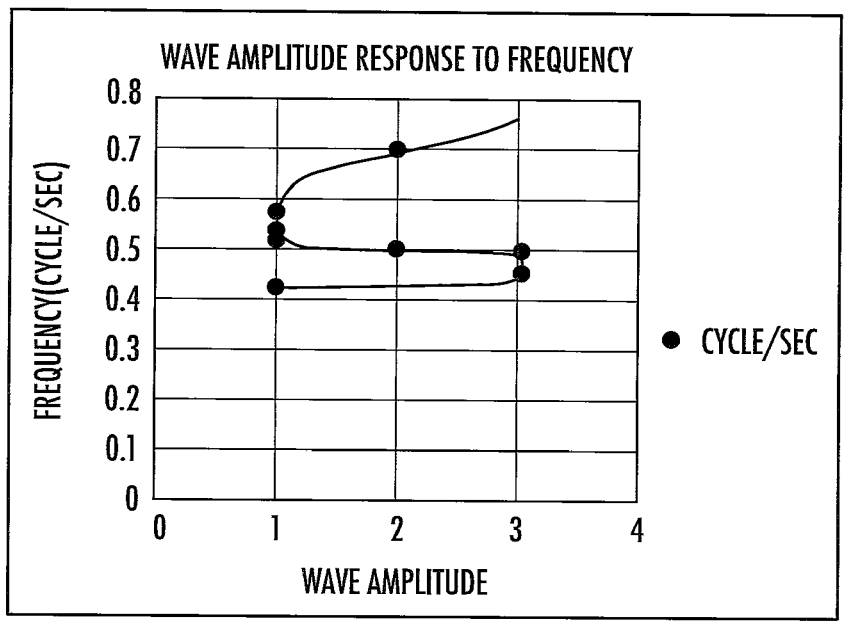
FIG. 14 is a graph of the wave amplitude response to frequency an ice maker of the present invention.

The waveform diagram of FIG. 14 illustrates the amplitude of the waves in the individual compartments 96 versus the frequency of oscillation provided by the oscillating motor 112. In FIG. 14 it is seen that the natural frequency of the water provides the highest amplitude. A second harmonic of the frequency provides a similarly high amplitude of water movement. It is most efficient to have the amplitude of water movement at least approximate the natural frequency of the water as it moves from one side of the mold to another. The movement of water from one individual compartment 96 to the adjacent compartment 96 is continued until the thermal sensor positioned in the ice tray 70 at a suitable location and operably coupled to the control circuit 198 indicates that the water in the compartment 96 is frozen.

After the freezing process, the voltage supplied to the thermoelectric device 102 may optionally be reversed, to heat the ice forming plate 76 to a temperature above freezing, freeing the clear ice pieces 98 from the top surface 78 of the ice forming plate 76 by melting a portion of the clear ice piece 98 immediately adjacent the top surface 78 of the ice forming plate 76. This allows for easier harvesting of the clear ice pieces 98. In the embodiment described herein and depicted in FIG. 13, each cycle of freezing and harvesting takes approximately 30 minutes.

In another aspect of the ice maker 210, as shown in FIGS. 15-33, an ice maker 120 includes a twist harvest ice maker, which utilizes oscillation during the freezing cycle, variations in thermal conduction of materials, and a cold air 370 flow during the freezing cycle to produce clear ice pieces 236. The ice maker in FIGS. 15-33 also has two driving motors 242, 244 on one end 246 of the ice maker 210. The ice maker 210 as shown in FIGS. 15-33 could also be modified to include, for example, a warm air flow during the freezing cycle, or to include other features described with respect to other aspects or embodiments described herein, such as similar materials of construction or rotation amounts.

The ice maker 210 depicted in FIGS. 15-33 is horizontally suspended within a housing 212, and located above an ice storage bin (not shown in FIGS. 15-33). The ice maker 210 includes an ice tray 218 having an ice forming plate 220 with a top surface 222 and a bottom surface 224, and a containment wall 226 extending upwardly around the perimeter of the ice forming plate 220. A median wall 228 and dividing walls 230 extend orthogonally upward from the top surface 222 of the ice forming plate 220 to define the grid 232, having individual compartments 234 for the formation of clear ice pieces 236.

Figure 15:
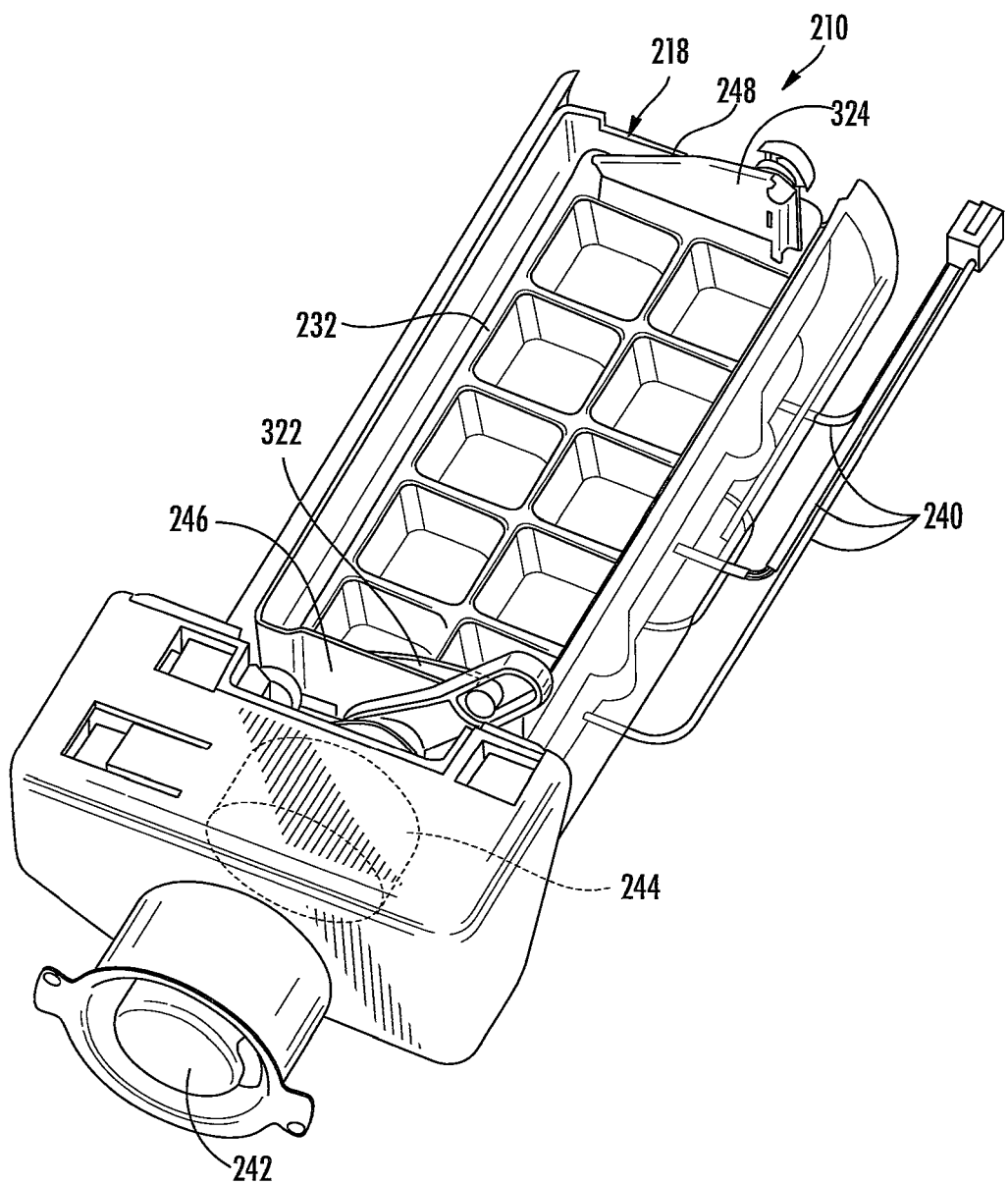
FIG. 15 is a top perspective view of a second embodiment of an ice maker according to the present invention.

As shown in FIG. 15, a thermoelectric device 238 is thermally connected to the bottom surface 224 of the ice forming plate 220, and conductors 240 are operably attached to the thermoelectric device 238 to provide power and a control signal for the operation of the thermoelectric device 238. Also, as shown in the embodiment depicted in FIG. 15, an oscillating motor 242 and a harvest motor 244 are both located proximal to a first end 246 of the ice tray 218.

The ice tray 218 and thermoelectric device 238 are typically disposed within a shroud member 250 having a generally cylindrical shape aligned with the transverse axis of the ice tray 218. The shroud member 250 is typically an incomplete cylinder, and is open over the top of the ice tray 218. The shroud 250 includes at least partially closed end walls 252 surrounding the first end 246 of the ice tray 218 and a second end 248 of the ice tray 218. The shroud member 250 typically abuts the periphery of the containment wall 226 to separate a first air chamber 254 above the ice tray 218 and a second air chamber 256 below the ice tray 218. The housing 212 further defines the first air chamber 254 above the ice tray 218.

Figure 16:
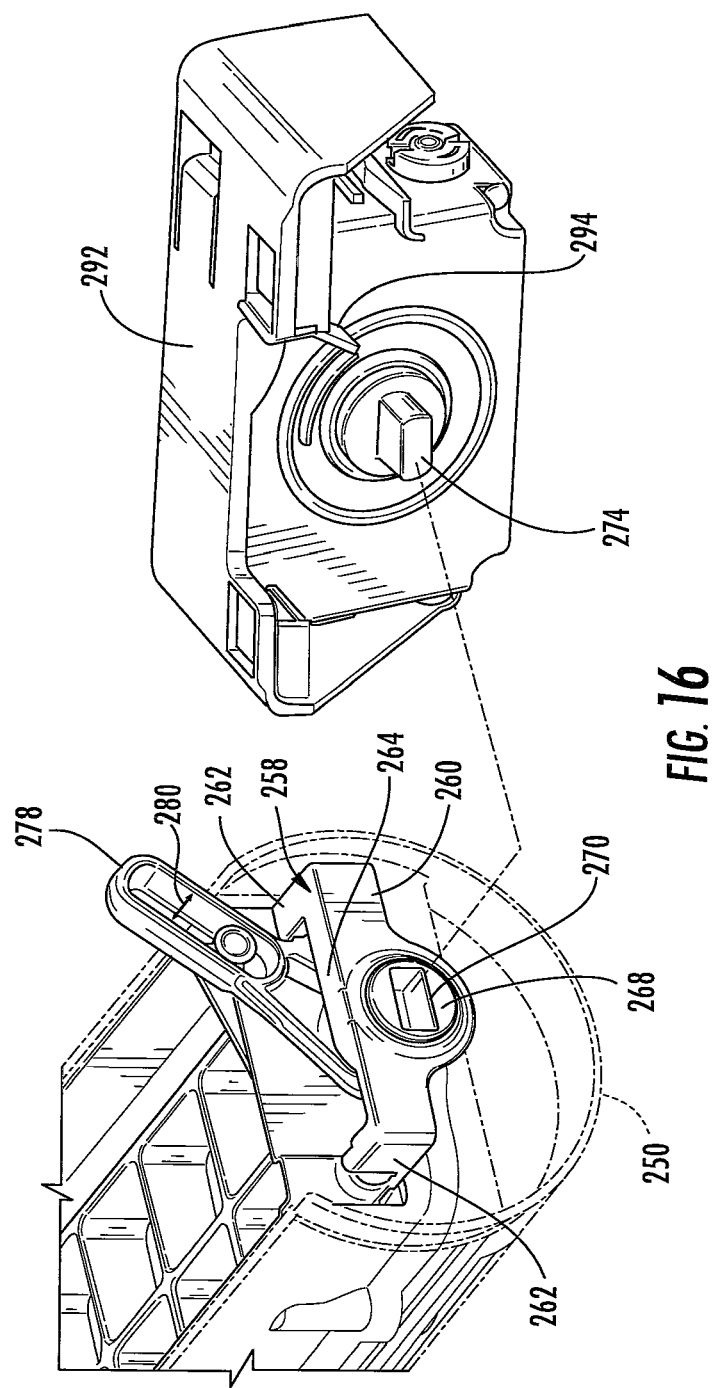
FIG. 16 is a top perspective view of a disassembled ice maker according to the present invention illustrating the coupling between an ice tray and driving motors.
Figure 17:
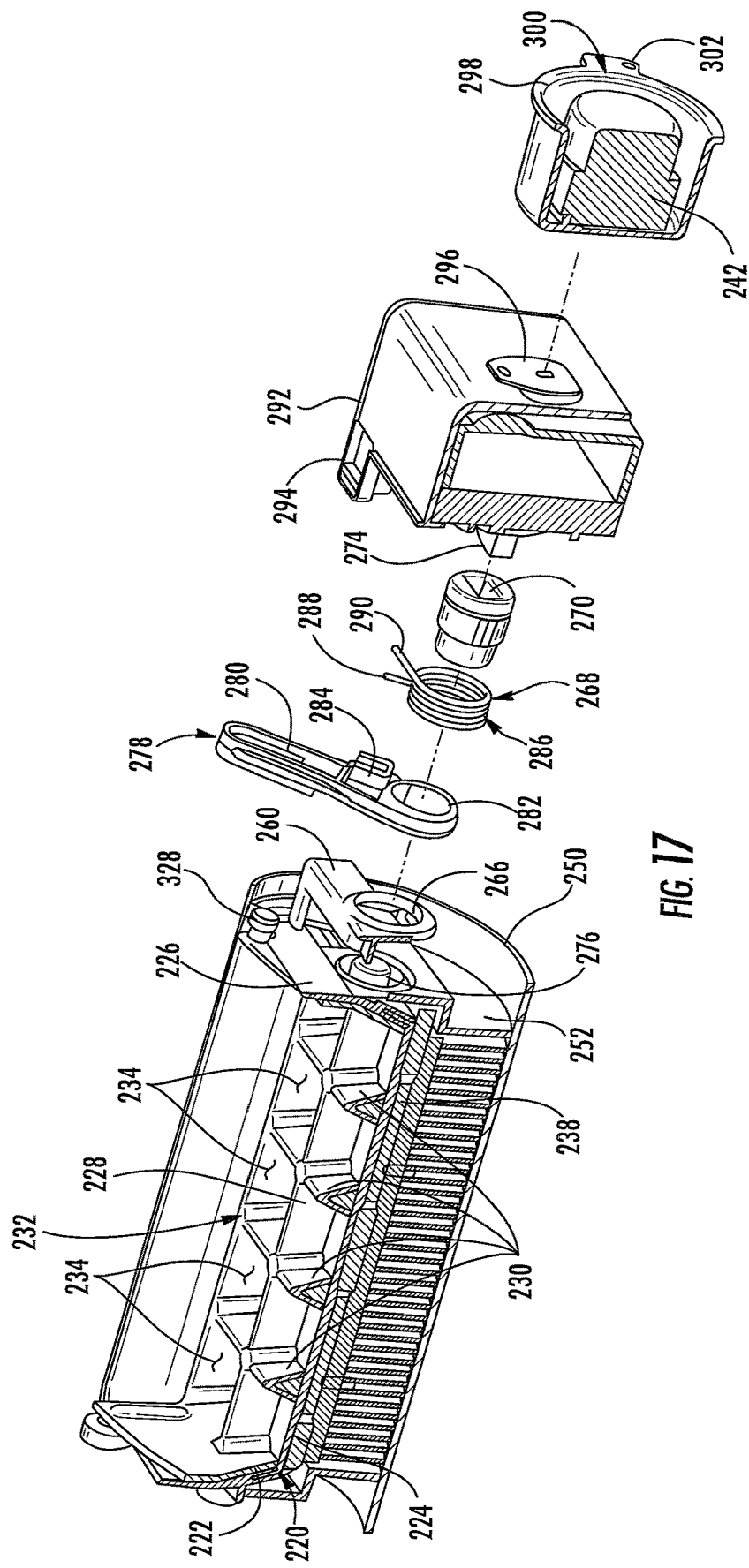
FIG. 17 is an exploded top perspective, cross sectional view of an ice maker according to the present invention.
Figure 18:
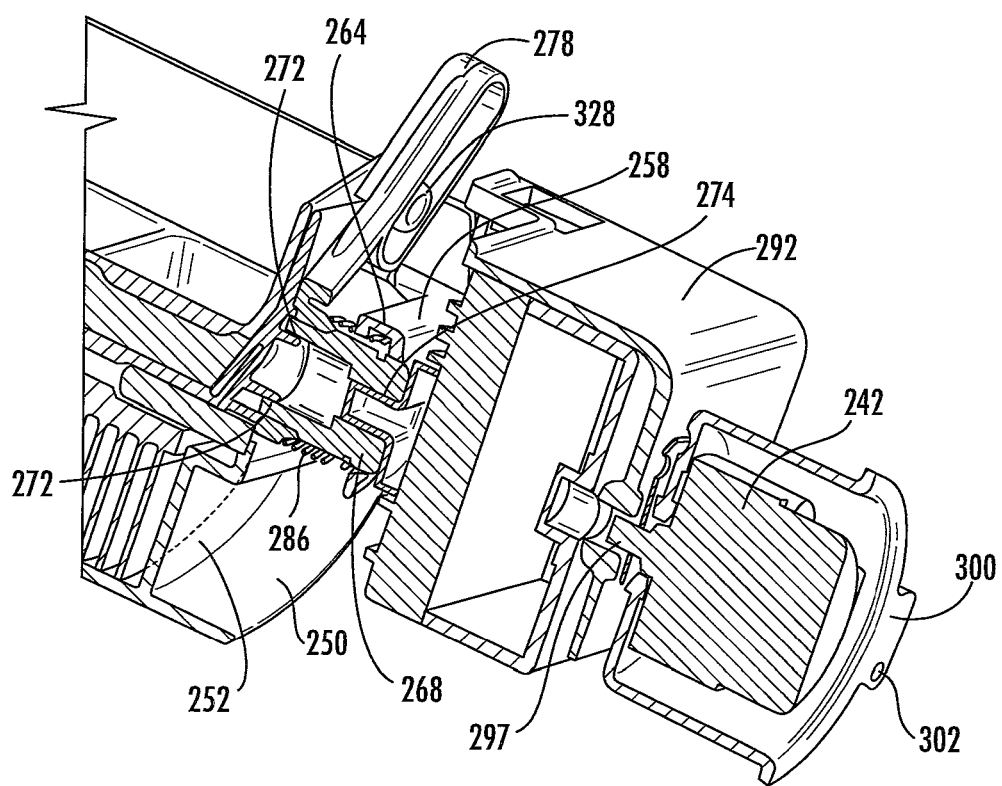
FIG. 18 is a partial top perspective, cross sectional view of an ice maker according to the present invention.

As illustrated in FIGS. 16-18, a generally U-shaped bracket 258 extends from the first end 246 of the ice tray 218, and includes a cross bar 260 and two connecting legs 262, one at each end of the cross bar 260. A flange 264 extends rearwardly from the cross bar 260, and a rounded opening 266 is provided through the center of the cross bar 260, which, as best shown in FIGS. 17-18 receives a cylindrical linkage piece 268 with a keyed opening 270 at one end thereof, and a generally rounded opening 272 at the other end thereof. The keyed opening 270 accepts the keyed drive shaft 274 of the harvest motor 244, and the rounded opening 272 accepts an integral axle 276 extending along the transverse axis from the ice tray 218.

As shown in FIG. 16, a harvest arm 278 is disposed between the first end 246 of the ice tray 218 and the cross bar 260 of the bracket 258. The harvest arm 278, as best shown in FIG. 17, includes a slot 280 for receiving a cam pin 328 formed on the grid 232, an opening 282 for receiving the cylindrical linkage piece 268 on the opposite end of the harvest arm 278, and a spring stop 284 adjacent the opening 282. The harvest arm 278 is biased in a resting position by the spring clip 286, as shown in FIGS. 17-18, which is disposed between the harvest arm 278 and the cross bar 260, with a first free end 288 of the spring clip 286 seated against the spring stop 284 of the harvest arm 278 and a second free end 290 of the spring clip 286 seated against the flange 264 of the cross bar 260.

Also as shown in FIG. 16, the harvest motor 244 is affixed to a frame member 292, with the keyed drive shaft 274 extending from the harvest motor 244 toward the keyed opening 270 of the cylindrical linkage 268. When assembled, the keyed drive shaft 274 fits within the keyed opening 270. The frame member 292 further incorporates a catch 294, which engages with the ice tray 218 during the harvesting step to halt the rotational movement of the ice forming plate 220 and containment wall 226.

Figure 19:
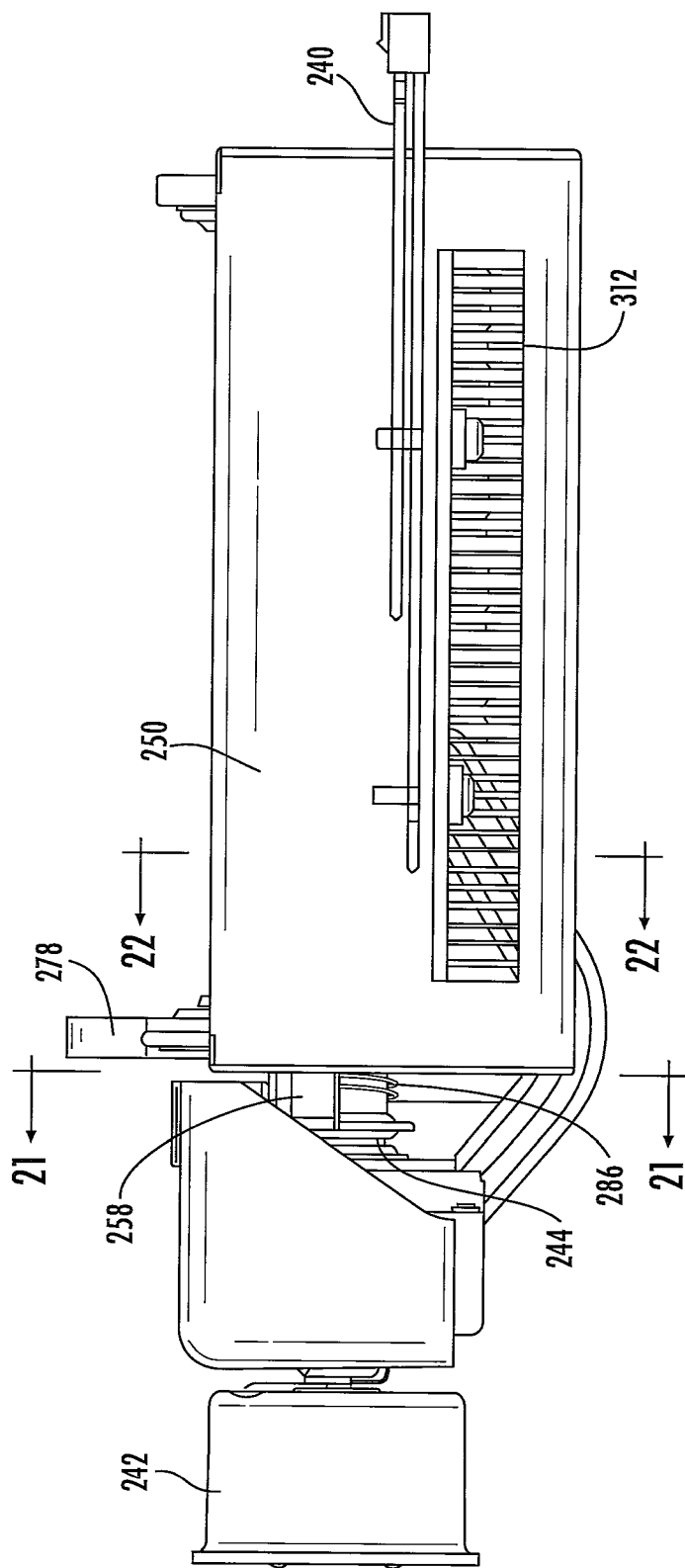
FIG. 19 is a side elevational view of an ice maker according to the present invention.
Figure 20:
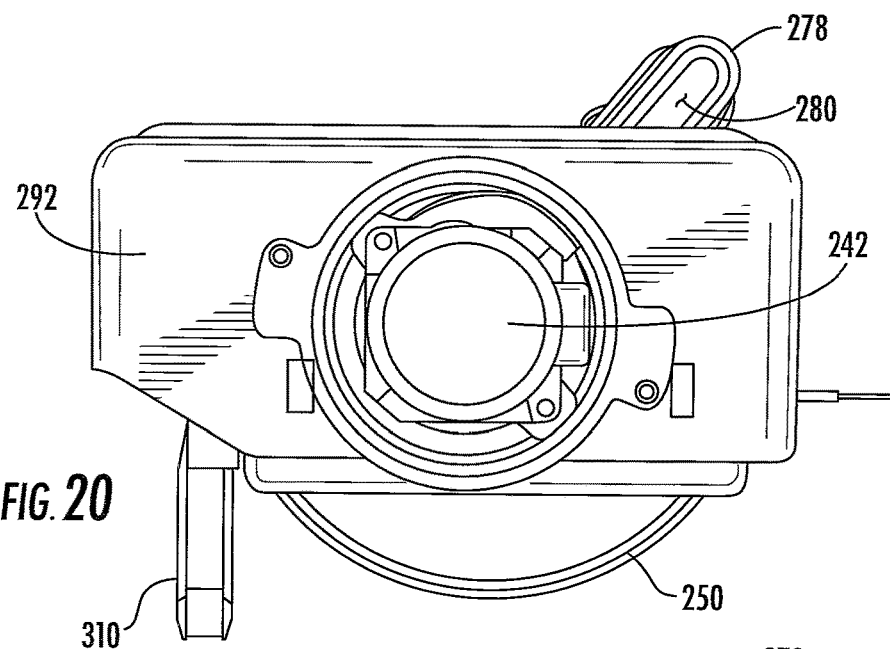
FIG. 20 is an end view of an ice maker according to the present invention.

FIGS. 17 and 18 provide additional detail relating to the operable connections of the harvest motor 244 and the oscillating motor 242. As best shown in FIG. 17, the oscillation motor 242 is affixed to a frame member 292 via a mounting 296. The drive shaft 297 of the oscillation motor 242, directly or indirectly, drives rotation of the frame member 292 back and forth in an alternating rotary motion during the ice freezing process. As shown in FIGS. 17 and 20, the oscillating motor 242 has a motor housing 298 which includes flanges 300 with holes 302 therethrough for mounting of the oscillating motor 242 to a stationary support member (not shown in FIGS. 15-33).

During ice freezing, the harvest motor 244 is maintained in a locked position, such that the keyed drive shaft 274 of the harvest motor 244, which is linked to the ice tray 218, rotates the ice tray 218 in the same arc that the frame member 292 is rotated by the oscillation motor 242. As described above, an arc from about 20° to about 40°, and preferably about 30°, is preferred for the oscillation of the ice tray 218 during the ice freezing step. During the harvest step, as further described below, the oscillating motor 242 is stationary, as is the frame member 292. The harvest motor 244 rotates its keyed drive shaft 274, which causes the ice tray 218 to be inverted and the ice 236 to be expelled. FIG. 19 further illustrates the positioning of the oscillating motor 242, the frame member 292 and the shroud 250.

It is believed that a single motor could be used in place of the oscillating motor 242 and harvest motor 244 with appropriate gearing and/or actuating mechanisms.

An ice bin level sensor 30 is also provided, which detects the level of ice 236 in the ice storage bin (not shown in FIGS. 15-33), and provides this information to a controller (not shown in FIGS. 15-33) to determine whether to make additional clear ice pieces 236.

To facilitate air movement, as shown in FIG. 19, the shroud 250 has a first rectangular slot 312 therein. As further illustrated in FIGS. 22-23 and 31, a second rectangular slot 314 is provided in a corresponding location on the opposing side of the shroud 250. The rectangular slots 312, 314 in the shroud 250 permit air flow through the second chamber 256, as further described below and as shown in FIGS. 22-23 and 31.

Figure 21:
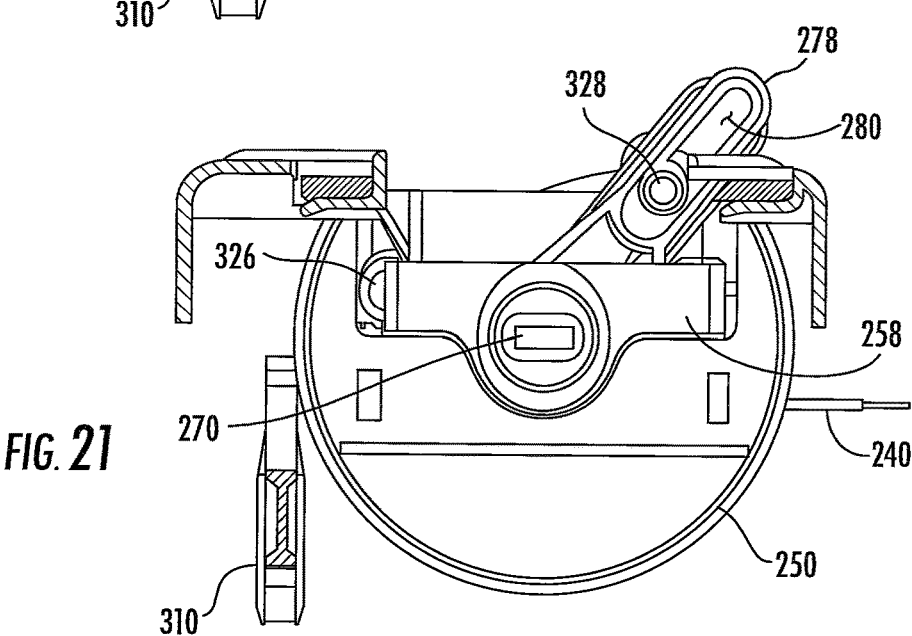
FIG. 21 is a cross sectional view taken along line 21-21 in FIG. 19.
Figure 22:
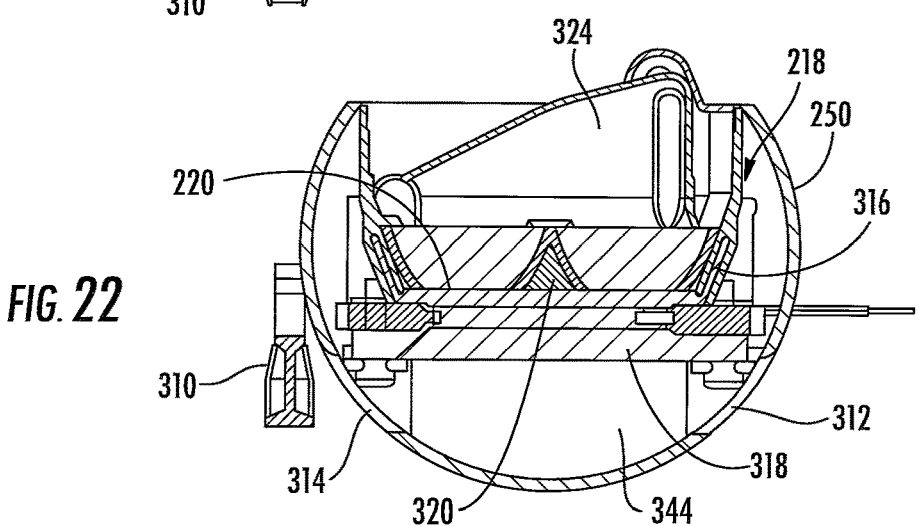
FIG. 22 is a cross sectional view taken along line 22-22 in FIG. 19.
Figure 23:
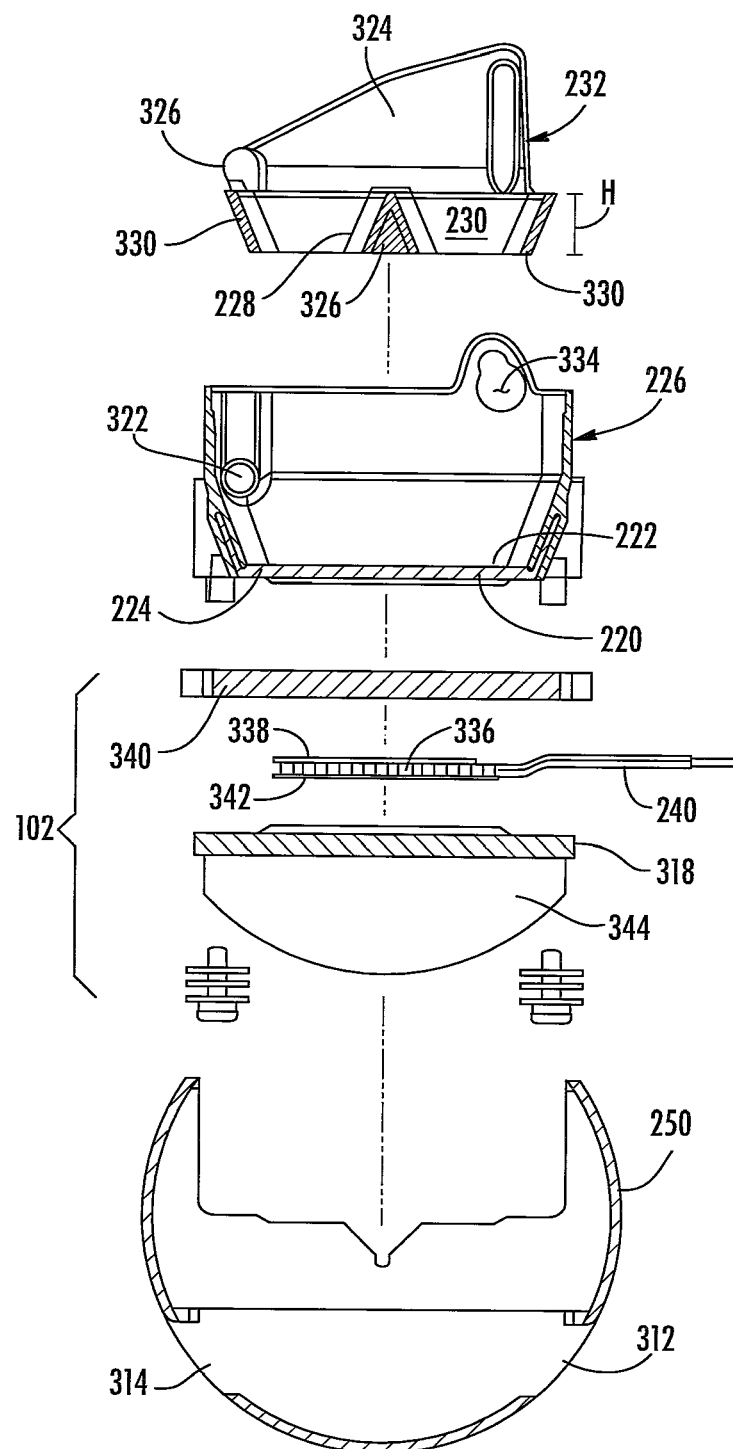
FIG. 23 is an exploded side cross sectional view of an ice maker according to the present embodiment.

As shown in FIGS. 21 and 22, the shroud 250 encompasses the ice tray 218, including the ice forming plate 220, the containment wall 226, which is preferably formed over an upstanding edge 316 of the ice forming plate 220, and the grid 232. The shroud 250 has a semicircular cross sectional area, and abuts the top perimeter of the containment wall 226. The shroud 250 also encloses the thermoelectric device 102 which cools the ice forming plate 220, and a heat sink 318 associated therewith.

The ice tray 218 is also shown in detail in FIG. 22. The ice tray 218 includes the ice forming plate 220, with upstanding edges 316 around its perimeter, and the containment wall 286 formed around the upstanding edges 316 to create a water-tight barrier around the perimeter of the ice forming plate 220.

Figure 24:
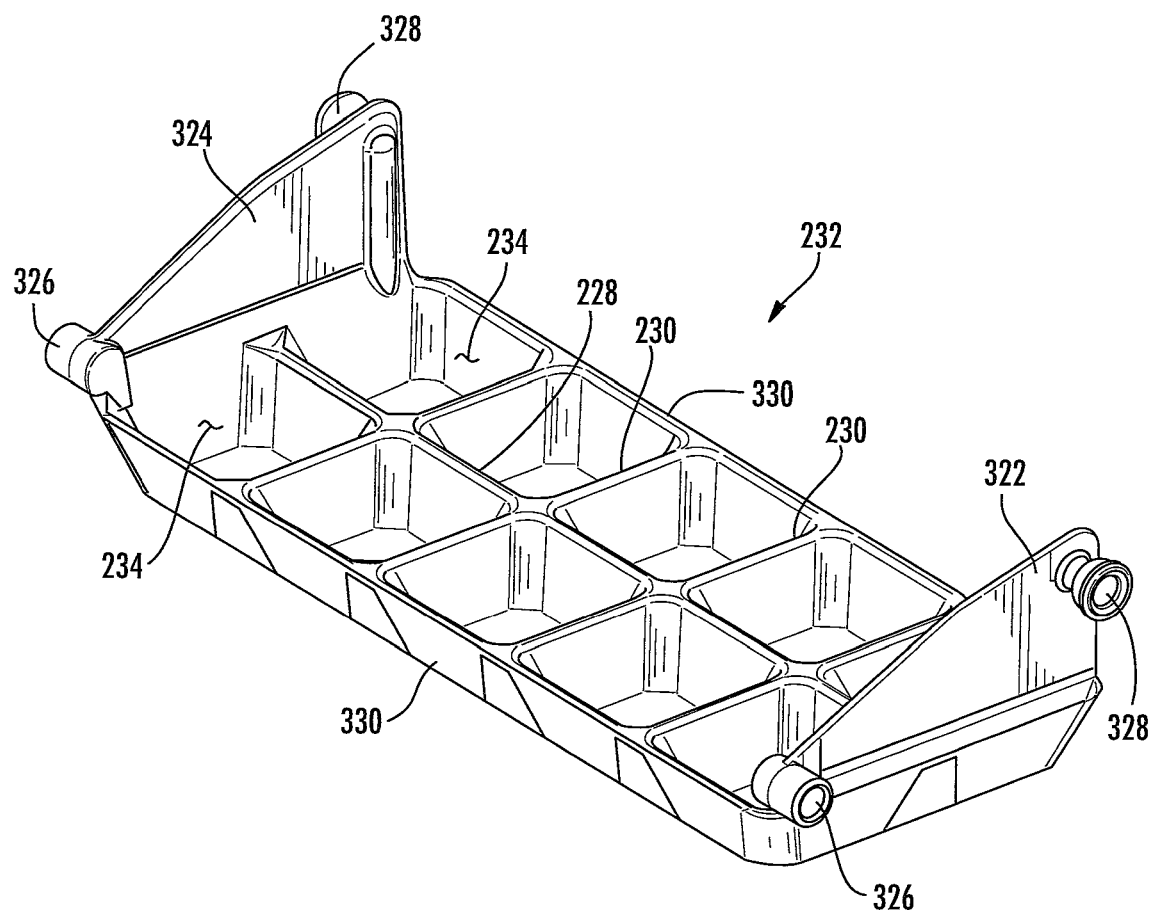
FIG. 24 is a top perspective view of a grid for an ice maker of the present invention.

The arrangement of the grid 232, and the materials of construction for the grid 232 as described herein facilitate the "twist release" capability of the ice tray 218. The features described below allow the grid 232 to be rotated at least partially out of the containment wall 226, and to be twisted, thereby causing the clear ice pieces 236 to be expelled from the grid 232. As shown in FIGS. 23-24, the grid 232 extends generally orthogonally upward from the top surface 222 of the ice forming plate 220. A flexible, insulating material 320 may be provided between adjacent walls of the grid 232. The grid 232 also has a generally raised triangular first end 322, adjacent the motor 242, 244 connections and a generally raised triangular second end 324, opposite the first end 322. The grid 232 has a pivot axle 326 extending outwardly from each of the raised triangular ends 322, 324, and not aligned along the transverse axis about which the ice tray 218 is rotated during oscillation. The grid 232 also has a cam pin 328 extending outwardly from each peak of the raised triangular ends 322, 324. The grid 232 may also include edge portions 330, which are adjacent the side containment walls 226 when the grid 232 is placed therein. As shown in FIGS. 21 and 23, the pivot axles 326 are received within generally round apertures 332 on the adjacent containment walls 226. The cam pin 328 at the first end 322 is received in the slot 280 in the harvest arm 278, and the cam pin 328 at the second end 324 is received in a socket 334 in the containment wall 226.

Figure 26:
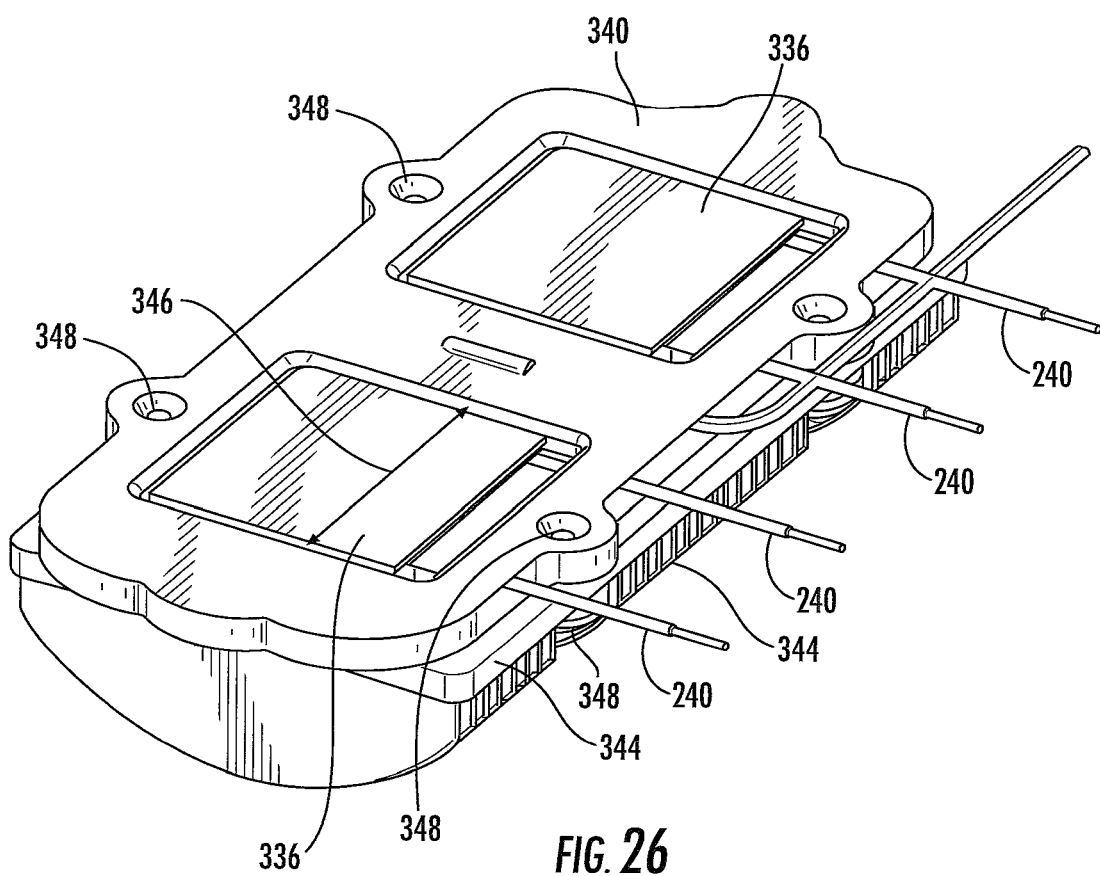
FIG. 26 is a top perspective view of a thermoelectric device for an ice maker of the present invention.

The thermoelectric device 102, as depicted in the embodiment shown in FIGS. 23 and 26 includes a thermoelectric conductor 336 that is attached to a thermoconductive plate 340 on one side 338 and a heat sink 318 on a second side 342, having heat sink fins 344. The thermoconductive plate 340 optionally has openings 346 therein for the thermoelectric conductor 336 to directly contact the ice forming plate 220. The thermoconductive plate 340, thermoelectric conductor 336 and heat sink 318 are fastened to the ice tray 218, along the bottom surface 224 of the ice forming plate 220, through holes 348 provided on the thermoconductive plate 340 and the heat sink 318. The thermoelectric conductor 336 transfers heat from the thermoconductive plate 340 to the heat sink 318 during the freezing cycle, as described above.

Figure 25:
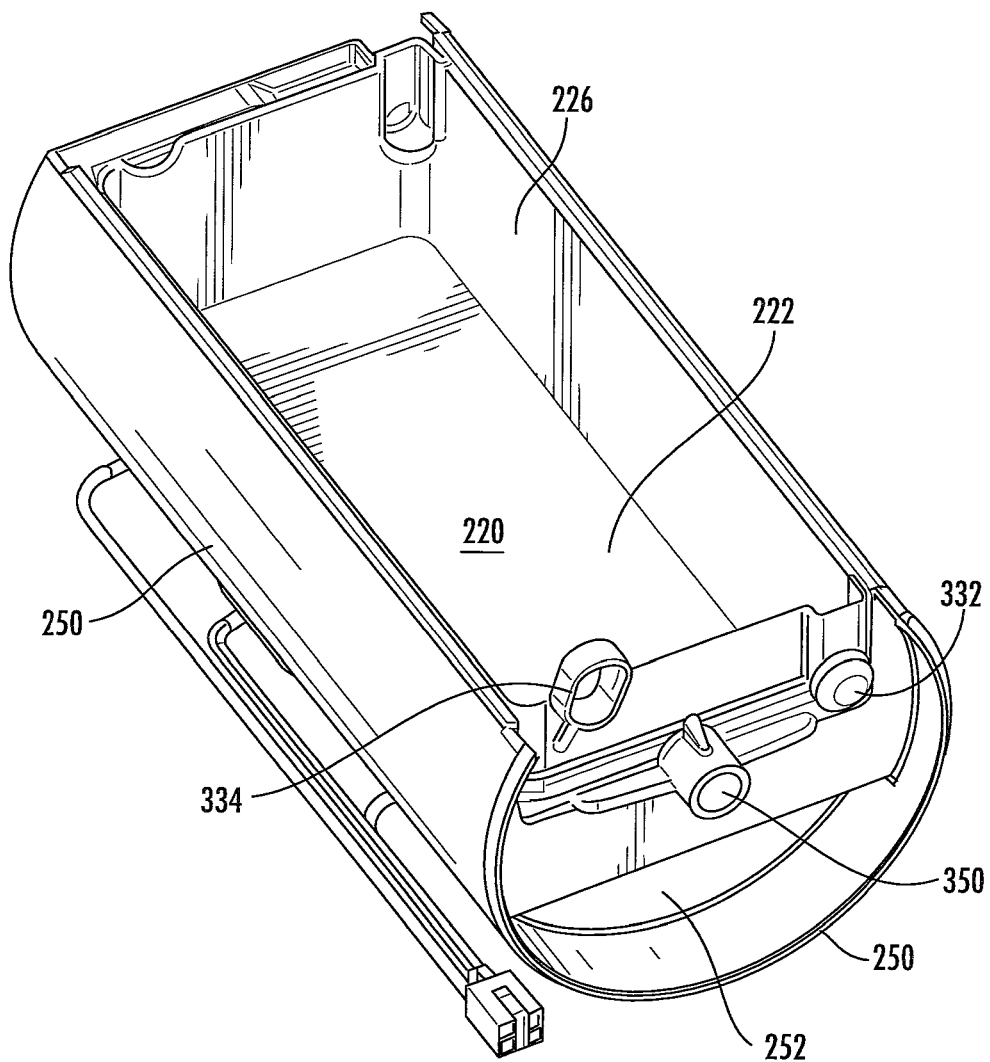
FIG. 25 is a top perspective view of an ice forming plate, containment wall, thermoelectric device and shroud for an ice maker of the present invention.

The second end 248 of the containment wall 226 and shroud 250 (the side away from the motors 242, 244) are shown in FIG. 25. A second pivot axle 350 extends outwardly from the containment wall 226, allowing a rotatable connection with the housing 212.

Figure 27:
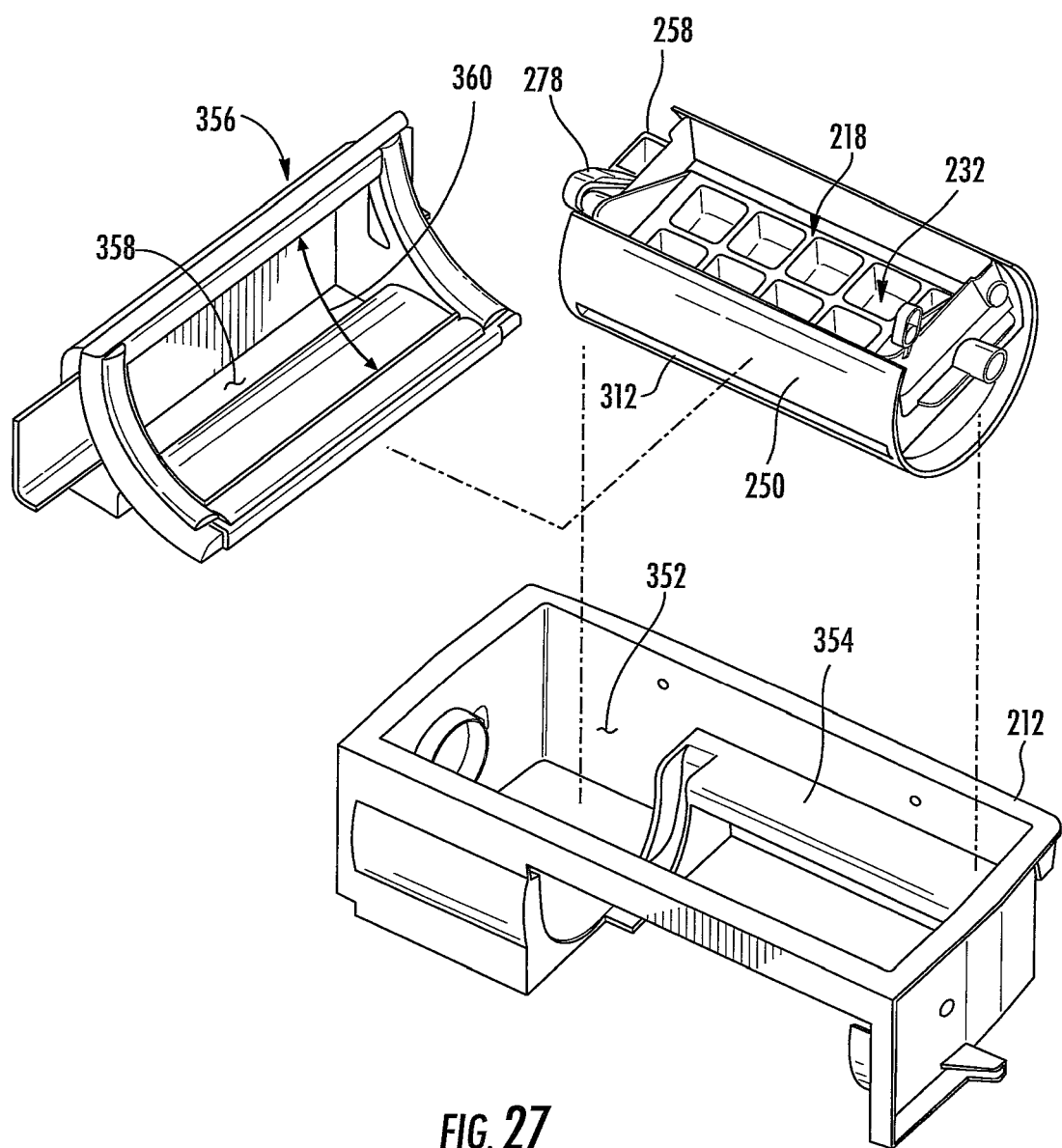
FIG. 27 is a top perspective view of an ice maker with a housing and air duct according to the present invention.
Figure 28:
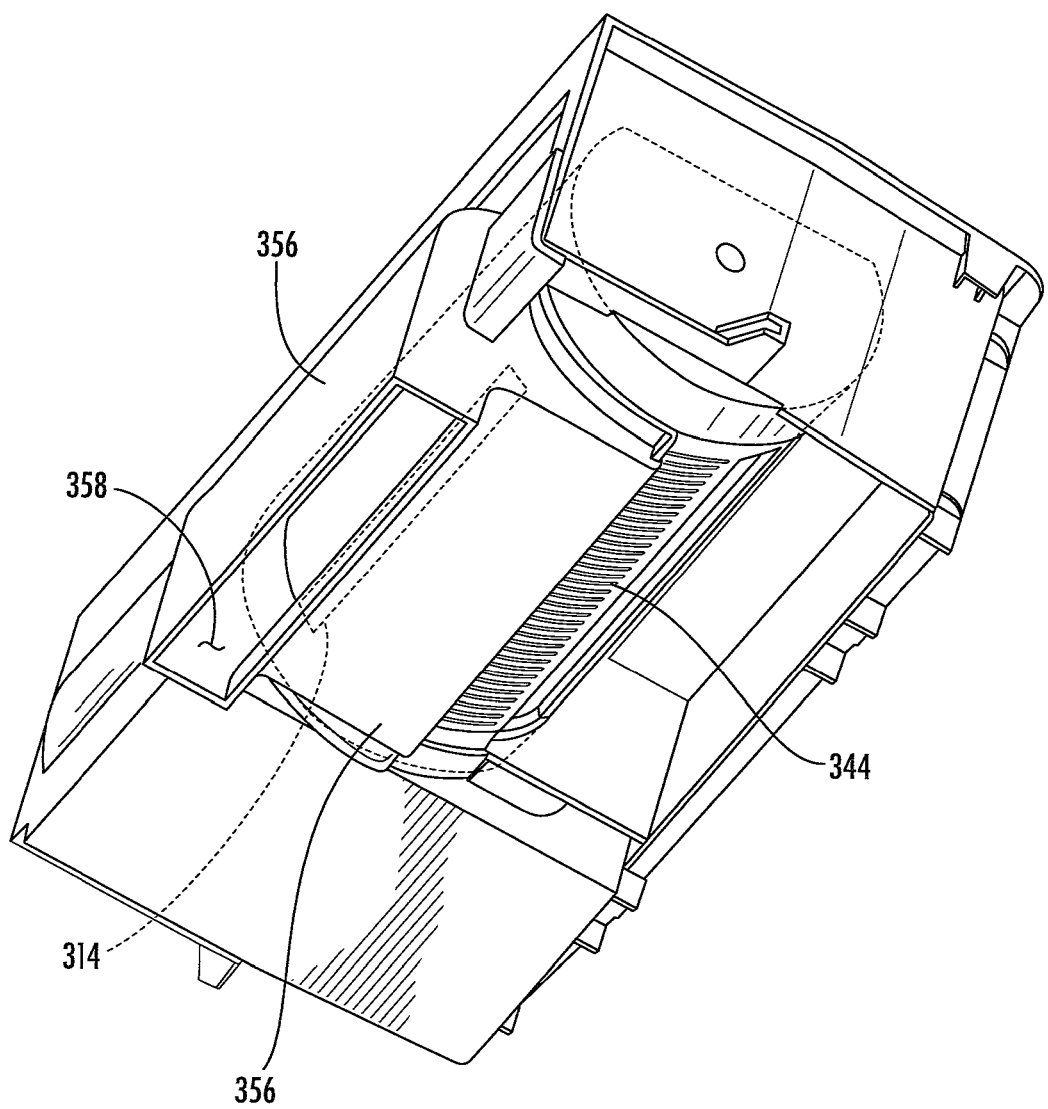
FIG. 28 is a bottom perspective view of the ice maker with a housing and air duct according to the present invention.
Figure 29:
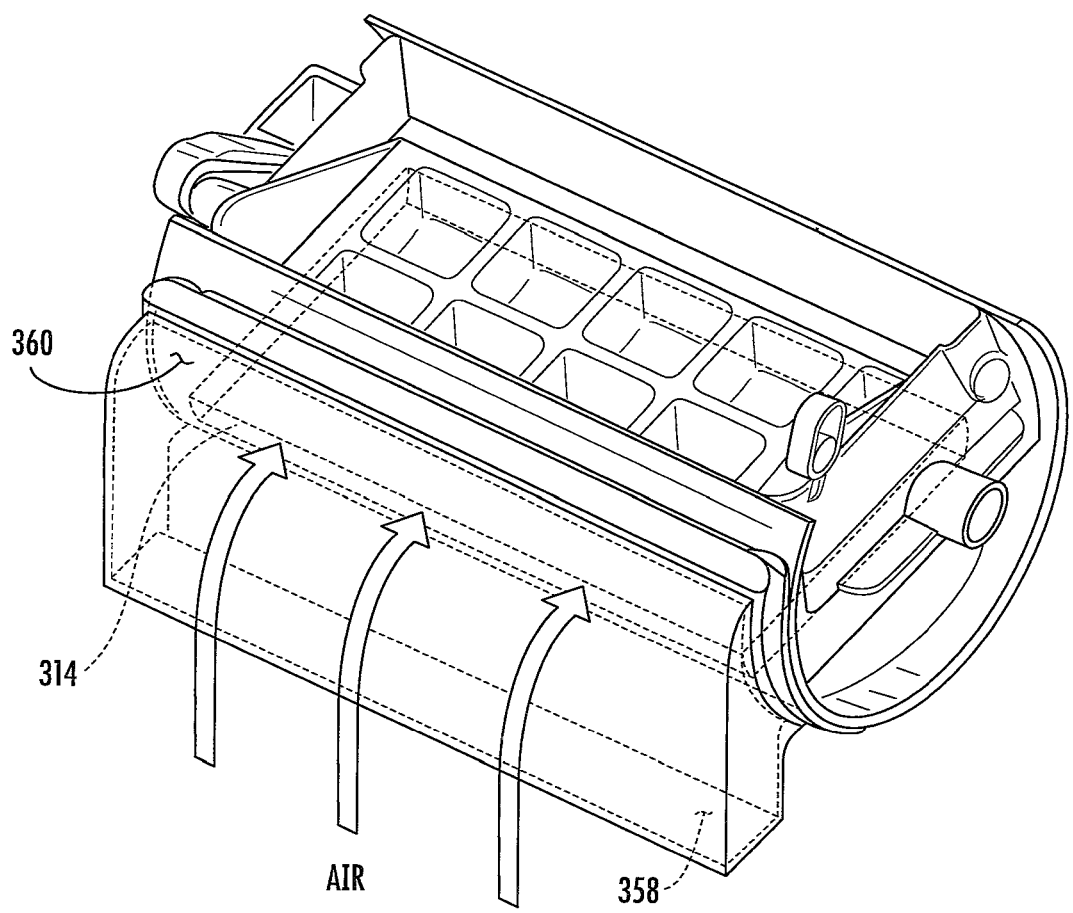
FIG. 29 is a top perspective view of an ice maker with an air duct according to the present invention.

As shown in FIGS. 27-30, the ice tray 218, partially enclosed within the shroud 250, is suspended across an interior volume 352 of the housing 312. The shroud 250 aids in directing the air flow as described below for formation of clear ice pieces 236. The housing 212, as shown in FIG. 27, includes a barrier 354 to aid in separation of the first air chamber 254 and the second air chamber 256, so that the second air chamber 256 can be maintained at a temperature that is colder than the first air chamber 254. The air temperature of the first chamber 254 is preferably at least 10 degrees Fahrenheit warmer than the temperature of the second chamber 256.

When installed in the housing 212, the shroud member 250 is configured to maintain contact with the barrier 354 as the ice tray 218 is oscillated during ice formation. An air intake duct member 356 having a duct inlet 358 and a duct outlet 360, with the duct outlet 360 adapted to fit over the surface of the shroud 250 and maintain contact with the shroud 250 as the shroud 250 rotates, is also fitted into the housing 212. The shaped opening of the duct outlet 260 is sufficiently sized to allow a fluid connection between the duct outlet 260 and the first rectangular slot 312 even as the ice tray 218 and shroud 250 are reciprocally rotated during the freezing cycle. The rectangular slot 312 restricts the amount of air 356 entering the shroud 250, such that the amount of air 370 remains constant even as the ice tray 218 is rotated. An exhaust duct 362 is optionally provided adjacent the second rectangular opening 314, to allow air 370 to escape the housing 212. The exhaust duct 362 has a duct intake 364 which is arranged to allow continuous fluid contact with the second rectangular slot 314 as the ice tray 218 and shroud 250 are rocked during the ice formation stage. The exhaust duct 362 also has a duct outlet 366 which is sufficiently sized to allow the clear ice pieces 236 to fall through the duct outlet 366 and into the ice bin 64 during the harvesting step.

Figure 30:
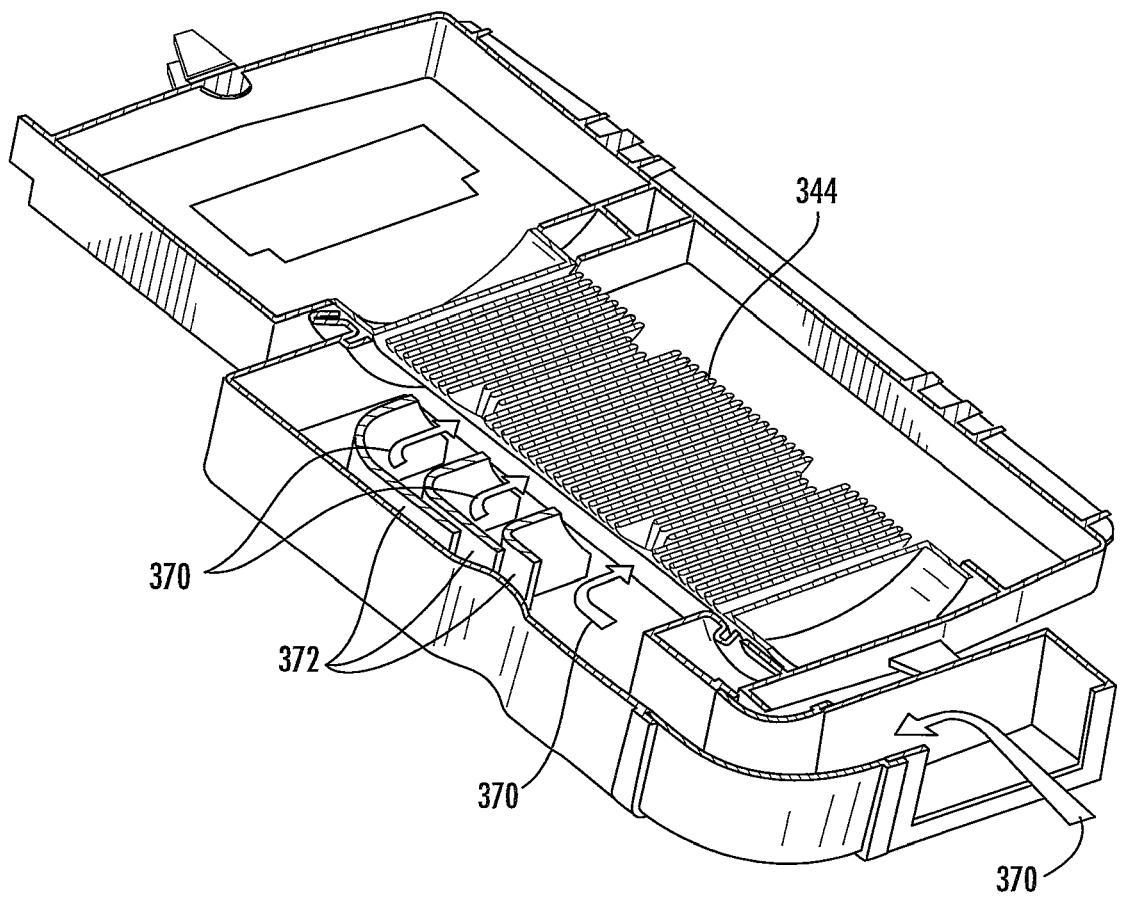
FIG. 30 is a top perspective cross sectional view of an ice maker with an air duct according to the embodiment shown in FIG. 29.

An air flow path 368 is created that permits cold air 370 to travel from the duct inlet 358, to the duct outlet 360, into the first rectangular slot 312 in the shroud, across the heat sink fins 344, which are preferably a conductive metallic material, and out of the second rectangular slot 314 in the shroud 250 into the exhaust duct 362. As shown in FIG. 30, baffles 372 may also be provided in the intake duct member 356 to direct the air flow path 368 toward the heat sink fins 344. The barrier 354 prevents the cold air 370 that is exhausted through the second rectangular slot 314 from reaching the first air chamber 254. The flow of cold air 370 aids in removing heat from the heat sink 344.

Figure 31A:
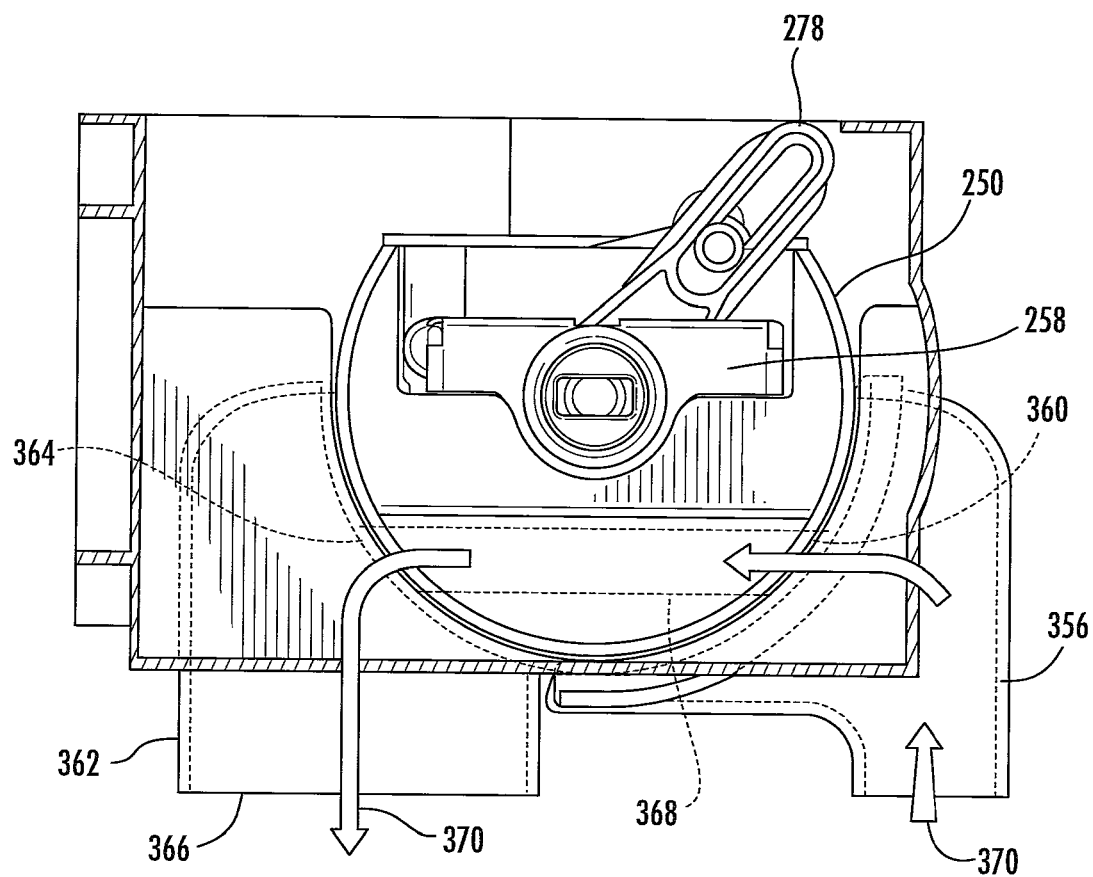
FIG. 31A is an end view of an ice maker according to the present invention in the neutral position with a cold air circulation system, and with the frame and motors removed for clarity.
Figure 31B:
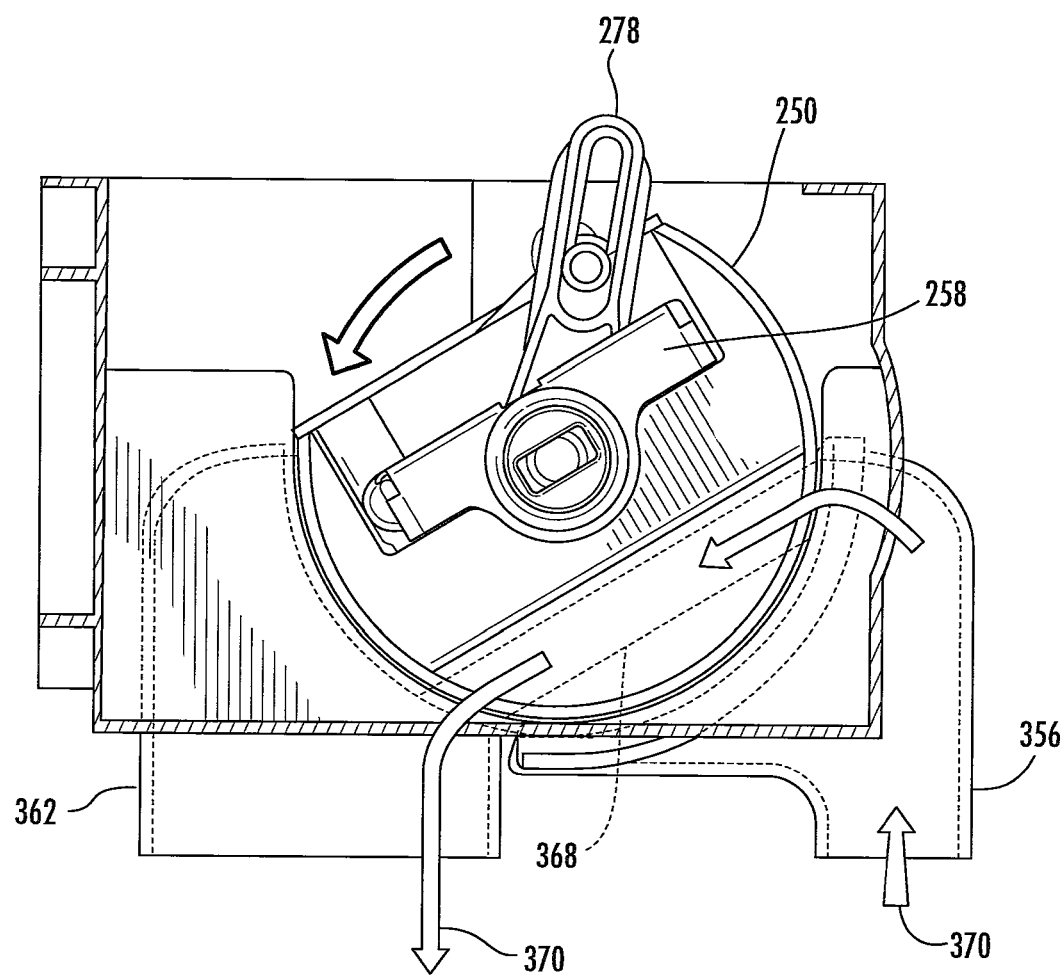
FIGS. 31B-C are end views of the ice maker shown in FIG. 31A, showing the oscillating positions of the ice maker in the freezing cycle.
Figure 31C:
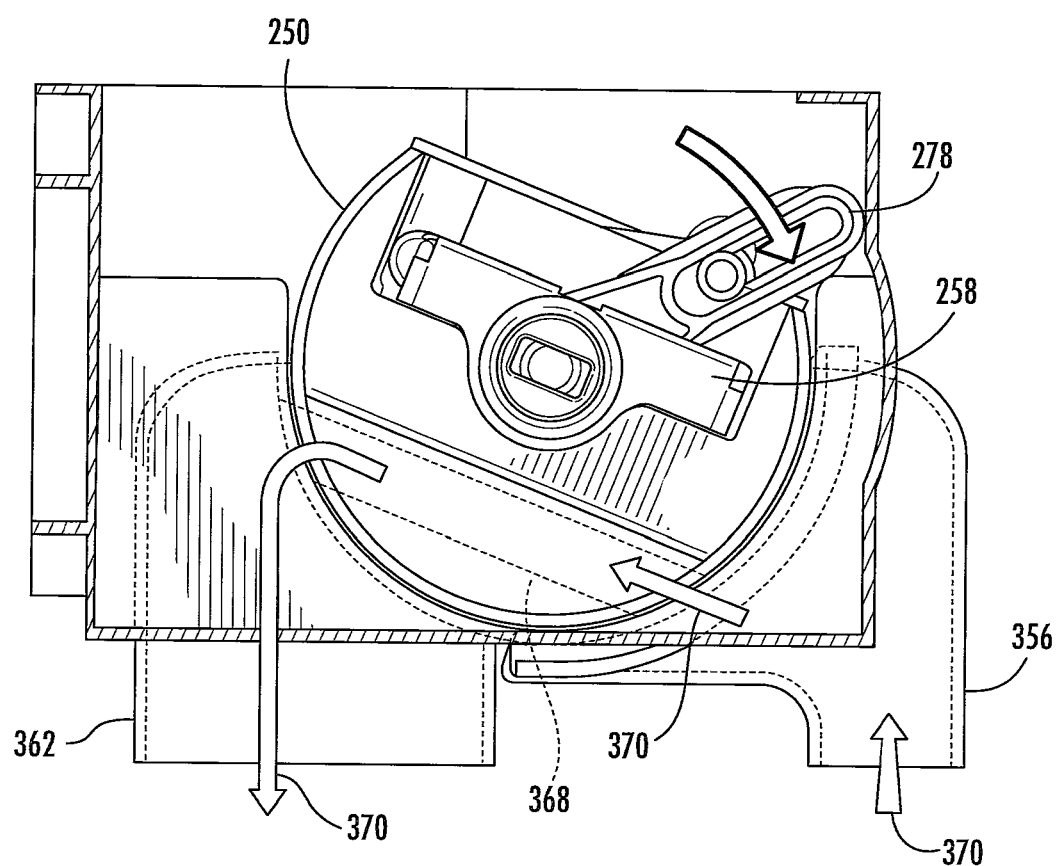
Figure 31D:
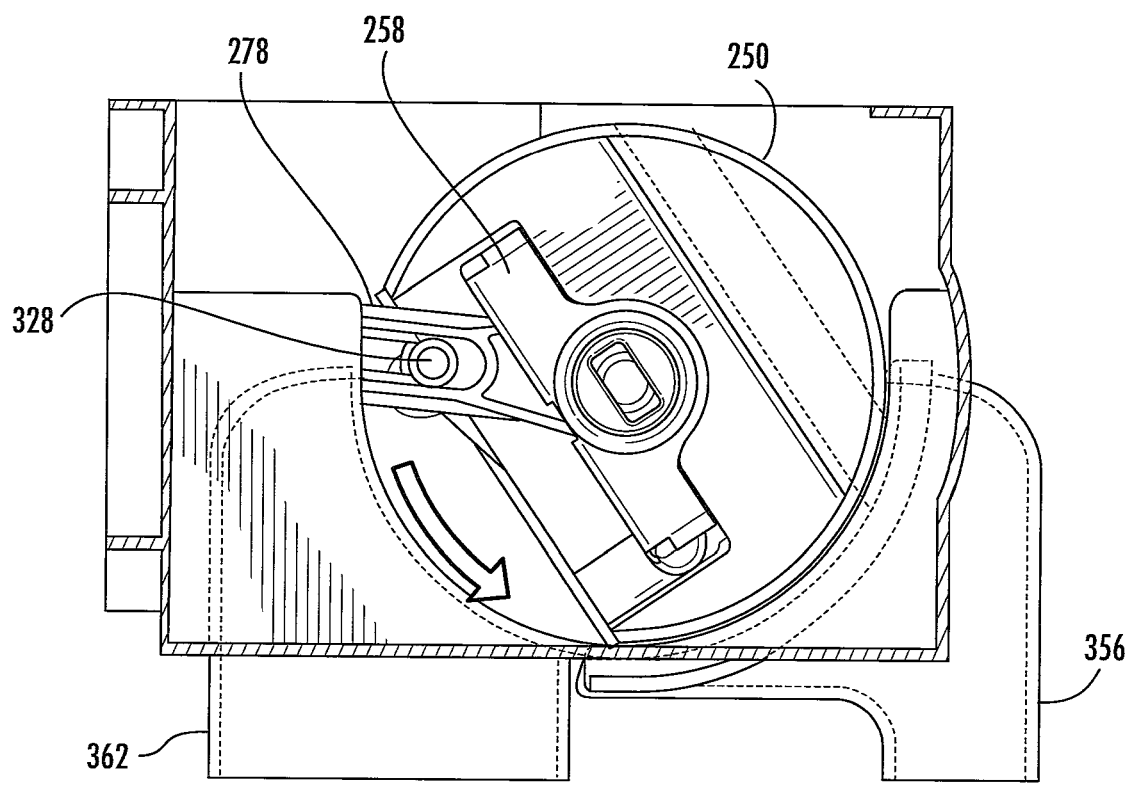
FIG. 31D is an end view of the ice maker shown in FIG. 31A as inverted for the harvest cycle.
Figure 32A:
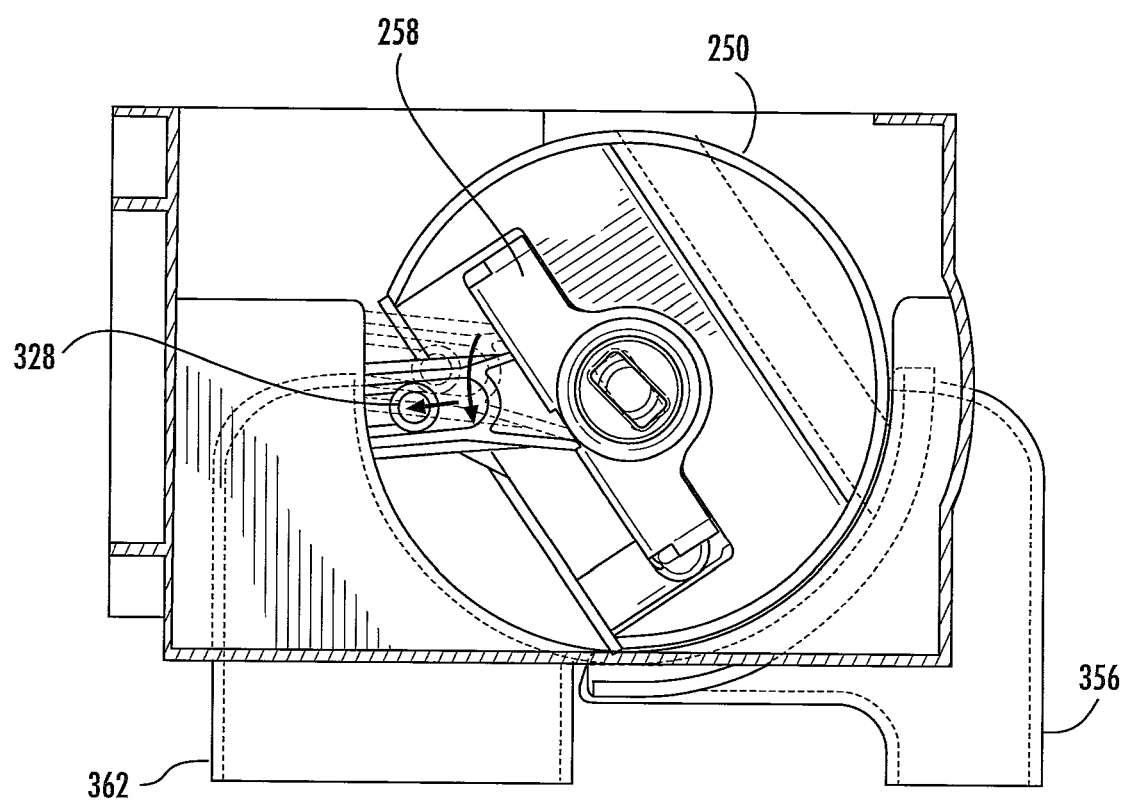
FIGS. 32A and 32B are end views of the ice maker shown in FIG. 31, showing the inversion and rotation of the grid when in the harvest cycle.
Figure 32B:
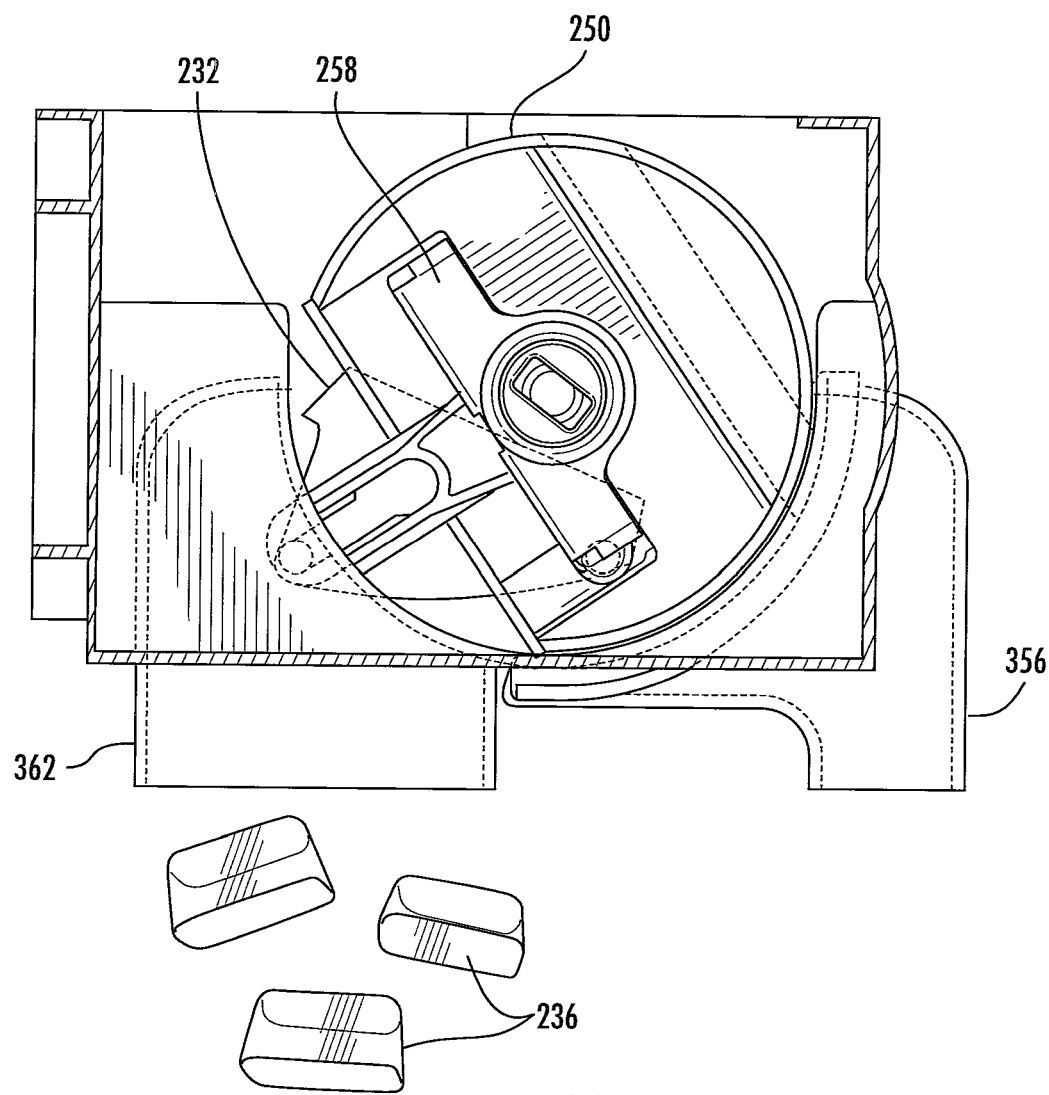

One example of an air flow path 368 enabled by the air intake duct 356 and exhaust duct 362 is shown in FIGS. 31A-31C. As shown in FIGS. 31A-31B, as the tray 218 is rocked, the rectangular slots 312, 314 in the shroud 250 remain in fluid connection with the air intake duct outlet 360 and the exhaust duct inlet 364. Therefore, the air flow path 368 is not interrupted by the oscillation of the ice tray 218 during the freezing step. Also, as shown in FIGS. 32A-32B, as the clear ice pieces 236 are harvested from the ice tray 218, the clear ice pieces 236 are permitted to fall through the exhaust duct 362 into the ice storage bin. During the harvest cycle as illustrated in FIGS. 32A-32B, the fluid path 368 for cooling air is not continuous. However, the shroud 250 continues to generally separate the first air chamber 254 from the second air chamber 256.

FIGS. 33A-33D depict the rotation of the ice tray 218 and the grid 232 during the harvest step. As the harvest motor 244 rotates the ice tray 218 to an inverted position, as shown in FIG. 33B, the cam pin 328 extending from the second end 324 of the grid 232 travels within the containment wall socket 334 to the position farthest from the ice forming plate 220. As the harvest motor 244 continues to drive rotation of the arm 278, the rotation of the ice forming plate 220 is halted by a catch 297, and the cam pin 328 extending from the first end 322 of the grid 232 continues to travel the length of the slot 280 in the harvest arm 278 away from the ice forming plate 220. As the length of the slot 280 is longer than the socket 334, the grid 232 will be twisted, expelling the clear ice pieces 236.

In general, the ice makers 52, 210 described herein create clear ice pieces 98, 236 through the formation of ice in a bottom-up manner, and by preventing the capture of air bubbles or facilitating their release from the water. The clear ice pieces 98, 236 are formed in a bottom-up manner by cooling the ice tray 70, 218 from the bottom, with or without the additional benefit of cold air flow to remove heat from the heat sink 104, 318. The use of insulative materials to form the grid 100, 232 and containment walls 82, 226, such that the cold temperature of the ice forming plate 76, 220 is not transmitted upward through the individual compartments 96, 234 for forming ice also aids in freezing the bottom layer of ice first. A warm air flow over the top of the clear ice pieces 98, 236 as they are forming can also facilitate the unidirectional freezing. Rocking aids in the formation of clear ice pieces 98, 236 in that it causes the release of air bubbles from the liquid as the liquid cascades over the median wall 84, 228, and also in that it encourages the formation of ice in successive thin layers, and, when used in connection with warm air flow, allows exposure of the surface of the clear ice piece 98, 236 to the warmer temperature.

The ice makers described herein also include features permitting the harvest of clear ice pieces 98, 236, including the harvest motor 114, 244, which at least partially inverts the ice tray 70, 218, and then causes the release and twisting of the grid 100, 232 at least partially out of the containment wall 84, 226 to expel clear ice pieces 98, 236. The ice forming plate 76, 220 and associated thermoelectric device 102, 238 can also be used to further facilitate harvest of clear ice pieces 98, 236 by reversing polarity to heat the ice forming plate 76, 220 and, therefore, heat the very bottom portion of the clear ice pieces 98, 236 such that the clear ice pieces 98, 236 are easily released from the ice forming plate 76, 220 and removed from contacting the ice forming plate 76, 220.

Figure 34:
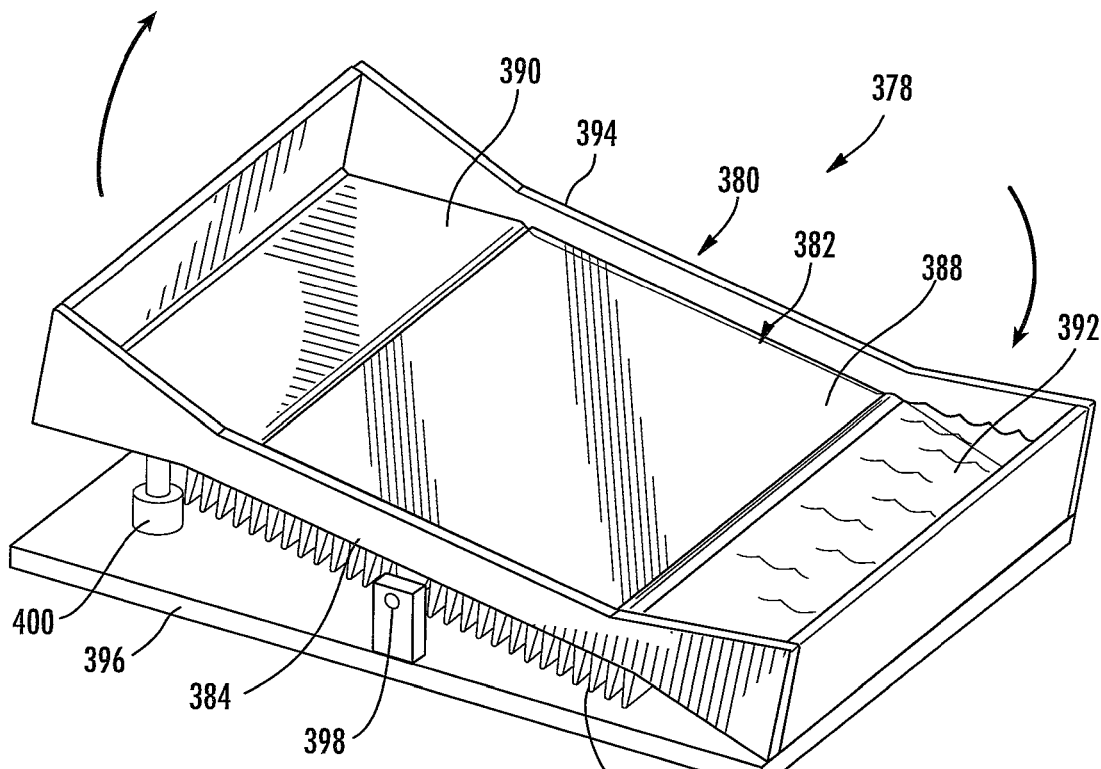
FIG. 34 is a top perspective view of another embodiment of an ice maker according to the present invention.
Figure 35A:
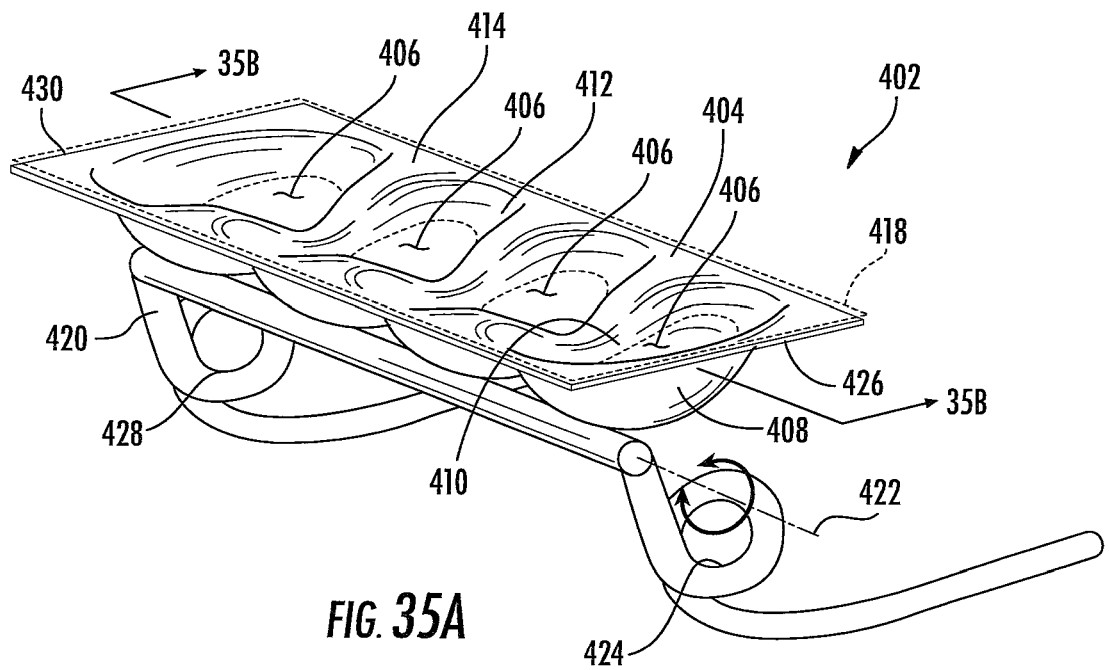
FIG. 35A is a top perspective view of an ice tray and cooling element according to the present invention.
Figure 35B:
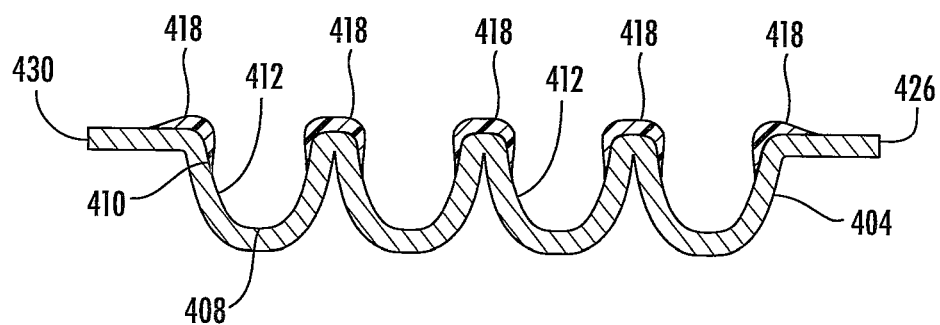
FIG. 35B is a cross sectional view taken along the line 35B-35B in FIG. 35A.

FIGS. 34, 35A and 35B illustrate additional potential embodiments for the ice maker 378, 402. As illustrated by FIGS. 34 and 35, alternate arrangements for the ice tray, the cooling mechanism, and the rocking mechanism also permit the formation of clear ice (not shown in FIGS. 34-35) via a rocking mechanism. In each of the additional embodiments, a predetermined volume of water is added to the ice maker 378, 402, and the lower surface 382, 404 of the ice maker 378, 402 is cooled such that the ice is formed unidirectionally, from the bottom to the top. The rocking motion facilitates formation of the ice in a unidirectional manner, allowing the air to easily escape, resulting in fewer bubbles to negatively affect the clarity of the clear ice piece that is formed.

As shown in FIG. 34, an ice forming tray 380 may include a central ice forming plate 382, having a bottom surface 384, which is cooled by a thermoelectric plate (not shown) having a heat sink 386, and a top surface 388, which is adapted to hold water, with reservoirs 390, 392 at either end and a containment wall 394 extending upwards around the perimeter of the ice forming plate 382 and reservoirs 390, 392. As shown in FIG. 34, the ice maker 378 may also be rocked by alternate means/devices than the rotary oscillating motors previously described. In the embodiment depicted in FIG. 34, the ice maker 378 is rocked on a rocking table 396, with a pivot axle 398 through the middle of the ice forming plate 382, and at least one actuating mechanism 400 raising and lowering the end of the ice forming plate 382 and the first and second reservoirs 390, 392 in sequence. As the tray 380 is rocked, water flows over the central ice forming plate 382 and into a first reservoir 390 on one end. As the tray 380 is rocked in the opposite direction, the water flows over the ice forming plate 382 and into the second reservoir 392 on the other end. As the water is flowing over the ice forming plate 382, the ice forming plate 382 is being cooled, to facilitate formation of at least one clear ice piece. In this embodiment, a large clear ice piece may be formed in the ice forming plate 382. Alternatively, a grid or other shaped divider (not shown) may be provided on the ice forming plate 382, such that water is frozen into the desired shapes on the ice forming plate 382 and water cascades over the divided segments to further release air therefrom.

As shown in FIGS. 35A and 35B, an alternative cooling mechanism and ice forming plate 404 may also be used. Here, an ice forming plate 404 with formed ice wells 406 therein is provided. The wells 406 are capable of containing water for freezing. Each of the wells 406 is defined along its bottom by a bottom surface 408, which may or may not be flat, and its sides by at least one wall 410 extending upwardly from the bottom surface 408. Each of the at least one walls 410 includes an interior surface 412, which is facing the ice well 406 and a top surface 414. The bottom surface 408 and interior surfaces 412 together make up an ice forming compartment 416. An insulating material is applied to the upper portion of the ice wells 406 and the top surface of the walls to form an insulating layer 418.

The ice forming plate 404 is preferably formed of a thermally conductive material such as a metallic material, and the insulating layer 418 is preferably an insulator such as a polymeric material. One non-limiting example of a polymeric material suitable for use as an insulator is a polypropylene material. The insulating layer 418 may be adhered to the ice forming plate 404, molded onto the ice forming plate 404, mechanically engaged with the ice forming plate 404, overlayed over the plate 404 without attaching, or secured in other removable or non-removable ways to the ice forming plate 404. The insulating layer 418 may also be an integral portion of the ice forming plate 76 material. This construction, using an insulating layer 418 proximate the top of the ice wells 406, facilitates freezing of the clear ice piece 98 from the top surface 78 of the ice forming plate 76 upward.

An evaporator element 420 is thermally coupled with the ice forming plate 404, typically along the outside of the ice wells 406, opposite the ice forming compartments 416, and the evaporator element 420 extends along a transverse axis 422 of the ice forming plate 404. The evaporator element 420 includes a first coil 424 proximate a first end 426 of the ice forming plate 404 and a second coil 428 proximate the second end 403 of the ice forming plate 404.

The ice forming plate 404 and insulating layer 418 as shown in FIG. 35A can also be used in an automatic oscillating ice maker 402 as a twisting metal tray, as described above. When so used, the first and second coils 424, 428 are configured to permit the evaporator element 420 to flex when a drive body (not shown in FIG. 35A)

reciprocally rotates the ice forming plate 404. Alternatively, thermoelectric plates (not shown in FIG. 35A) could also be used to cool the ice forming plate 404 from the bottom. In use, a predetermined volume of water is added to the ice wells through a fluid line (not shown in FIG. 35A) positioned above the ice forming plate 404. The bottom surface 408 of the formed ice wells 406 is cooled by the evaporator element 420, and a drive body (not shown in FIG. 35A) causes rotation of the ice forming plate 404 along its transverse axis 422. The upstanding sides 410 of the formed ice wells 406 contain the water within the formed ice wells 406 as the ice forming plate 404 is rocked, allowing the water to run back and forth across the surface of a clear ice piece (not shown in FIG. 35A) as it is formed, resulting in freezing of the clear ice piece from the bottom up. The ice forming plate 404 can then be inverted, and twisted to expel the clear ice pieces.

In addition to the multiple configurations described above, as shown in FIGS. 36-37, the ice maker 52 according to the present invention may also have a controller 440 which receives feedback information 442 from a sensor 444 regarding the volume of usage of clear ice pieces 98 and uses the feedback 442 to determine an appropriate energy mode for the production of clear ice pieces 98, for example a high energy mode or a low energy mode. The controller 440 then sends a control signal 450, instructing a plurality of systems which aid in ice formation 452 whether to operate in the high energy mode or the low energy mode.

The sensor 444 may detect, for example, the level of ice 98 in an ice bin 64, the change in the level of ice 98 in the bin 64 over time, the amount of time that a dispenser 66 has been actuated by a user, and/or when the dispenser has been actuated to determine high and low ice usage time periods. This information 442 is typically transmitted to the controller 440, which uses the information 442 to determine whether and when to operate the ice maker 52 in a high energy mode or a low energy mode based upon usage parameters or timer periods of usage. This allows the ice maker 52 to dynamically adjust its output based on usage patterns over time, and if certain data are collected, such as the time of day when the most ice 98 is used, the ice maker 52 could operate predictively, producing more ice 98 prior to the heavy usage period. Operating the ice maker 52 in a high energy mode would result in the faster production of ice 98, but would generally be less efficient than the low energy mode. Operating in the high energy mode would typically be done during peak ice usage times, while low energy mode would be used during low usage time periods. An ice maker 52 having three or more energy modes of varying efficiencies may also be provided, with the controller 440 able to select an energy mode from among the three or more energy modes.

One example of an ice maker 52 which could be operated by such a controller 440 would be an ice maker 52 having a plurality of systems 452 which operate to aid in the formation of clear ice pieces 98, including an oscillating system as described above, a thermoelectric cooling system as described above, a forced air system to circulate warm air as described above, a forced air system to circulate cold air as described above, a forced air system to circulate warm air as described above, a housing 54 which is split into a first air chamber 254 and a second air chamber 256 with a temperature gradient therebetween as described above, and a thermoelectric heating system (to aid in harvesting clear ice pieces) as described above.

Operating an ice maker 52 in a high energy mode could include, for example, the use of a particular oscillation setting, a thermoelectric device setting, one or more air circulator settings for use during the ice freezing process, wherein the settings in the high energy mode require more energy, and result in the faster formation of clear ice pieces 98. The high energy mode could also include using the thermoelectric device 102 to provide a higher temperature to the ice forming plate 76 to cause a faster release of ice pieces 98 during the harvest process and to shorten cycle time for filling and making the ice pieces.

The low energy mode could also include a delay in dispensing water into the ice tray, or a delay in harvesting the clear ice pieces 98 from the ice tray 70 as well as lower electronic power (energy) use by the motors 112, 114 and thermoelectric devices 102 than the normal mode or high energy mode. Such lower energy use may include no forced air, no requirement to drop the temperature of the second air chamber or ice forming plate, and harvesting can be done with minimal heating to the ice forming plate over a longer period of time, if needed.

Additionally, in certain embodiments the controller 440 is able to individually control the different systems, allowing at least one system 452 to be directed to operate in a low energy mode while at least one other system 452 is directed to operate in a high energy mode.

It will be understood by one having ordinary skill in the art that construction of the described invention and other components is not limited to any specific material. Other exemplary embodiments of the invention disclosed herein may be formed from a wide variety of materials, unless described otherwise herein. In this specification and the amended claims, the singular forms "a," "an," and "the" include plural reference unless the context clearly dictates otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An ice making assembly within an appliance, the ice making assembly comprising:
    a housing having an inlet and an outlet, and a lower portion and an upper portion;
    a shroud rotatably disposed within the housing about an axis and having a first slot in air communication with the inlet, and a second slot in air communication with the outlet;
    a thermoelectric device with a top side and a bottom side, the thermoelectric device having a heat sink on the bottom side and disposed between the first slot and the second slot;
    an ice tray disposed above and in thermal communication with the top side;
    a barrier wall within the housing and in contact with the shroud between the lower portion and the upper portion.

2. The ice making assembly of claim 1, wherein the shroud oscillates about the axis during an ice making process.

3. The ice making assembly of claim 2, wherein the first slot maintains communication with the inlet and the second slot maintains communication with the outlet during the ice making process.

4. The ice making assembly of claim 2, wherein the barrier wall maintains contact with the shroud during the ice making process.

5. The ice making assembly of claim 1, wherein the ice tray is twistable.

6. The ice making assembly of claim 5, wherein the ice tray further comprises at least one insulated wall separating adjacent ice wells.

7. The ice making assembly of claim 6, wherein the ice tray is twisted during an ice harvesting process.

8. The ice making assembly of claim 5, wherein the shroud rotates such that the ice tray faces the outlet during the harvesting process.

9. A clear ice making assembly comprising:
    a housing comprising:
        a first air chamber;
        a second air chamber;
        a barrier wall separating the first air chamber and the second air chamber;
        an inlet in the second air chamber; and
        an outlet in the second air chamber;
    a shroud rotatably disposed within the housing and comprising:
        a first slot adjacent to the inlet; and
        a second slot adjacent to the outlet;
    a thermoelectric device with a cold side and a warm side;
    a heat sink on the warm side and disposed between the first slot and the second slot;
    an ice tray in thermal communication with the cold side.

10. The clear ice making assembly of claim 9, wherein the shroud oscillates about an axis during the ice making process.

11. The clear ice making assembly of claim 10, wherein the first slot remains adjacent the inlet and the second slot remains adjacent the outlet during the ice making process.

12. The clear ice making assembly of claim 10, wherein the barrier wall maintains contact with the shroud during the ice making process.

13. The clear ice making assembly of claim 9, wherein the ice tray is twistable.

14. The clear ice making assembly of claim 13, wherein the ice tray further comprises at least one insulated wall separating adjacent ice wells.

15. The clear ice making assembly of claim 14, wherein the ice tray is twisted during an ice harvesting process.

16. The clear ice making assembly of claim 15, wherein the shroud rotates such that the ice tray faces the outlet during the harvesting process.

17. A method of making clear ice, comprising the steps of:
    attaching an ice tray within a rotatable shroud within a housing;
    filling a twistable ice tray with water;
    oscillating the ice tray;
    freezing the water within the ice tray by thermally connecting a cold side of a thermoelectric device with a bottom side of the ice tray;
    removing heat from a warm side of the thermoelectric device by attaching a heat sink to the warm side and disposing the heat sink between a first slot and a second slot of the shroud;
    cooling the heat sink by urging an amount of cooling air through an inlet in the housing, through the first slot in the shroud, through the heat sink, out the second slot in the shroud, and then out an outlet in the housing; and
    ensuring the water freezes from the bottom up by preventing the cooling air from reaching a top portion of the ice tray using a barrier wall in contact with the shroud.

18. The method of claim 17, further comprising the step of harvesting the clear ice by twisting the ice tray, and rotating the shroud and ice tray such that a top of the ice tray is facing the outlet in the housing.

19. The method of claim 18, further comprising the step of storing the ice by locating an ice bin below the outlet in the housing to catch the ice disposed during the harvest step.

20. The method of claim 17, wherein the barrier wall maintains contact with the shroud throughout the ice making process.

* * * * *